US011329860B2

(12) United States Patent
Tee et al.

(10) Patent No.: US 11,329,860 B2
(45) Date of Patent: *May 10, 2022

(54) SYSTEM FOR DECOMPOSING EVENTS THAT INCLUDES USER INTERFACE

(71) Applicant: Moogsoft Inc., San Francisco, CA (US)

(72) Inventors: Philip Tee, San Francisco, CA (US); Amir Borna, San Francisco, CA (US)

(73) Assignee: Moogsoft Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/204,926

(22) Filed: Mar. 17, 2021

(65) Prior Publication Data
US 2021/0281469 A1    Sep. 9, 2021

Related U.S. Application Data

(63) Continuation-in-part of application No. 16/779,757, filed on Feb. 3, 2020, now abandoned, which is a
(Continued)

(51) Int. Cl.
*H04L 12/24* (2006.01)
*H04L 12/26* (2006.01)
(Continued)

(52) U.S. Cl.
CPC .......... *H04L 41/046* (2013.01); *G06F 16/951* (2019.01); *H04L 41/0886* (2013.01);
(Continued)

(58) Field of Classification Search
CPC ......... H04L 41/046; H04L 41/06–0695; H04L 41/0893; H04L 41/12; H04L 41/142;
(Continued)

(56) References Cited

U.S. PATENT DOCUMENTS 5,621,876 A * 4/1997 Odam ................ G06F 40/18
715/212
7,721,211 B1 * 5/2010 Yehuda ................ H04L 41/22
715/734
(Continued)

OTHER PUBLICATIONS

Definition of Screenshot by Collins Dictionary—(Year: 2021).*

*Primary Examiner* — Boris D Grijalva Lobos
(74) *Attorney, Agent, or Firm* — Paul Davis

(57) ABSTRACT

A system provides for management of a managed infrastructure. A processor is coupled to various engines. An extraction engine is in communication with the managed infrastructure. The extraction engine in operation receives messages from the managed infrastructure, produces events that relate to the managed infrastructure and converts the events into words and subsets used to group the events into clusters that relate to failures or errors in the managed infrastructure, including managed infrastructure physical hardware. The managed infrastructure supports the flow and processing of information. A sigalizer engine includes one or more of an NMF engine, a k-means clustering engine and a topology proximity engine. The sigalizer engine determines one or more common steps from events and produces clusters relating to events; the sigalizer engine determining one or more common characteristics of events and producing clusters of events relating to the failure or errors in the managed infrastructure, where membership in a cluster indicates a common factor of the events that is a failure or an actionable problem in the physical hardware managed infrastructure directed to supporting the flow and processing of information.

19 Claims, 49 Drawing Sheets

Related U.S. Application Data continuation-in-part of application No. 16/237,663, filed on Dec. 31, 2018, which is a continuation-in-part of application No. 16/236,551, filed on Dec. 30, 2018, now Pat. No. 10,686,648, which is a continuation-in-part of application No. 16/140,508, filed on Sep. 24, 2018, now Pat. No. 10,700,919, which is a continuation-in-part of application No. 16/043,168, filed on Jul. 24, 2018, now Pat. No. 10,693,707, which is a continuation-in-part of application No. 16/041,851, filed on Jul. 23, 2018, now Pat. No. 10,715,379, which is a continuation-in-part of application No. 16/041,792, filed on Jul. 22, 2018, now Pat. No. 10,574,510, which is a continuation-in-part of application No. 15/811,688, filed on Nov. 14, 2017, now Pat. No. 10,873,508, which is a continuation-in-part of application No. 15/810,297, filed on Nov. 13, 2017, now Pat. No. 10,979,304, which is a continuation-in-part of application No. 15/596,648, filed on May 16, 2017, now Pat. No. 10,027,529, which is a continuation-in-part of application No. 15/592,689, filed on May 11, 2017, now Pat. No. 10,027,553, which is a continuation of application No. 14/606,946, filed on Jan. 27, 2015, now Pat. No. 10,044,549.

(60) Provisional application No. 62/993,078, filed on Mar. 23, 2020, provisional application No. 62/799,750, filed on Feb. 1, 2019, provisional application No. 62/720,207, filed on Aug. 21, 2018, provisional application No. 62/612,538, filed on Dec. 30, 2017, provisional application No. 62/612,435, filed on Dec. 30, 2017, provisional application No. 62/612,437, filed on Dec. 30, 2017, provisional application No. 62/538,941, filed on Jul. 31, 2017, provisional application No. 62/451,321, filed on Jan. 27, 2017, provisional application No. 62/446,088, filed on Jan. 13, 2017.

(51) Int. Cl.
| | |
|---|---|
| *H04L 29/06* | (2006.01) |
| *H04L 41/046* | (2022.01) |
| *G06F 16/951* | (2019.01) |
| *H04L 41/14* | (2022.01) |
| *H04L 41/12* | (2022.01) |
| *H04L 41/142* | (2022.01) |
| *H04L 41/22* | (2022.01) |
| *H04L 43/0823* | (2022.01) |
| *H04L 43/10* | (2022.01) |
| *H04L 67/01* | (2022.01) |
| *H04L 41/08* | (2022.01) |
| *H04L 41/0893* | (2022.01) |
| *H04L 43/067* | (2022.01) |
| *H04L 67/00* | (2022.01) |

(52) U.S. Cl.
CPC ......... *H04L 41/0893* (2013.01); *H04L 41/12* (2013.01); *H04L 41/142* (2013.01); *H04L 41/145* (2013.01); *H04L 41/22* (2013.01); *H04L 43/067* (2013.01); *H04L 43/0823* (2013.01); *H04L 43/10* (2013.01); *H04L 63/029* (2013.01); *H04L 67/34* (2013.01); *H04L 67/42* (2013.01)

(58) Field of Classification Search
CPC ............... H04L 41/145; H04L 41/5041; H04L 41/5074; H04L 43/00; H04L 43/04–50; G06F 11/00; G06F 11/30–34
See application file for complete search history.

(56) References Cited

U.S. PATENT DOCUMENTS

| | | | |
|---|---|---|---|
| 8,332,502 B1 * | 12/2012 | Neuhaus | H04L 41/0613 709/224 |
| 2004/0107249 A1 * | 6/2004 | Moser | G06Q 10/107 709/204 |
| 2006/0282291 A1 * | 12/2006 | Runciman | G16H 15/00 705/3 |
| 2010/0250322 A1 * | 9/2010 | Norwood | G06Q 10/103 705/7.21 |
| 2014/0324866 A1 * | 10/2014 | Tee | G06F 16/904 707/737 |
| 2014/0344622 A1 * | 11/2014 | Huang | G06F 11/0775 714/37 |
| 2015/0195165 A1 * | 7/2015 | Boger | H04L 41/0618 709/224 |
| 2020/0192743 A1 * | 6/2020 | Harper | G06F 11/0793 |

* cited by examiner

FIG. 13B

Display Query View: ZOK_QN
Query View ID:* ZOK_QN
Description: XC Quality Notification
Table ID:
Enable Personalization: X
Private: X Quick Info Text:
Chart ID: ZOK_XC1
Owner: KREINDLINA

| Queries | | |
|---|---|---|
| Query ID | Table View | Description |
| ZOK_QN | TABLE_ZOK_QN | standard query generated from ZOK_QN |
| | | |
| | | |

| Input Fields | Output Fields | Layout for Quick View | Subject-Based View Assignments | | Charts Views | Authorization | |
|---|---|---|---|---|---|---|---|
| Query ID | Query Field ID | Description of Query Field | Sequence | Allow Aggr | Sequence | Sorting | Sort Seq. |
| ZOK_QN | CODE_TEXT | Short Text for Code (up to 40 Characters in Length) | 1 | | 1 | - | |
| ZOK_QN | ZDAM_NUM | Number of damages | 2 | | | - | |
| ZOK_QN | D_CAT_TYP | Catalog Type Problem | 3 | | 2 | - | |
| ZOK_QN | D_CODE | Problem or Damage Code | 4 | | | - | |

*FIG. 16*

| Save | Edit | Close | Read Only | Save As | Refresh | Check Consistency | Test | Delete |

510 →

Query View ID:* ZOK_QN
Chart ID:* ZOK_XC1
Description:
512 — Technology:* Xcelsius Dashboard Xcelsius Dashboards Folder: /sap/public/buisnessuite/bcv
514 — File Path: /sap/public/buisnessuite/bcv/ZOK_7.swf
Name of SWF File: ZOK_7.swf Upload file to repository Mapping to Xcelsius Interface
Generate XC Fields

| Xcelsius Field | Query ID | Query Field ID |
|---|---|---|
| DAMAGES | ZOK_QN | ZDAM_NUM |
| LABELS | ZOK_QN | CODE_TEXT |

Quick Info Text:
Chart Type: Display Xcelsius Flash Island

FIG. 20

Incident.MOOG

Priority Situations only

VIEW ˅    T LS ˅    BASIC SEARCH ˅

SUMMARY
- ▸ IMPACTED SERVICES
- ▾ SITUATIONS
  - ⊗ Priority Situations only
  - ❶ Not SPAM or Superseded
  - ⊗ Severity is Critical
  - ⚠ Op n Situations
- ▾ ALERTS
  - ⊗ C itical al ts not in Situations
  - ❶ Wa nings not in Situations
  - ⚠ Causal non-critical alerts
  - ⊗ Noisy causal alerts
  - ❶ l ts not in situations
- ▸ R MS

| | | TREND | DESCRIPTION | SERVICE IMPACTED | STATUS | ID |
|---|---|---|---|---|---|---|
| ☐ | ⊗ #112 | ↑ | Alerts from a similar s... | Service A, Directo y | Assign d | 112 |
| ☐ | ❶ #113 | ↓ | Remaining critical | Service A, Directo y | Assigned | 113 |
| ☐ | ⊗ #114 | ↑ | Remaining critical | Finance | Op ned | 114 |
| ☑ | ⚠ #116 | ↓ | Lorem ipsum dolor sit... | Website/Support | cknowl ... | 116 |
| ☑ | ⊗ #98 | ↑ | Alerts from a similar s... | Service A, Directo y | ssigned | 98 |
| ☐ | ❶ #97 | ↓ | Remaining critical | Service A, Directo y | ssign d | 97 |
| ☐ | ⊗ #96 | ↑ | Remaining critical | Finance | Op n d | 96 |
| ☑ | ❶ #95 | ↑ | Lorem ipsum dolor sit... | Website/Support | cknowle... | 95 |
| ☐ | ⊗ #88 | ↑ | Alerts from a similar s... | Service A | ssign d | 88 |
| ☐ | ❶ #87 | ↑ | Remaining critical | Service B | ssign d | 87 |
| ☐ | ⚠ #86 | ↑ | Remaining critical | Finance | Op n d | 86 |
| ☐ | ⚠ #85 | ↑ | Lorem ipsum dolor sit... | Website/Support | cknowl ... | 85 |
| ☐ | ⊗ #84 | ↑ | Alerts from a similar s... | Service A | ssign d | 84 |
| ☐ | ⊗ #83 | ↑ | Remaining critical | Service C | ssign d | 83 |
| ☐ | ⊗ #77 | ↑ | Remaining critical | Finance | Op n d | 77 |
| ☐ | ⊗ #76 | ↑ | Lorem ipsum dolor sit... | Website/Support | cknowl ... | 76 |

- House Features

| Sq. Feet | # Rooms | Garden? | Door |
|---|---|---|---|
| 2000 | 5 | Yes | Red |
| 5000 | 7 | Yes | White |
| 500 | 2 | No | Black |

- Feature Vectors

| Sq. Feet | # Rooms | Garden? | Red Door? | White Door? | Black Door? |
|---|---|---|---|---|---|
| 2000 | 5 | 1 | 1 | 0 | 0 |
| 5000 | 7 | 1 | 0 | 1 | 0 |
| 500 | 2 | 0 | 0 | 0 | 1 |

SYSTEM FOR DECOMPOSING EVENTS THAT INCLUDES USER INTERFACE

CROSS REFERENCE TO RELATED APPLICATIONS

This application claims the priority benefit of all of the following: U.S. Provisional Patent Application 62/993,078, filed on Mar. 23, 2020, a Continuation In Part of patent application Ser. No. 16/779,757, filed on Feb. 3, 2020, which is a Continuation-In-Part of patent application Ser. No. 16/237,663, filed on Dec. 31, 2018, which is a Continuation-In-Part of patent application Ser. No. 16/236,551, filed on Dec. 30, 2018, which is a Continuation-In-Part of patent application Ser. No. 16/140,508, filed on Sep. 24, 2018, which claims the priority benefit of U.S. Provisional Patent Application 62/720,207, filed on Aug. 21, 2018. This application is also a Continuation-In-Part of patent application Ser. No. 16/043,168, filed on Jul. 24, 2018, which claims the priority benefit of U.S. Provisional Patent Application 62/612,438, filed on Dec. 30, 2017, U.S. Provisional Patent Application 62/612,435, filed on Dec. 30, 2017, U.S. Provisional Patent Application 62/612,437, filed on Dec. 30, 2017, which is a Continuation-In-Part of patent application Ser. No. 16/041,851, filed on Jul. 23, 2018, which is a Continuation-In-Part of patent application Ser. No. 16/041,792, filed on Jul. 22, 2018, which is a Continuation-In-Part of patent application Ser. No. 15/811,688, filed on Nov. 14, 2017, which is a Continuation-In-Part of patent application Ser. No. 15/810,297, filed on November 13, which is a Continuation-In-Part of patent application Ser. No. 15/596,648, filed on May 16, 2017, which is a Continuation-In-Part of patent application Ser. No. 15/592,689, filed on May 11, 2017, which is a Continuation-In-Part of patent application Ser. No. 14/606,946, filed on Jan. 27, 2017, which claims the priority benefit of U.S. Provisional Patent Application 62/538,941, filed on Jul. 31, 2017, U.S. Provisional Patent Application 62/451,321 filed on Jan. 27, 2017, U.S. Provisional Patent Application 62/446,088 filed on Jan. 13, 2017.

BACKGROUND

Field of the Invention

This invention relates generally to methods and systems of network monitoring systems, and more particularly to network monitoring systems with user interfaces with a user interface coupled to a display that includes a screen, having a screenshot having a space to display managed infrastructure information selected from at least one of: incidents or alerts.

Description of the Related Art

The World Wide Web is increasingly becoming a more important and more frequently used form of communication between people. The primary form of web-based communication is electronic mail. Other forms of communication are also used, however, such as news groups, discussion groups, bulletin boards, voice-over IP, and so on. Because of the vast amount of information that is available on the web, it can be difficult for a person to locate information that may be of interest. For example, a person who receives hundreds of electronic mail messages/events from infrastructure a day may find it impractical to take the time to store the messages/events from infrastructure in folders of the appropriate topic. As a result, it may be difficult for the person to later find and retrieve all messages/events from infrastructure related to the same topic. A similar situation arises when a person tries to locate news groups or discussion groups of interest. Because there may be no effective indexing of these groups, it can be difficult for the person to find groups related to the topic of interest.

Some attempts have been made to help the retrieval of information of interest by creating web directories that provide a hierarchical organization of web-based information. The process of creating the directories and deciding into which directory a particular piece of information (e.g., a news group) should go is typically not automated. Without an automated approach it is impractical to handle the massive amounts of web-based information that are being generated on a daily basis. Moreover, because a person may not be fully aware of the entire web directory hierarchy or may not fully understand the semantics of information, the person may place the information in a directory that is not the most appropriate, making later retrieval difficult. It would be desirable to have an automated technique that would help organize such information.

Traditional monitoring systems, for example event logs, provide too much information about a complex system for any operator or organization to be able to read, understand and take quick action on to prevent incidents and outages.

SUMMARY

An object of the present invention is to provide a system for management of a managed infrastructure, with a user interface is coupled to a display that includes a screen, having a screenshot having a space to display managed infrastructure information selected from at least one of: incidents or alerts.

Another object of the present invention is to provide a system for management of a managed infrastructure, including a screen with a carousel screenshot having a space to display managed infrastructure information selected from at least one of: incidents or alerts.

Still another object of the present invention is to provide a system for management of a managed infrastructure, having a carousal space that provides a display of two or more incidents or alerts for side by side comparison.

Yet another object of the present invention is to provide a system for management of a managed infrastructure, having display that can include controls used to show a user a number of steps before and after a current step in the process flow.

Another object of the present invention is to provide a system for management of a manged infrastructure, with one or more pinboards enabling a user to drag and drop managed infrastructure information.

These and other objects of the present invention can include a system that provides for management of a managed infrastructure. A processor is coupled to various engines. An extraction engine is in communication with the managed infrastructure. The extraction engine in operation receives messages from the managed infrastructure, produces events that relate to the managed infrastructure and converts the events into words and subsets used to group the events into clusters that relate to failures or errors in the managed infrastructure, including managed infrastructure physical hardware. The managed infrastructure supports the flow and processing of information. A sigalizer engine includes one or more of an NMF engine, a k-means clustering engine and a topology proximity engine. The sigalizer engine determines one or more common steps from events and produces clusters relating to events; the sigalizer engine determining one or more common characteristics of events and producing clusters of events relating to the failure or errors in the managed infrastructure, where membership in a cluster indicates a common factor of the events that is a failure or an actionable problem in the physical hardware managed infrastructure directed to supporting the flow and processing of information.

BRIEF DESCRIPTION OF THE DRAWINGS

FIG. 16 is a screen display of the dashboard external interface screen that may allow another software program to transmit data in the data range.

FIG. 20 illustrates one embodiment of a screen display showing the data mapping for the dashboard configuration screen.

FIG. 28 illustrates one embodiment of a situation list view of the present invention.

FIG. 29 illustrates one embodiment of a situation Kanban view of the present invention.

FIG. 30 illustrates one embodiment of a situation room in an overview section of the present invention.

FIG. 31 illustrates one embodiment of a situation room with activity feed and a chat ops section of the present invention.

FIG. 32 illustrates one embodiment of a team room of the present invention.

FIGS. 33($a$) and ($b$) illustrates one embodiment of an event clustering system where each parameter is represented by one or more columns, of a table, in the final feature vector, and a column can represent a time that can be sorted in any time desired.

FIG. 34 illustrates one embodiment of a feature vector of the present invention.

DETAILED DESCRIPTION

Figure 1:
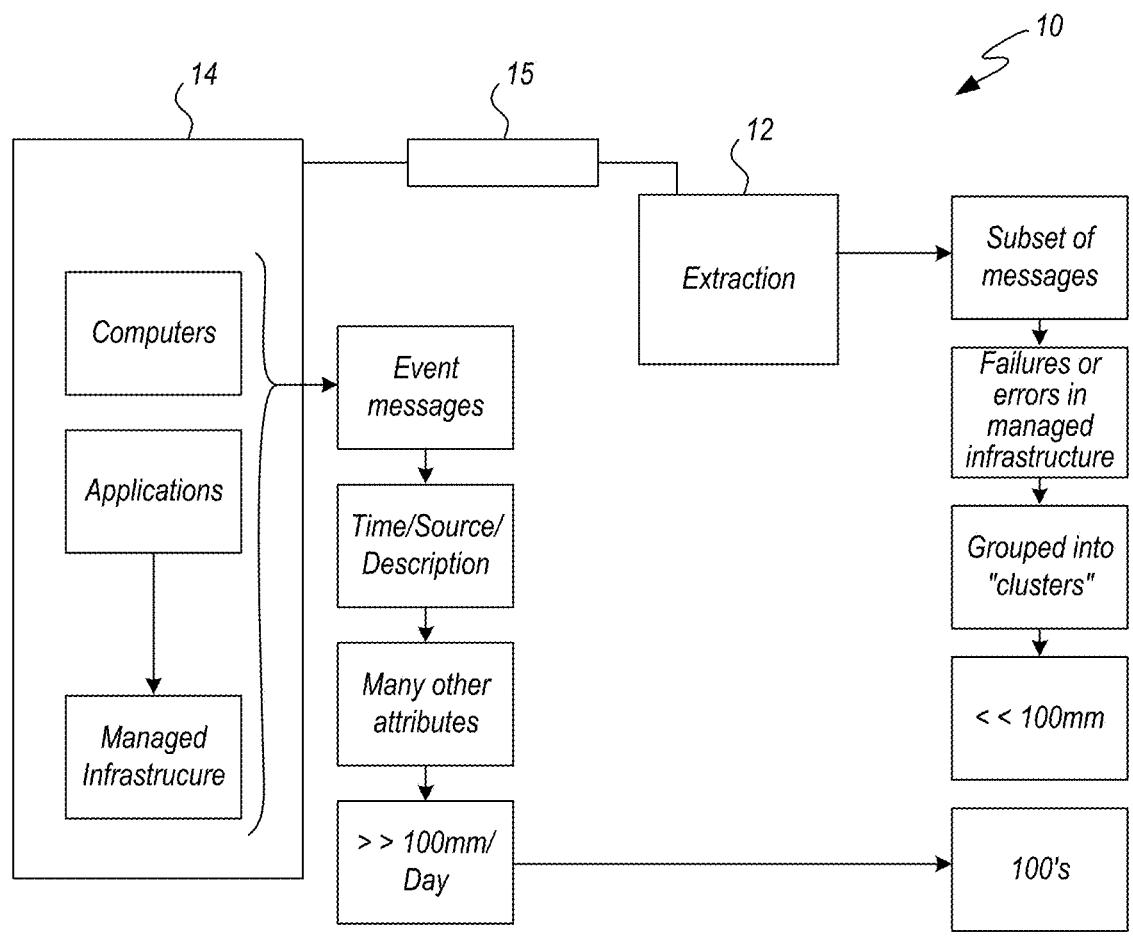
FIG. 1 illustrates one embodiment of an event clustering system of the present invention.

As used herein, the term engine refers to software, firmware, hardware, or other component that can be used to effectuate a purpose. The engine will typically include software instructions that are stored in non-volatile memory (also referred to as secondary memory) and a processor with instructions to execute the software. When the software instructions are executed, at least a subset of the software instructions can be loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

As used herein a mobile device includes, but is not limited to, a cell phone, such as Apple's iPhone®, other portable electronic devices, such as Apple's iPod Touches®. Apple's iPads®, and mobile devices based on Google's Android® operating system, and any other portable electronic device that includes software, firmware, hardware, or a combination thereof that is capable of at least receiving a wireless signal, decoding if needed, and exchanging information with a server to send and receive cultural information data including survey data. Typical components of mobile device may include but are not limited to persistent memories like flash ROM, random access memory like SRAM, a camera, a battery. LCD driver, a display, a cellular antenna, a speaker, a BLUETOOTH® circuit, and WIFI circuitry, where the persistent memory may contain programs, applications, and/or an operating system for the mobile device.

As used herein, the term "computer" is a general-purpose device that can be programmed to carry out a finite set of arithmetic or logical operations. Since a sequence of operations can be readily changed, the computer can solve more than one kind of problem. A computer can include of at least one processing element, typically a central processing unit (CPU) and some form of memory. The processing element carries out arithmetic and logic operations, and a sequencing and control unit that can change the order of operations based on stored information. Peripheral devices allow information to be retrieved from an external source, and the result of operations saved and retrieved. Computer also includes a graphic display medium.

As used herein, the term "Internet" is a global system of interconnected computer networks that use the standard Internet protocol suite (TCP/IP) to serve billions of users worldwide. It is a network of networks that consists of millions of private, public, academic, business, and government networks, of local to global scope, that are linked by a broad array of electronic, wireless and optical networking technologies. The Internet carries an extensive range of information resources and services, such as the inter-linked hypertext documents of the World Wide Web (WWW) and the infrastructure to support email. The communications infrastructure of the Internet consists of its hardware components and a system of software layers that control various aspects of the architecture.

As used herein, the term "extranet" is a computer network that allows controlled access from the outside. An extranet can be an extension of an organization's intranet that is extended to users outside the organization in isolation from all other Internet users. An extranet can be an intranet mapped onto the public Internet or some other transmission system not accessible to the public but managed by more than one company's administrator(s). Examples of extranet-style networks include but are not limited to:

LANs or WANs belonging to multiple organizations and interconnected and accessed using remote dial-up.

LANs or WANs belonging to multiple organizations and interconnected and accessed using dedicated lines.

Virtual private network (VPN) that is comprised of LANs or WANs belonging to multiple organizations, and that extends usage to remote users using special "tunneling" software that creates a secure, usually encrypted network connection over public lines, sometimes via an ISP.

As used herein, the term "Intranet" is a network that is owned by a single organization that controls its security policies and network management. Examples of intranets include but are not limited to:

A LAN

A Wide-area network (WAN) that is comprised of a LAN that extends usage to remote employees with dial-up access A WAN that is comprised of interconnected LANs using dedicated communication lines A Virtual private network (VPN) that is comprised of a LAN or WAN that extends usage to remote employees or networks using special "tunneling" software that creates a secure, usually encrypted connection over public lines, sometimes via an Internet Service Provider (ISP).

For purposes of the present invention, the Internet, extranets and intranets collectively are referred to as ("Network Systems").

For purposes of the present invention, the term "managed infrastructure" means, information technology, the physical hardware used to interconnect computers and users, transmission media, including telephone lines, cable television lines, and satellites and antennas, and also the routers, aggregators, repeaters, computers, network devices, applications, and other devices that control transmission paths, software used to send, receive, and manage the signals that are transmitted, and everything, both hardware and software, that supports the flow and processing of information.

As used herein. "event message" or "event" is defined as a change in state. An event is anything that happens or is contemplated as happening in message form or event form relating to managed infrastructure. An event can include a time stamp, and a name for the entity changing state.

Referring to FIG. 1, an event clustering system 10 (hereafter "system 10") is provided for clustering events received from a managed infrastructure 14.

In one embodiment system 10 includes an extraction engine 12 in communication with a managed infrastructure 12. Extraction engine 12 in operation receives messages from the managed infrastructure 14, produces events that relate to the managed infrastructure 14 and converts the events into words and subsets used to group the events into clusters that relate to failures or errors in the managed infrastructure 14. The managed infrastructure 14 includes physical hardware and supports the flow and processing of information.

As a non-limiting example, managed infrastructure system 14 hardware includes but is not limited to: computers, network devices, appliances, mobile devices, applications, connections of any of the preceding, text or numerical values from which those text or numerical values indicate a state of any hardware or software component of the managed infrastructure 14, and the like.

Managed infrastructure 14 generates data that includes attributes. As a non-limiting example, the data is selected from at least one of, time, source a description of the event, textural or numerical values indicating a state of the managed infrastructure 14.

In one embodiment system 10 makes physical changes in the managed infrastructure including but not limited to: managed infrastructure hardware changes that create physical and virtual links between the managed infrastructure and system 10 server, as well as change to links from the server to system 10 high speed storage.

Figure 2:
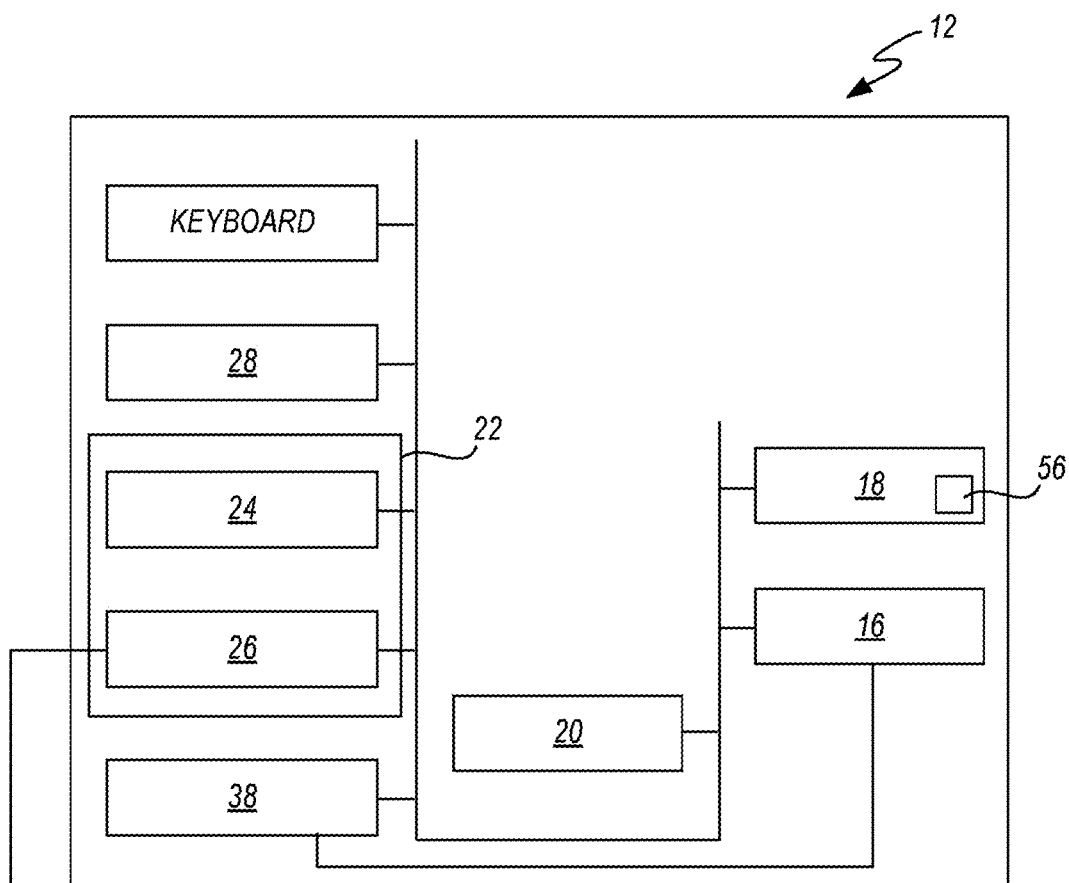
FIG. 2 illustrates a token counter, text extraction and implementation of Shannon entropy in one embodiment of the present invention.

In one embodiment extraction engine 12 communicates with managed infrastructure 14 across an IP network 15 at high speed and with low latency. As a non-limiting example high speed connection is in the gigabits and low latency is in the microseconds. As a non-limiting example high speed is at least 1 gigabit, and low latency is at least 10 microseconds In one embodiment, illustrated in FIG. 2, extraction engine 12 includes a central processor 16, a main memory 18, an input/output controller 20, an interface 22 that can be include an optional keyboard, a display 24, and a storage device 26. Storage device 26 can communicate through a system bus 28 or similar architecture.

Referring to Figure's 3(a) and (b) in one embodiment a software system 30 directs the operation of the extraction engine 12. Software system 30, which can be stored in memory 18, can include an operating system 32 and a shell or interface 34. A user can interact with the software system 30 via interface 22.

Application software 36 can be transferred from storage device 26 which can be via software system 30 into memory 18 for execution by extraction engine 12.

In one embodiment extraction engine 12 receives user commands and data through interface 22. These inputs can be acted on by extraction engine 12 with instructions from operating system 32 and/or application system 34. In one embodiment operating system 32 and/or application system 34 are included in operating software system 30.

The extraction engine 12 breaks event messages 40 into subsets of messages that relate to failures or errors in managed infrastructure 14. In one embodiment the extraction engine 12 breaks events 40 into subsets of messages relative to failure or errors in a managed infrastructure 14 via a message input mechanism, including but not limited to, an input/output controller 20, with or without operating system 32 and/or application system 34, that parses machine elements 38 from managed infrastructure 14 in memory 18. As a non-limiting example machine element are machine messages.

This can be achieved using operating system 32 and/or application system 34 as well as application software from storage device 26.

Figure 4:
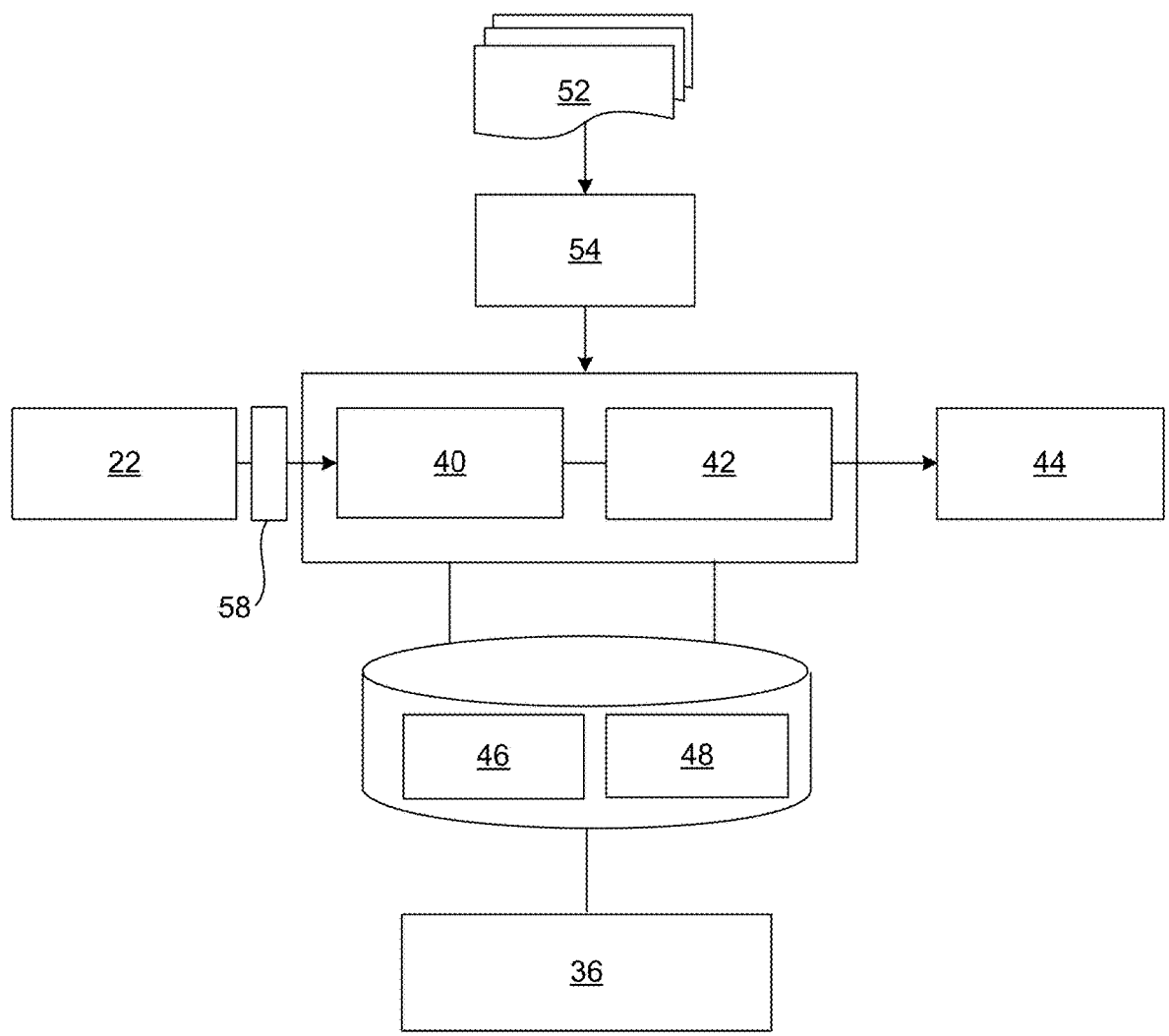
FIG. 4 illustrates processing of alerts, and a matrix M, in one embodiment of the present invention.
Figure 5:
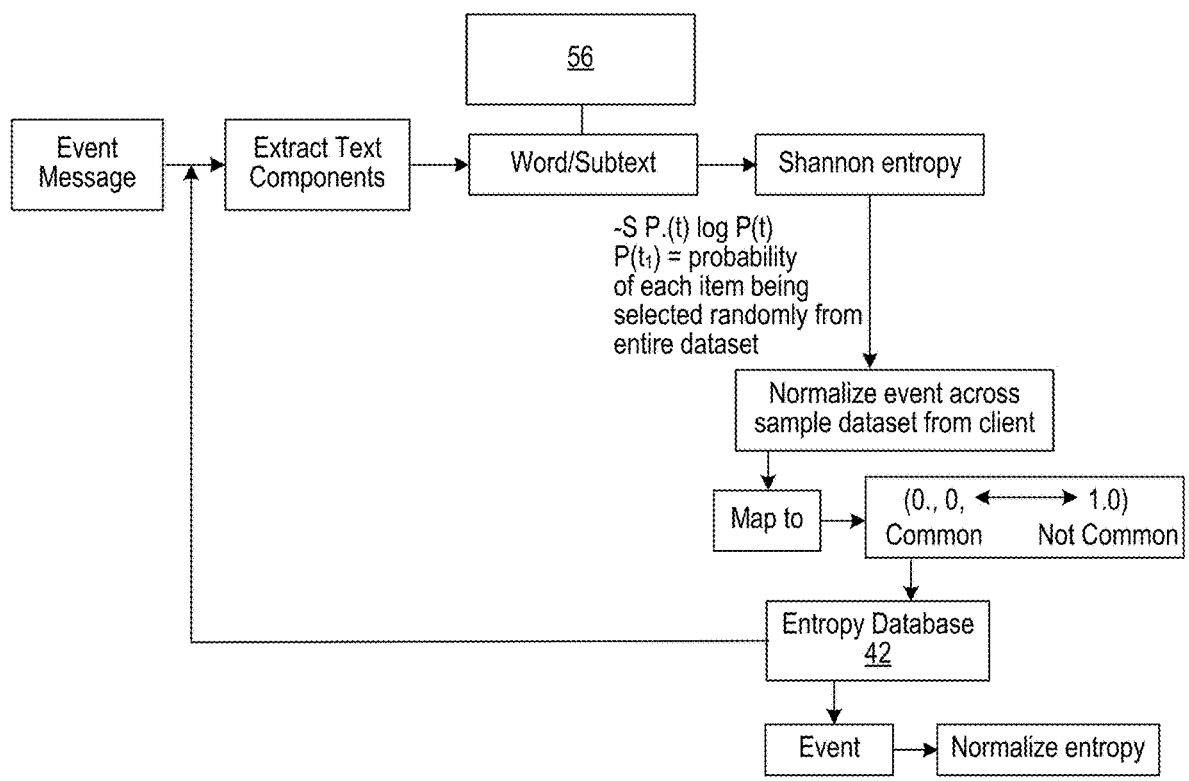
FIG. 5 illustrates an embodiment of a signalizer engine and the creation of alerts where member of cluster indicates common factors in one embodiment of the present invention.

In one embodiment the extraction engine 12 receives managed infrastructure data and produces events 40 as well as populates an entropy database 42, illustrated in FIG. 4, with a dictionary of event entropy that can be included in entropy database 42. This can be achieved with a token counter 58 as illustrated in FIG. 5.

In one embodiment, entropy database 42 is generated with the word and subtexts. As a non-limiting example, the entropy database 42 is generated using:

Shannon Entropy, −ln(1/NGen) and normalizes the words and subtexts as follows:

$$-\Sigma P(t)\log P(t)$$

where, P(t=probability of each item is selected randomly from an entire dataset.

In one embodiment entropy database 42 normalizes events across data, datasets, from the managed infrastructure 14. As a non-limiting example, normalized entropy for events is mapped from a common, 0.0 and a non-common, 1.0, as discussed hereafter. Entropy is assigned to the alerts. The entropy for each event is retrieved from an entropy dictionary, as it enters the system 10. This can be done continuously in parallel with other operation of the extraction engine 12 or run non-continuously.

In one embodiment entropy database 42 is generated with the word and subtexts. A network includes a plurality of nodes, which as a non-limiting example can be nodes 1-6. A non-directed graph is used to calculate graph entropy for each node in the graph.

The non-directed graph calculates graph entropy for each node in the graph as follows: (i) the source data is used to calculate the graph data; (ii) the non-directed graph is used to calculate the number of links and the clustering coefficient of the node; (iii) the number of links and clustering coefficient of the node together with the total number of links in the graph is then used to calculate an entropy value for each node.

In one embodiment, entropy normalizes events 40 across data, datasets, from the managed infrastructure 14. As a non-limiting example, normalized entropy for events 40 is mapped from a common, 0.0 and a non-common, 1.0, as discussed hereafter. Entropy is assigned to the alerts 20. The entropy for each event is retrieved from entropy database 42 as it enters the system 10. This can be done continuously in parallel with other operation of the extraction engine 12 or run non-continuously.

An N event value is attached to every event of the entropy graph of the source node. Entropy values are used as a cut off to ignore events 40 from unimportant nodes to classify events 40.

As a non-limiting example, the entropy database 42 is generated using Shannon Entropy, −ln(1/NGen) and normalizes the words and subtexts as follows:

$$-\Sigma P(t)\log P(t)$$

where, P(t,)=probability of each item is selected randomly from an entire dataset.

In one embodiment graph entropy is used as a classification mechanism for elements for a network.

As recited above, system 10 is provided for clustering events 40 received from managed infrastructure 14. In this embodiment graph entropy is utilized for event clustering.

The graph entropy functions of the paths can be rewritten as the following equation:

$$H(G) = \Sigma m, n=1 \cdot \text{quadrature} \cdot U \cdot \text{quadrature} \cdot P(um\ un \ldots)\log(1/P(um\ un \ldots )),$$
$$m \cdot \text{notequal to } n$$

where $P(u_m u_n)$ can be rewritten as the following equation by combining the aforementioned equation $$P(u_m u_n) = A(u_m) y(u_m, u_n) A(u_n)$$

As a non-limiting example an inference is created from a distribution of the clustering events 40 received from managed infrastructure 14 relative to the nodes, and using graph, with the distribution entropy measured.

As a non-limiting example the entropy of the frequency distribution of connections of the nodes can be used.

As a non-limiting example the events 40 less significant can be can be −log(p), and with a low probability represented as (p~0) and more significant events 40 are classified as very probable (p~1).

The average is the sum over all nodes i of $$p\_i * \log(p\_i)$$

or:

$$\text{average}(-\log(p\_i))$$

where p_i is the number of connections of the i-th node divided by the total number of connections. The entropy is the uncertainty of the nodes relative to the clustering events 40 received from managed infrastructure 14.

As a non-limiting example this can be achieved by using an IP protocol stack 46 that communicates with managed infrastructure network protocols 48. The managed infrastructure network protocols 48 can be in communication with application software 36. In one embodiment IP protocol stack 46 can be executed using one or more of In one embodiment embedded agents 50 in hardware components 52, which can be included in extraction engine 12, gather attributes 54 to a managed infrastructure 14 system health to generate data that includes attributes 54. As non-limiting examples hardware components 52 include but are not limited to: computing devices, network switches and devices, storage devices, environmental sensors, power sensors and the like. In one embodiment hardware components 52 can be included in operating system 32 and/or application system 34 and the like.

In one embodiment interface 22, which can include display 24, serves to display results and the user can supply additional inputs or terminate a given session.

In one embodiment operating system 32 can switch between a manual mode and an automatic mode based on constant monitoring. In one embodiment application system 34 can include instructions such as the operations described herein, including but not limited to extracting text components from event 40 messages and convert them into words and subtexts.

In one embodiment operating system 32 and/or application system 34 then reformats data from the event 40 messages to create reformatted data. In one embodiment, the reformatted data is received at bus 28.

In one embodiment extraction engine 12 has a library 56 stored in memory 22.

As a non-limiting example library 56, which can be part of database 42, recognizes sub-categories of messages. As a non-limiting example this is used to reformat data from the event 40 messages to create reformatted data.|

The subsets and/or sub-categories of messages can be grouped into clusters. In one embodiment the grouping into clusters is achieved using operating system 32 and/or application system 34.

Figure 6:
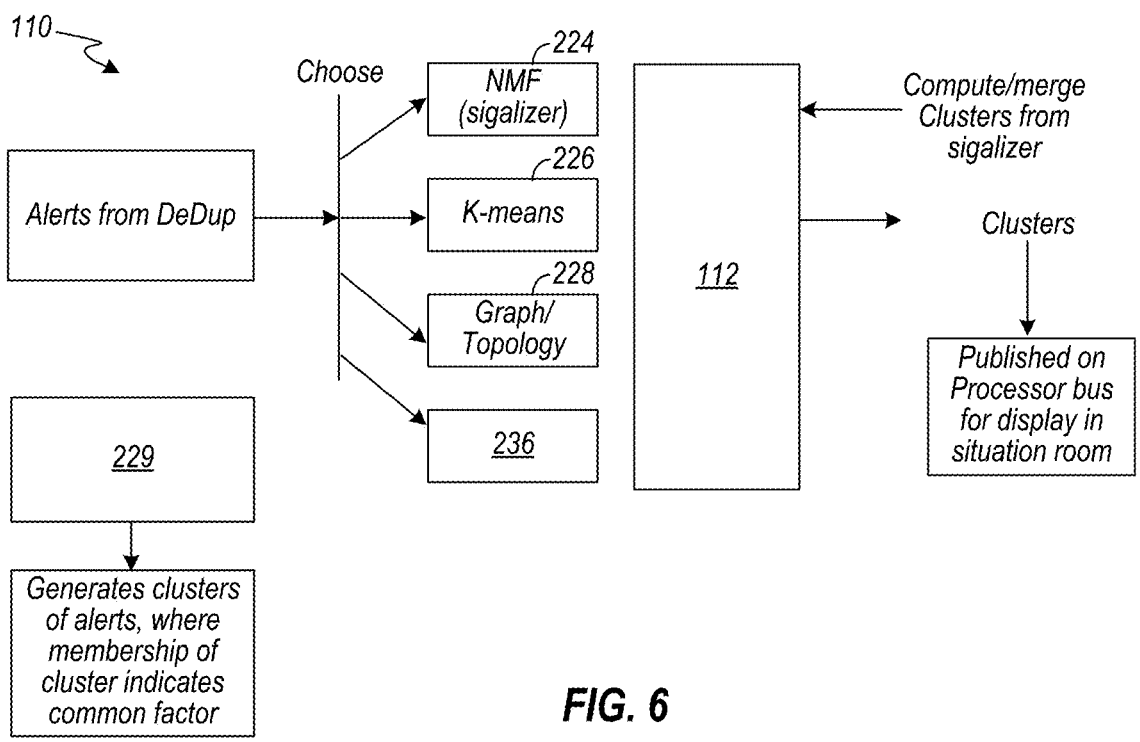
FIG. 6 illustrates k-mean decomposition, a created graph with graph coordinates in one embodiment of the present invention.

Referring to FIG. 6 one or more signalizer engines 110 (hereafter "signalizer engine 110") can include one or more of an NMF engines 224, a k-means clustering engine 226 and a topology proximity engine 228. The signalizer engine 110 determines one or more common steps from events 40 and produces clusters relating to events 40. Each signalizer engine 110 includes a processor and an arithmetic logic unit "ALU". Examples of suitable ALUs are found in EP 0171190 and EP 0271255, fully incorporated herein by reference. In one embodiment, signalizer engine 110 determines one or more steps from events 40 and produces clusters relating to the alerts and or events 40.

The signalizer engine 110 determines one or more common characteristics of events 40 and produces clusters of events 40 relating to failure or errors in the managed infrastructure 14. Membership in a cluster indicates a common factor of the events 40 that is a failure or an actionable problem in the physical hardware managed infrastructure 14 directed to supporting the flow and processing of information.

The topology proximity engine 228 uses a source address for each event 40 and a graph topology of the managed infrastructure 14 that represents node to node connectivity, of the topology proximity engine 228, to assign a graph coordinate to the event with an optional subset of attributes being extracted for each event and turned into a vector. The topology engine 228 inputs a list of devices and a list a connection between components or nodes in the managed infrastructure.

The k-means clustering engine 226 uses the graph coordinates and optionally can use a subset of attributes assigned to each event to generate a cluster to bring together events 40 whose characteristics are similar. NMF engine 224 factors a matrix M into A and B, where A is inspected, and substantially significant clusters are extracted, and B is used to assign a start and end times for each cluster. An output of clusters is produced. In response to production of the clusters one or more physical changes in one or more managed infrastructure hardware elements is made.

It will be appreciated that signalizer engine 110. NMF engine 224, k-means clustering engine 226 and topology proximity engine 228 can have all or some of the elements similar to those of extraction engine 12 including but not limited to: a central processor, a main memory, an input/output controller, an interface that can be an optional keyboard, a display, a storage device, computer software system, directing operation of relevant engine 224, 226 and 228, a software system, operating system, software transferred from a storage device into memory for execution the associated engine 224, 226 and 228, an input/output controller with or without an operating system, application system, and the like. In one embodiment subsets of messages are grouped into clusters by using a signalizer engine 110. FIG. 6, that has an array of engine components similar or the same as those in extraction engine 12, including but not limited to, computing devices, network switches and devices, storage devices, environmental sensors, power sensors and the like, across a network volatile memory to analyse and create alerts.

In one embodiment a computer software system directs the operation of the signalizer engine 110. Software system, which can be stored in memory, a disk memory and the like, can include an operating system, a shell or interface and an application system.

A user can interact with software system with via the interface. Application software can be transferred from storage device into memory for execution by signalizer engine.

In one embodiment signalizer engine 110 receives user commands and data through an interface. These inputs can be acted by signalizer engine 110 with instructions from operating system and/or application system. In one embodiment operating system and/or application system 1 are included in operating system.

In one embodiment signalizer engine with the array of engine components like those of extraction engine 12, groups subsets of messages into clusters.

In one embodiment signalizer engine 110 includes an array of engine components 112 that perform the grouping of message subsets into clusters. In one embodiment the engine components can include the operating system, application system and the like. In one embodiment engine components 112 include but are not limited to: computing devices, network switches and devices, storage devices, environmental sensors, power sensors and the like.

In one embodiment signalizer engine 110 includes a plurality of engines as illustrated in FIG. 6. As non-limiting examples, an NMF engine 224, a k-means clustering engine 226 and a topology proximity engine 228 are provided. Each signalizer engine 110 includes a processor and an arithmetic logic unit "ALU". Examples of suitable ALUs are found in EP 0171190 and EP 0271255, fully incorporated herein by reference. In one embodiment, signalizer engine 110 determines one or more steps from events 40 and produces clusters relating to the alerts and or events 40.

Signalizer engine 110 determines signalizer common steps to ascertain how many clusters to extract from events 40. Membership in a cluster indicates a common factor, which can be a failure or an actionable problem in the managed infrastructure 14. In one embodiment signalizer engine 110 generates clusters of alerts. In one embodiment, an independent failure count detection engine 229 is used to produce common steps designated as "k" from events 40. The independent failure count detection engine 229 can use SVD decomposition. The SVD decomposition is a continuation of a determination of signalizer 110 common steps.

K is the number obtained from the common signalizer steps. As a non-limiting example, common signalizer steps are designated as Mij, where i are unique events 40 and are the rows of M, j represents the time buckets in M. A value for Mij equals the number of occurrences of event i in time bucket j. This is the common input to the signalizer engines 110.

Figure 9:
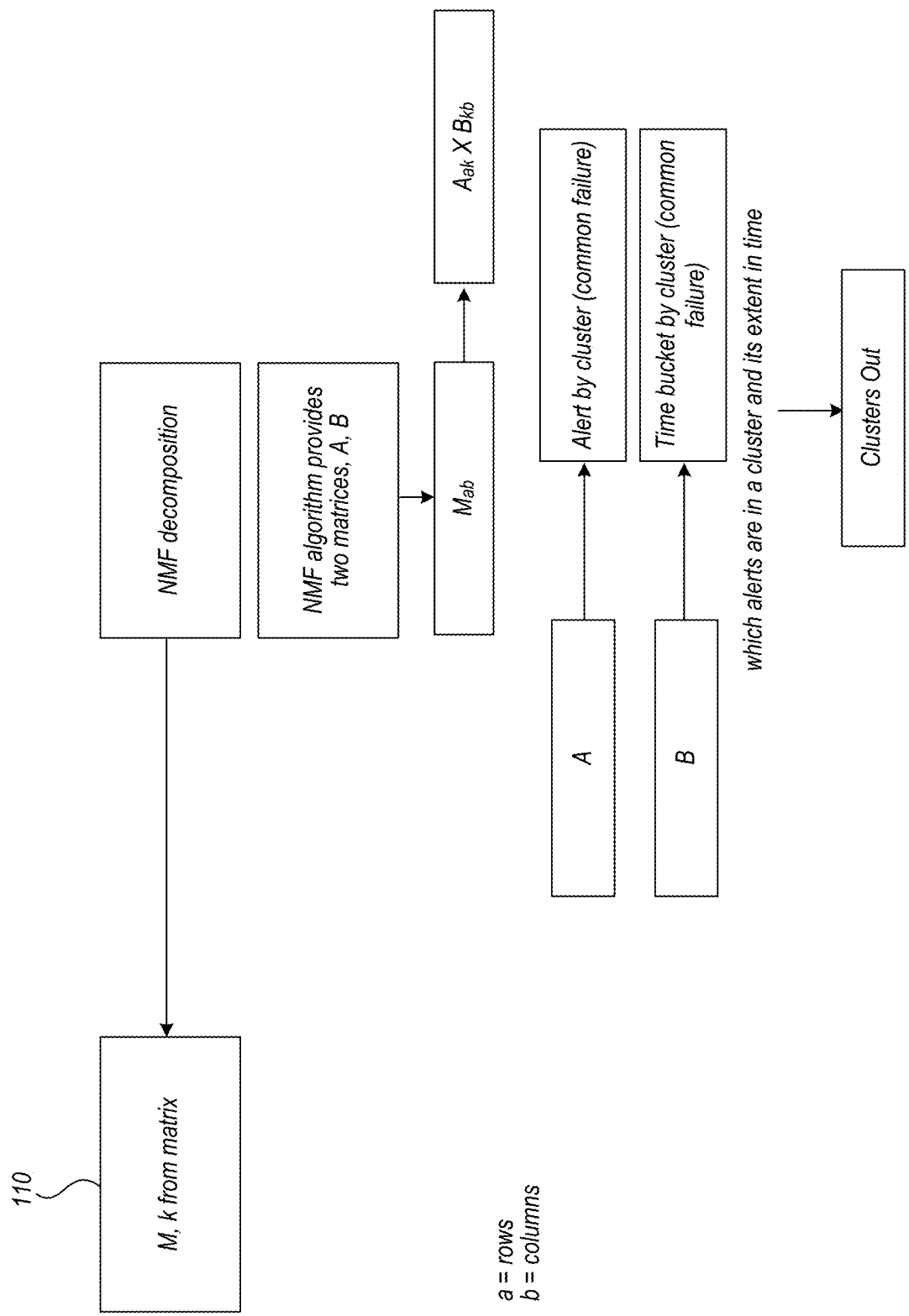
FIG. 9 illustrates the interaction of link access modules with a message bus, algorithm engines, cluster creation and a situation room in one embodiment of the present invention.

In one embodiment topology proximity engine 228 creates a graph coordinate system, FIG. 9. In one embodiment topology proximity engine 228 uses a source address for each event to assign a graph coordinate 230 of a graph 232, with nodes, to the event with an optional subset of attributes being extracted for each event and turned into a vector. The topology proximity engine 228 executes a graph topology and proximity algorithm.

Figure 7:
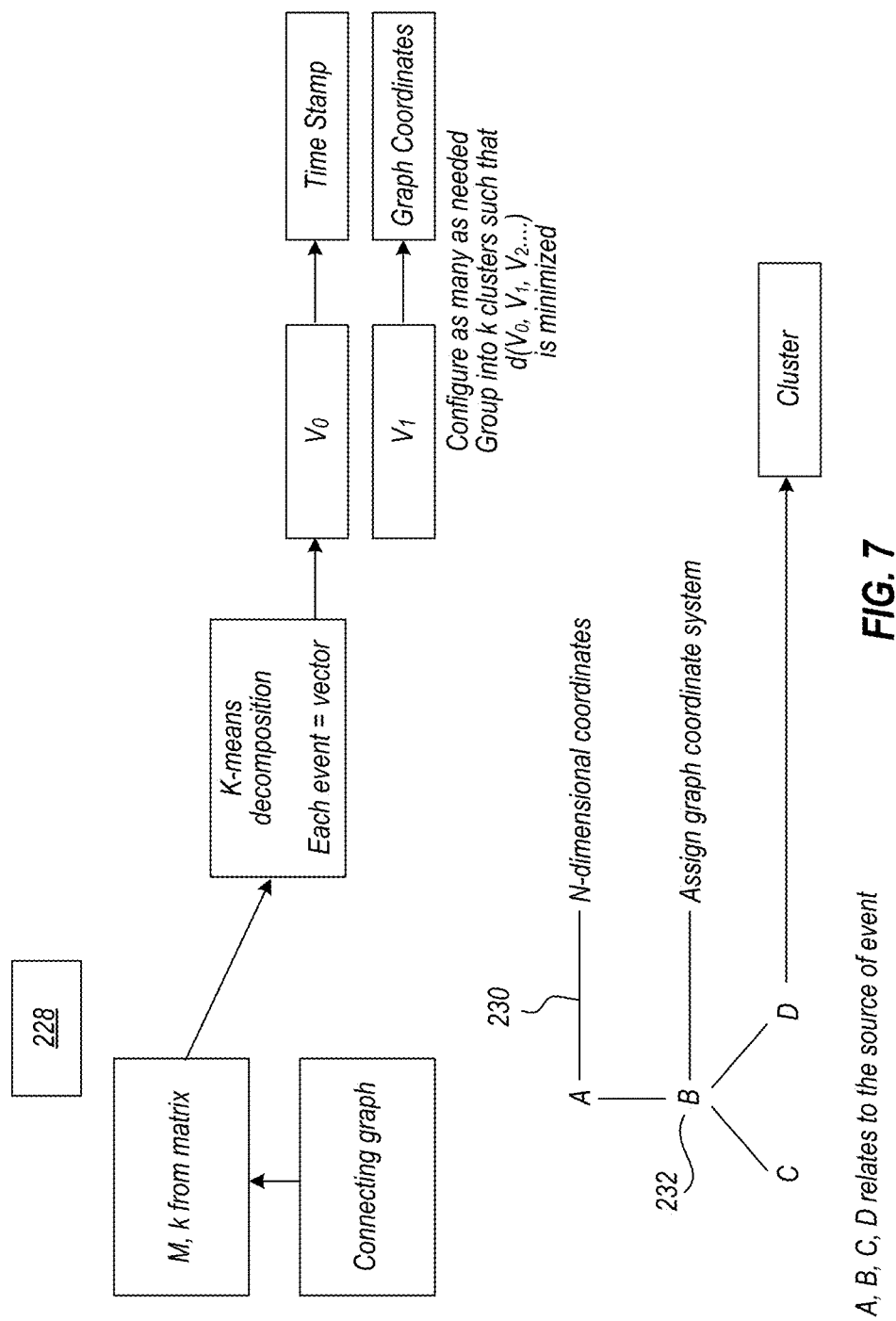
FIG. 7 illustrates one embodiment of alert mapping and vector generation in one embodiment of the present invention.

Mik undergoes K-means decomposition, FIG. 7. Each event is a transformed vector, where (Vo is transformed time stamp. Vi,–Vn and so forth are transformed graph coordinates 234) are grouped into k clusters such that d(Vi, V2,) is minimized. In one embodiment, the topology engine 228 inputs a list of devices and a list of hops, where hop is a connection between components or nodes in the managed infrastructure 14.

As a non-limiting example, the graph 232 can be constructed of any number of points or nodes: A, B, C, and D, which relate to the source of an event. The result is a connecting graph 232. FIG. 7.

The topology proximity engine 228 receives the coordinate's mapping, and clusters are generated. V base nodes calculates minimum hops to every other node which gives coordinate and the graph coordinates 230 are mapped.

In one embodiment, the k-means clustering engine 226 uses the graph coordinates 230 to cluster the events 40 using a k-means algorithm to determine hop proximity of the source of the event.

M,k is processed by the signalizer engine 110. Mab is transformed to Aak

Bkb, where a equals rows, and b equals columns, x defines the normal operation of matrix multiplication. M is the matrix as stated above, and k is as recited above.

Figure 8:
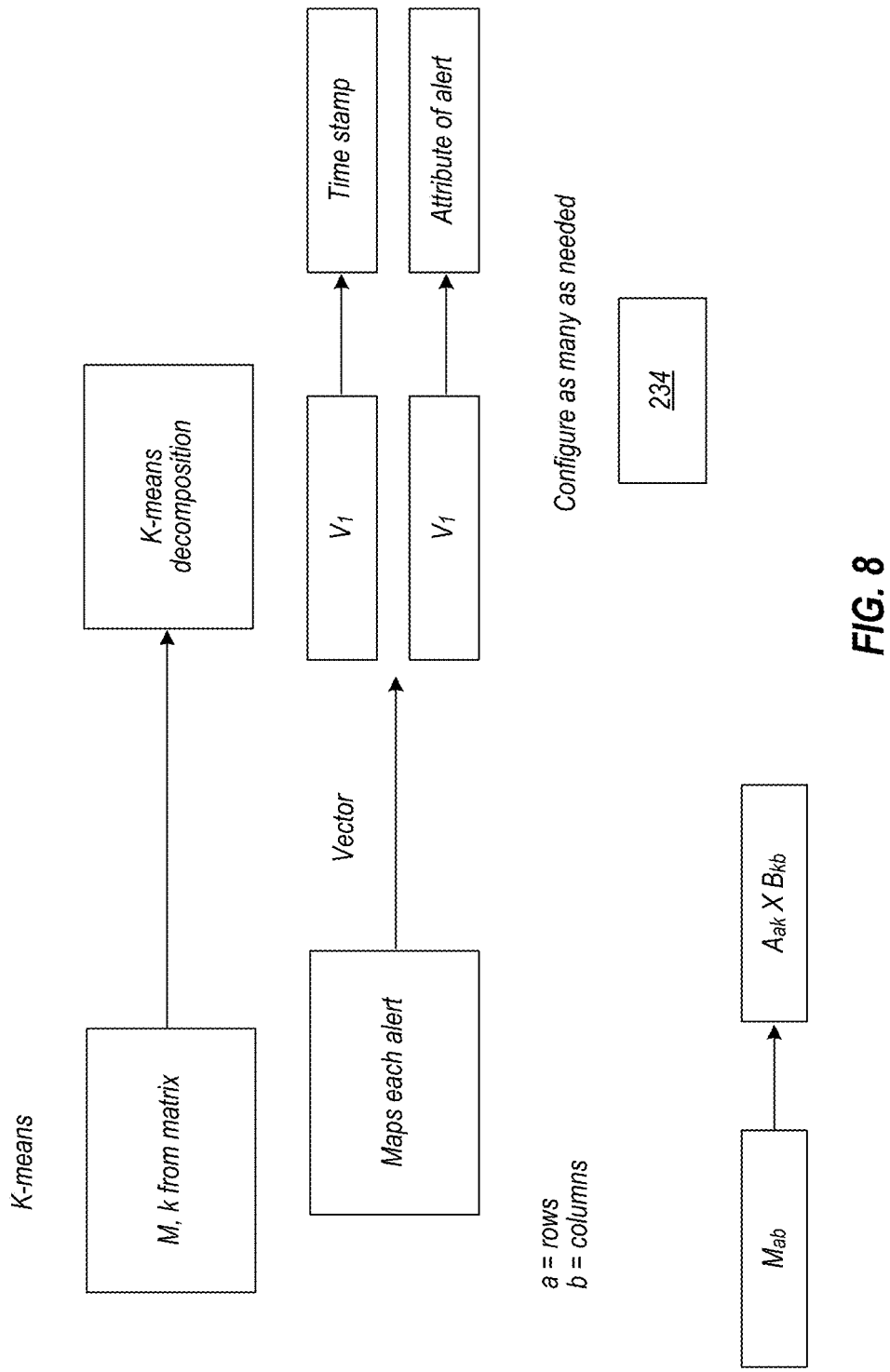
FIG. 8 illustrates NMF decomposition in one embodiment of the present invention.

The NMF algorithm produces two matrices. A and B. FIG. 8. A represents by cluster (a common failure) and B represents time bucket by cluster (a common failure). In one embodiment, the NMF engine 224 factors the matrix M into A and B, where A are deemed to be significant and are extracted, e.g., clusters deemed significant are extracted. The system 10 looks for significantly high values as compared to statistically significant values in the A and B matrix. If they are not statistically significant, they are dropped. The statistically significant elements of M are used to determine a cluster. As a non-liming example, the determination of significance is based on high signatures in the matrix. As above, those that are not high enough are dropped and not included in the output of clusters which is produced.

Each alert is mapped to a vector, V0-Vn, where Vo is a time stamp t; Vi is an attribute of alert. In one embodiment, attributes of an event are mapped to a vector V.

The vectors are grouped into k clusters using k-means such that d (Vi, V2,) is a minimum in its own cluster.

In one embodiment the grouping is executed also using a standard Euclidian distance. In one embodiment, a weighting of components is supplied. System 10 transforms the alert attributes into a number value that is used as the components of the vector. As a non-limiting example, an alert attribute is a textual value. In one embodiment, similar attributes are mapped to numbers that are also similar or close relative to the graph, with the closeness being dynamic and can be predetermined, changed, modified, set, and the like.

In one embodiment of the matrix. M, columns are slices in time and the rows are unique alerts. A unique alert is received from the deduplication engine 23 which eliminates duplications and creates unique alerts.

In one embodiment, the matrix. M is created with alert/time and a fixed number of common alerts. The matrix M can be dynamic and change in time. The matrix M includes rows that can be unique alerts. The matrix includes columns that are time buckets, and several occurrences are plotted.

Evaluated events 40 are either discarded or passed to clusters with alerts are collected into time buckets and mapped in the matrix M. In one embodiment, a bucket width is a parameter that can be an input to the signalizer engine 110.

Figure 10:
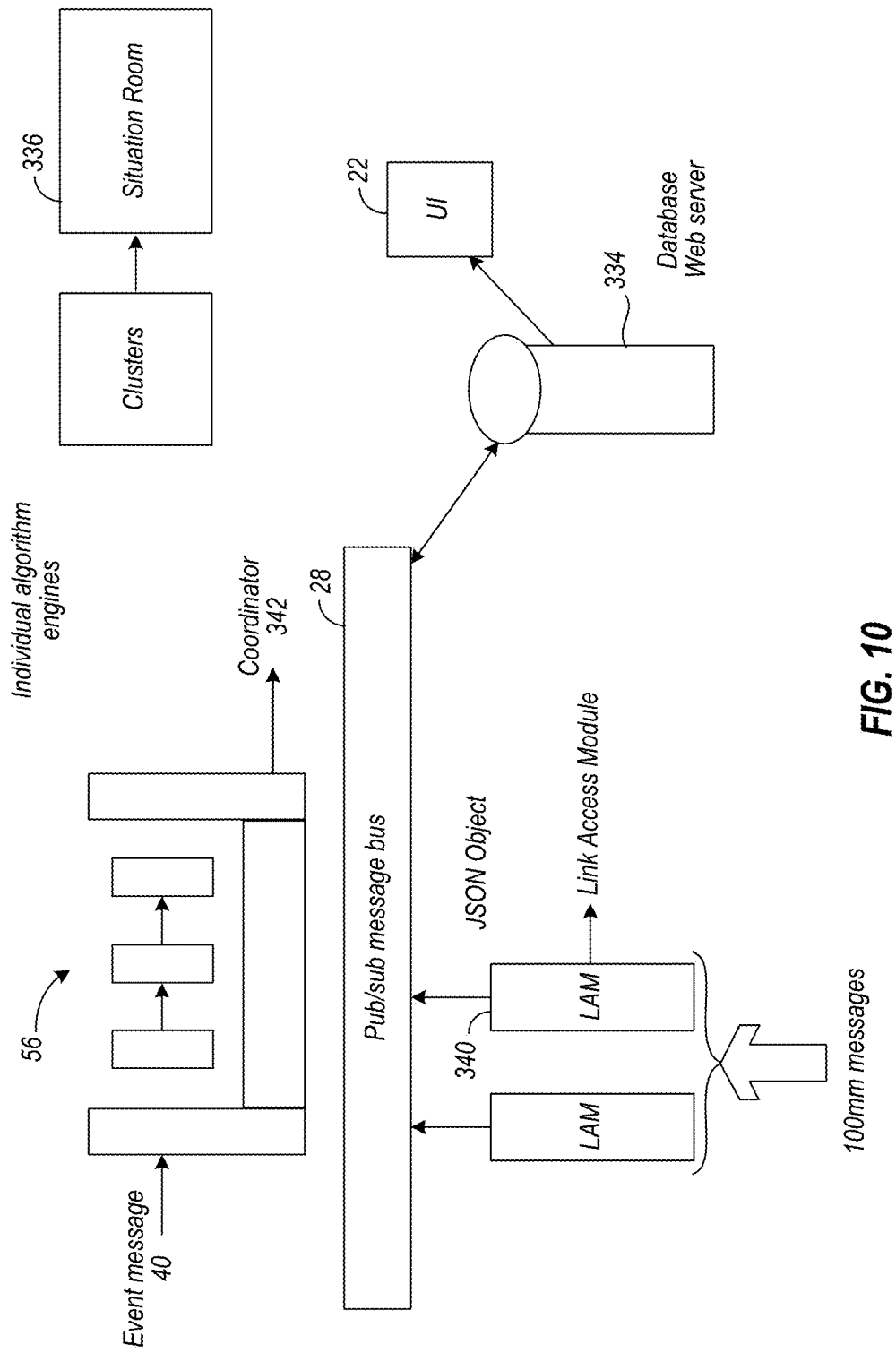
FIG. 10 illustrates one embodiment of a deduplication engine that can be used with the present invention.

Outputs from the signalizer engines 110 are received at a compare and merge engine 334. The compare and merge engine 334 communicates with one or more user interfaces 22 in the situation room 336. FIG. 10. The three signalizer algorithms are used with the comparison or merger engine 334 and clusters are published on system 10 for display in the situation room 336.

As a non-limiting example, the bus 28 can be a publication message bus. As a non-limiting example, the bus 28 processes anything that goes from A to B, and from B to A. In one embodiment, a data bus web server is coupled to user interfaces.

As illustrated in FIG. 10, a plurality of link access modules 340 are in communication with the data bus 438 and receive messages/events 40. Events 40 are received by a coordinator 342 that executes clustering of the events 40.

In one embodiment, normalized words and subtexts are mapped to a common, 0.0 and a non-common, 1.0, as illustrated in FIG. 5.

The alerts can be run in parallel with the activities of the system 10. The alerts are passed to the signalizer engine 110, FIG. 6.

Figure 11:
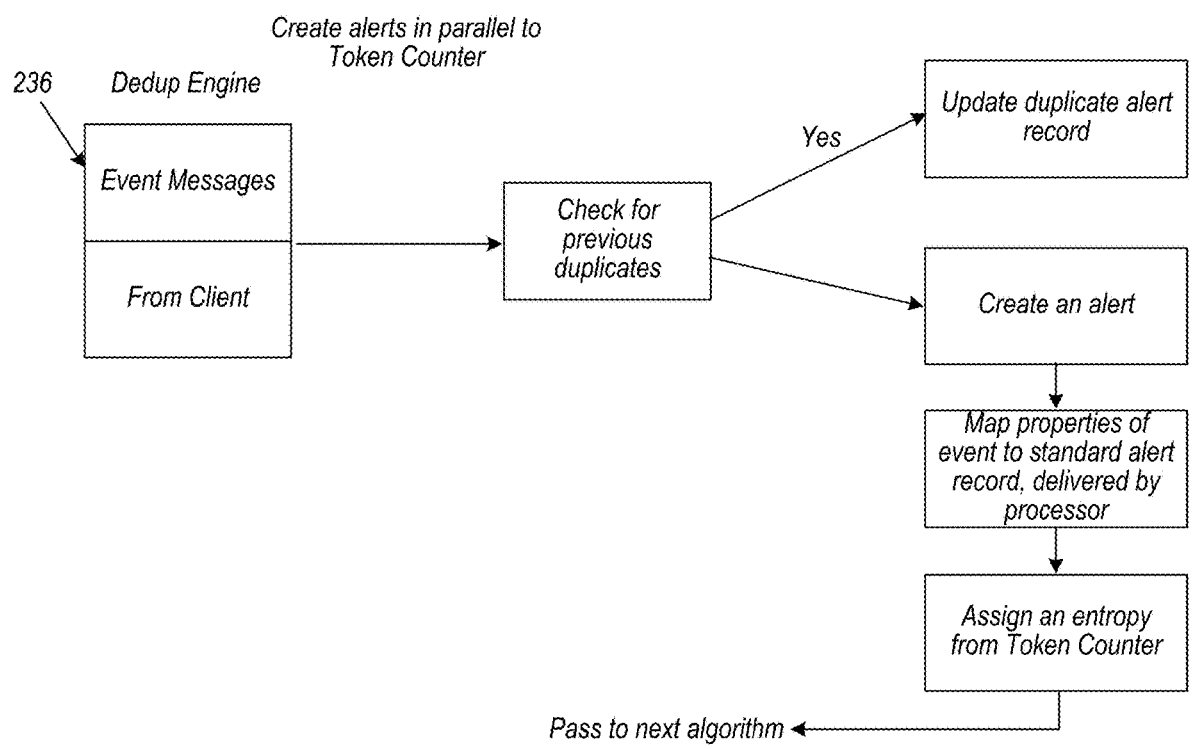
FIG. 11 illustrates one embodiment of actions that can be taken following event clustering generation.

In one embodiment, deduplication engine 236, FIG. 11, is used for event messages of data streams received from the client. The deduplication engine 236 eliminates duplicate copies of repeating data. In one embodiment, the deduplication engine 236 reduces several bytes in network data transfers that need to be sent.

A computer scripting language script language can be included that alters the events 40 or flow of events 40. As non-limiting examples, the scripting language can be, Java, C, C++, C #, Objective-C. PHP, VB, Python, Pearl, Ruby, JavaScript and the like.

In one embodiment, the NMF, k-means, and/or topology proximity algorithms are optionally repeated. The repeating can be performed by varying k from the previously performed common steps in the signalizer engine 120, and optionally along with the SVD decomposition.

Optionally, generated clusters are tested against a quality function supplied by the system 10 which evaluates a cluster's uniformity. In one embodiment, the system 10 selects a best set clusters against the quality clusters.

As a non-limiting example, clusters are examiner against a customer supplied configuration database for each source of an event. As a non-limiting example, the examining can be performed to determine: a type of device; impacted users; relevant support experts, and the like, FIG. 12.

Example 1

As a non-limiting example, the NMF algorithm can be executed as follows:

Let Mij be an x p non-negative matrix. (i.e., with M>0, and k>0 an integer). Non-negative Matrix Factorization (NMF) consists in finding an approximation $$X = W H (A B), \quad (1)$$

where W, H are n k and k p non-negative matrices, respectively. In practice, the factorization rank r is often chosen such that r<<min(n, p) but is determined.

The main approach to NMF is to estimate matrices W and H as a local minimum: 1) M=AB A, B seed randomly tentatively adjusts A, B until the Frobenius distance ∥M−A B∥ is minimized where D is a loss function that measures the quality of the approximation. Common loss functions are based on either the Frobenius distance or the Kullback-Leibler divergence.

R is an optional regularization function, defined to enforce desirable properties on matrices W and H, such as smoothness or sparsity.

Example 2

As a non-limiting example, a k-means algorithm is used as follows:

Given a set of event vectors $(x_1, x_2, \ldots, x_n)$, where each observation is a d-dimensional real vector, k-means clustering aims to partition the n observations into k sets (k≤n) $S=\{S_1, S_2, \ldots, S_k\}$ so as to minimize the within-cluster sum of squares (WCSS):

$$\operatorname*{argmin}_S \sum_{i=1}^{k} \sum_{x_j \in S_i} \|x_j - \mu_i\|^2$$

where $\mu_i$ is the mean of points in $S_i$.

Figure 13A:
FIG. 13($a$)-($c$) illustrate an example process that may be implemented using the systems shown in FIG. 1.
Figure 13B:
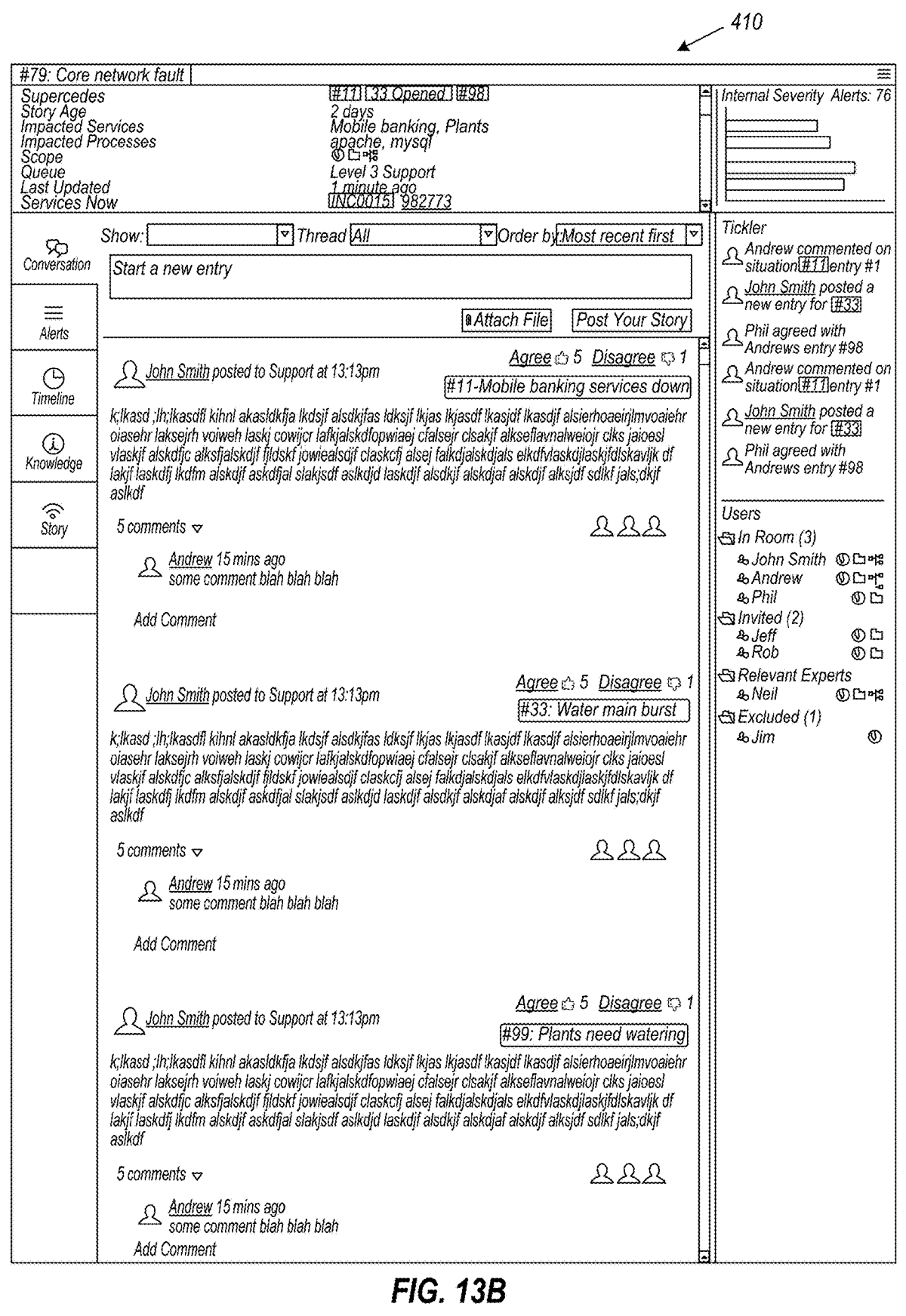

In one embodiment, illustrated in FIGS. 13(a) and 13(b) a dashboard 410, associated with a situational room, is included which allows entities and/or people to manipulate messages/events 40 from managed infrastructure, alerts or events 40.

Figure 14:
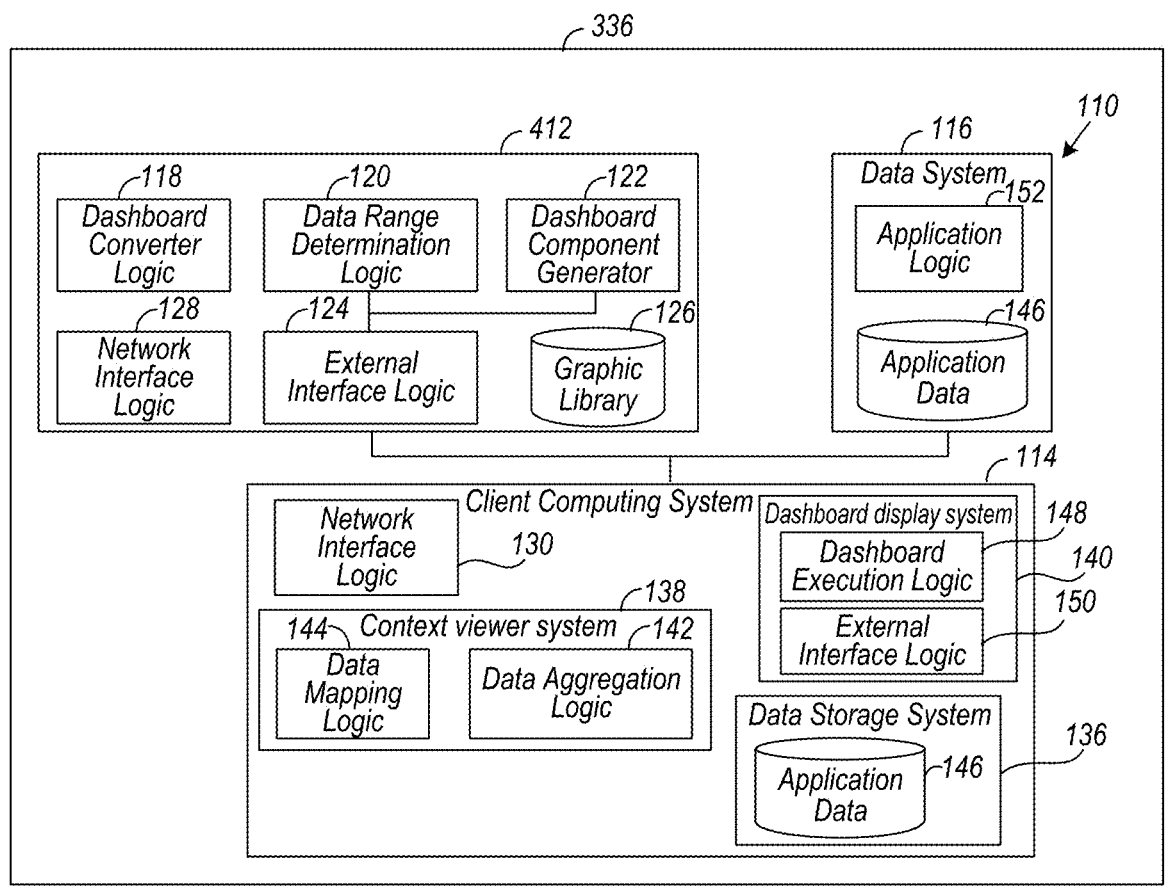
FIG. 14 is an example software architecture diagram that may be implemented using the systems shown in FIG. 1.

As a non-limiting example an alert engine 411 receives the events 40 and creates alerts that are mapped into a matrix "M" of events 40, as illustrated in FIG. 14. As a non-limiting example, Mik is the matrix of events 40.

In one embodiment of the situation room 336, as illustrated in FIG. 1. (a) system 10 is provided for creating, and displaying in a dashboard directed to the system 10 from clustering messages received from the managed infrastructure 14, also known as the dashboard system for the situation room 336.

In one embodiment, illustrated in FIG. 14, situation room 336 has a display that can be interactive. Situation room 336 can be coupled to or includes a dashboard design system 412, display computer system 414, and a data system 416.

In one embodiment, system 10 includes dashboard converter logic 420, data range determination logic 432, dashboard component generator 422, external interface logic 424, graphic library 426, and network interface logic 428. In one embodiment, the system includes data processing computing systems.

In one embodiment, the dashboard file converter logic 419, which as a non-limiting example converts the situations and alerts 40 from system 10 from clustering messages received from the managed infrastructure 14 data structures and data, to be compatible with or match with the interface logic 424.

In one embodiment, the logic 419 provides communication between the graphical dashboard and the problem walls from clustering messages received from the managed infrastructure 14.

The problem walls from clustering messages received from the managed infrastructure 14 are provided as disclosed above.

In one embodiment, the logic 432, dashboard component generator 422 and the external interface logic 424 are each used for designing the problem walls from clustering messages received from the managed infrastructure 14.

A dashboard or SWF file can be included that establishes a data range, type of components and the external interface. In one embodiment, the logic 432 is used for a data range in a spreadsheet associated with the dashboard file used to generate a visual display.

In one embodiment, a dashboard component generator 422 is provided that allows a user to place problem walls from clustering messages received from the managed infrastructure 14 components with various attributes onto a canvas. The canvas can be a space where various visual components are.

In one embodiment, the user can choose components directed to problem walls from clustering messages received from managed infrastructure 14 elements from different components. These can be included in a panel and the user can then place them on the canvas in any way that the user desires.

In one embodiment, the components are provided by the client, by the system, by third parties, and from third parties. Examples of other components include but are not limited to, graphs, style of presentation, additional information, comparisons, trends, artistic elements, text, and the like. In some embodiments, the user, or client can select the background, margins, presentation of elements and the like.

In one embodiment, an external interface logic 424 is provided. The interface logic allows a dashboard to provide data ranges, permutations, trends, activities, and the like associated with problem walls from clustering messages received from the managed infrastructure 14. In one embodiment, interface logic 424 allows the business application software to export application data to be displayed in a dashboard in an interactive visual format.

In various embodiments, a network interface logic 428 and 430 allows for connectivity of the dashboard design system 412, display computer system 414 and data system 416 to each other, or to public networks. In one embodiment, a graphical file that has been configured by the computer system 412 is stored in the data storage system 436. In one embodiment, the graphic file is used for data mapping, both during and after design time, and can generate the display during a period of execution. The external adapter can be utilized for communication between the data storage system 436 and the graphical file.

In one embodiment, network interface logics 428 and 430 allow computer systems 412, 414 and 416 to connect to each other and the other computer systems. As a non-limiting example, the network interface logic 428 and 430 can be one or more computers or web servers that provide a graphical user interface for clients or third parties that access the subsystems of system 412, 414 or 416 through the Network System or a Network System protocol. The network interface logic 428 and 430 can include other logics configured to provide interfaces for other types of devices, including but not limited to mobile devices, server-based computing systems, and the like.

As a non-limiting example, in one embodiment, the display computer system 414 includes, network interface logic 430, context viewer system 438, data storage system 436 and dashboard display system 440.

In another embodiment, the dashboard display system 440 is included in the context viewer system 438, and be executed in a machine, one or more display and other computers, with machine-readable storage media, cache, memory, flash drive or internal or external hard drive or in a cloud computing environment, non-transitory computer readable media or non-transmissible computer-readable media, with stored instructions executed by the machine to perform the operations. In one embodiment, the context viewer system 438 is a program product that performs various processing functions. As non-limiting examples, these functions can include, receiving data from the data source, preparing data by aggregating, providing access to visualization capabilities, and the like.

In one embodiment, the data storage system 436 stores data related to problem walls from clustering messages received from the managed infrastructure 14 applications executed on the display computer system 414.

In one embodiment, the data storage system 436 stores problem walls from clustering messages received from the managed infrastructure 14 data or statistical data. As a non-limiting example, the dashboard display system 440 communicates with the display computer system 414 to display problem walls from clustering messages received from managed infrastructure 14 data in a dashboard in a visual manner or in visual components using graphics. Displaying problem walls from clustering messages received from managed infrastructure 14 data graphically may include displaying bar graphs and/or pie charts or other visual displays. In order to generate the dashboard display, the client can map dashboard data fields to the problem walls from clustering messages received from managed infrastructure 14 data fields. This allows access of data from problem walls from clustering messages received from managed infrastructure 14 without data replication.

Embodiments of the data storage system 436 may store a variety of information including application data in database 430. The application data database 430 may receive data from the data system 416. The data storage system 436 may provide data to the context viewer system 438. More specifically, the data storage system 436 may provide data to the data aggregation logic 442. The data storage system 436 may receive appropriate data mapping instructions from the data mapping logic 444 and query the data system 416 to correlate the data from one mapped field in the dashboard tool to the mapped fields in the application data 446.

Embodiments of the dashboard display system 440 may be provided on the display computer system 414. In an example embodiment, the dashboard display system 440 may transfer data from various data sources or data from various applications to external data ranges of the graphic file and display the graphical interface during runtime operations. The dashboard display system 440 may include all the features discussed above about the dashboard design system 412. Also, the dashboard display system 440 also includes a dashboard execution logic 448 and external interface logic 450. The external interface logic 450 may have similar features as the external interface logic 424 of the dashboard design system 412. The external interface logic 450 may expose selected data ranges of the dashboard to the business software data. The external interface logic 450 may allow the business application software to export application data to be displayed in the dashboard in a visual format instead of a textual format. During runtime when displaying the dashboard in the business application, the dashboard execution logic 448 is configured to receive the data from the business application and generate a Flash Island interactive display as designed by the dashboard design system 412 or dashboard display system 440.

The data system 416 includes an application logic 452 and application data 446. The data system 416 may be configured to provide data and communicate with the display computer system 414. The application logic 452 is the server side of the application that provides back end information to the context viewer system 438. For example, the application logic 452 may comprise an Enterprise Resource Planning (ERP), Customer Relation Management (CRM) or Business Intelligence (BI) system. Business intelligence may refer to computer-based techniques used to analyse business data, such as sales revenue by products and/or departments or associated costs and incomes. The application data 446 may include relational or other types of databases. The application data 446 includes various fields that may be mapped to the fields exposed by the external dashboard interface.

Figure 13C:
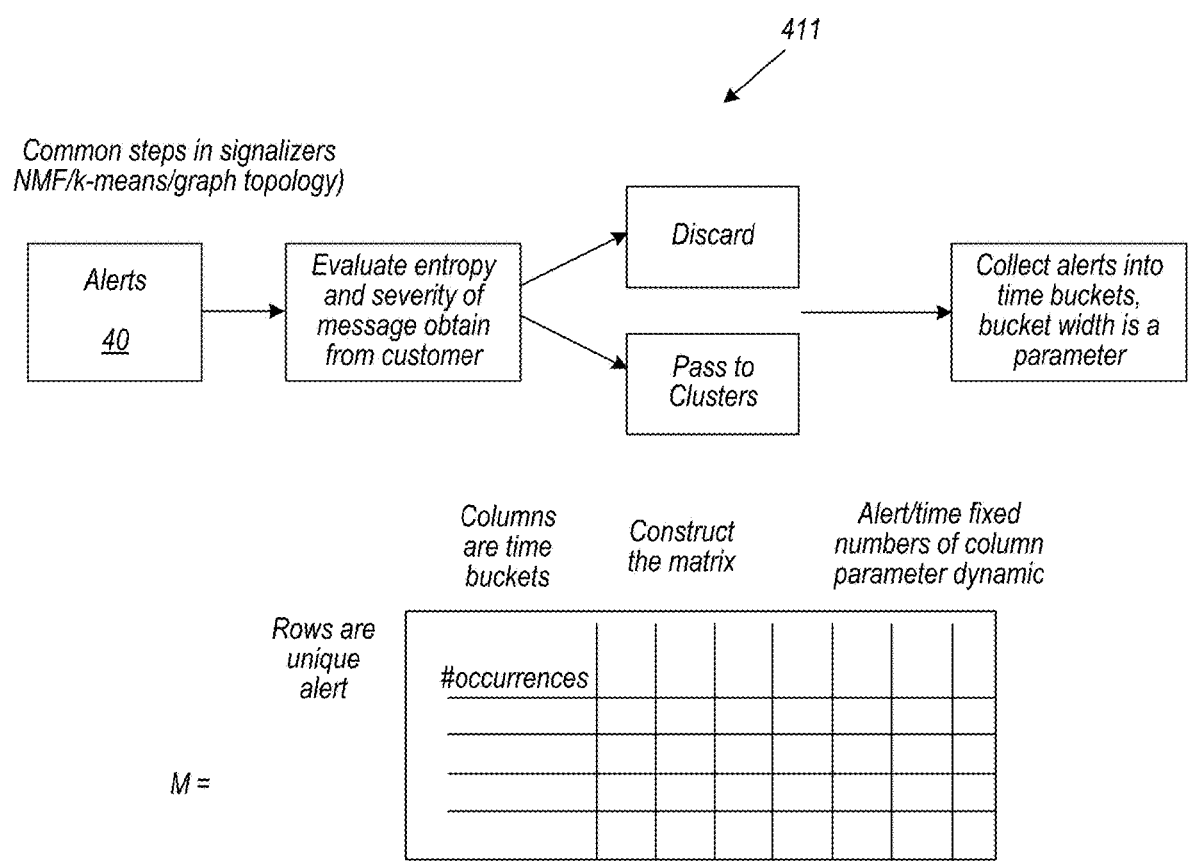

FIG. 14 is an example process that may be implemented using the system shown in FIG. 13. Initially, at step 454, in an example embodiment a dashboard design user may build a dashboard using a dashboard building software. The dashboard design user may configure the dashboard during design time. In an example embodiment, design time may include the design user configuring the dashboard layout and exposing a related data range. The dashboard design system 412 may be used to create a dashboard layout. Building the dashboard includes placing components on the canvas and configuring the properties associated with those components. As discussed above, the components may be among other components, a chart or graph. At step 456, the dashboard design user may determine and specify using a graphical user interface the data ranges for the dashboard. After creating the dashboard, at step 458, the dashboard may be exported automatically or by input from the dashboard design user to a SWF file format. Steps 454, 456 and 458 may be performed by the dashboard design user using the dashboard configuration system 412. This is then communicated to a client community system at steps 460, 462 and 464.

Figure 15:
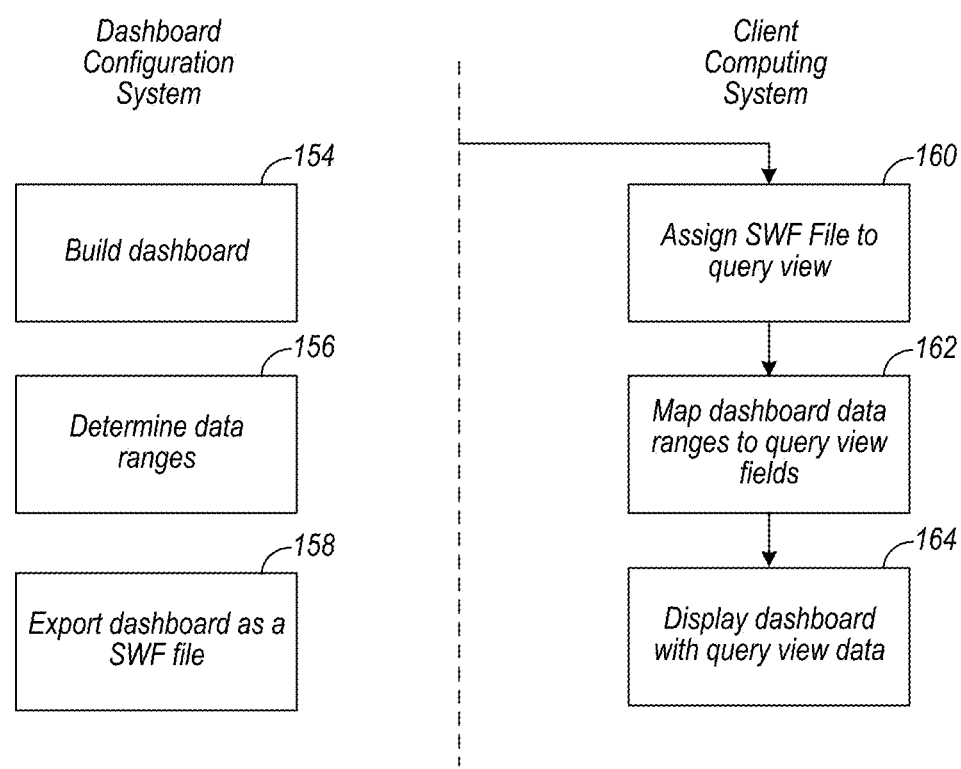
FIG. 15 is a screen display of a dashboard display system that may be used to configure a dashboard.

A business user may perform the other steps of FIG. 15 by using the display computer system 414. In an example embodiment, the business user's steps may be performed during runtime. In this embodiment, runtime includes displaying of the dashboard in a business application using data from business application data sources. In another embodiment, the business user may perform the steps described above about the dashboard design user.

At step 460, the business user may open the context viewer system where the business user may select a chart view 498 as shown in FIG. 16. In the chart view tab, the business user may assign the dashboard or SWF® file to a query view by specifying the location of the file. At step 462, the dashboard data ranges that were determined at step 456 may be mapped to query view fields.

In an example embodiment, the data from the data source 436 (or 416) is placed in the mapped location in the dashboard. In another example embodiment, the mapping between application data and graphical interface data may identify which application data may be shown in the reserved placeholder of the dashboard. After mapping the data ranges, at step 464 the dashboard may be displayed in the business application. In one embodiment the business application may be software applications that provide various functionalities such as, customer relationship management, enterprise resource management, product lifecycle management, supply chain management and supplier relationship management. In another embodiment, the dashboard may be configured to receive data from the data system 416 after the mapping has occurred or the data may be accessed during runtime.

Figure 17:
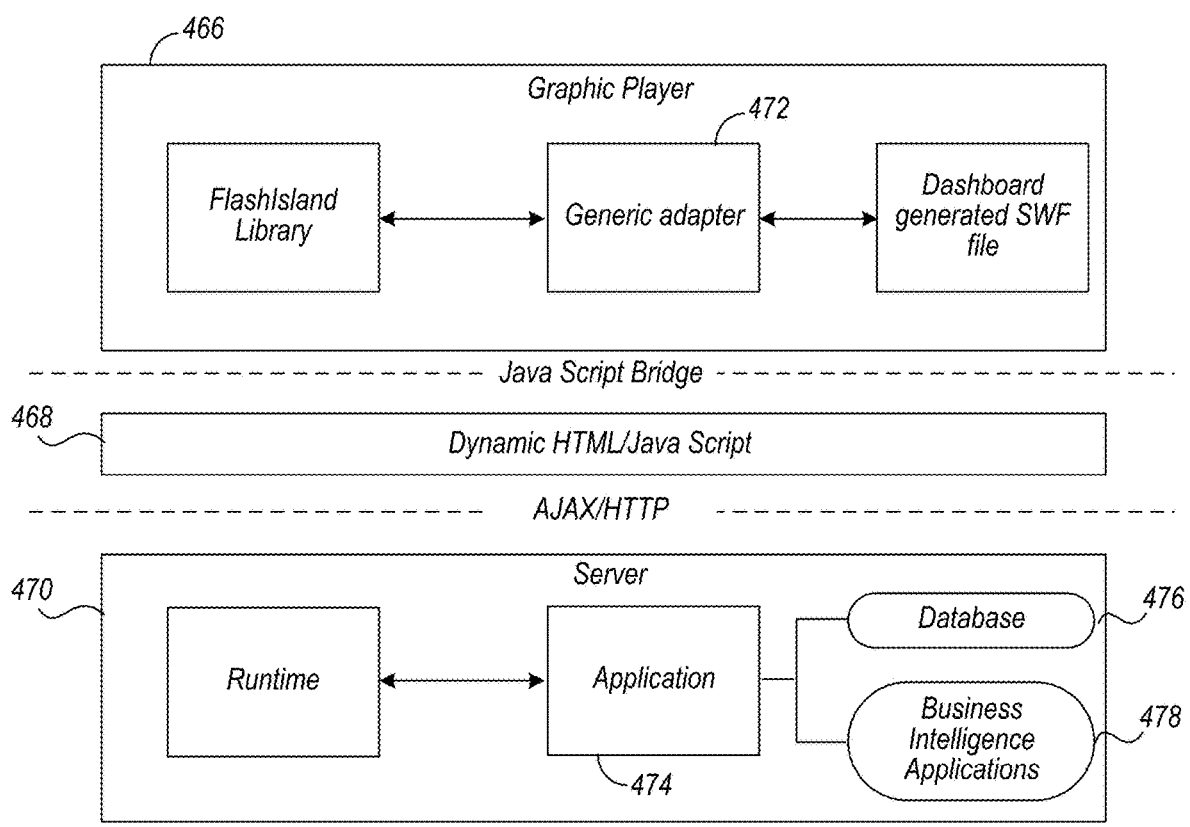
FIG. 17 is a screen display that allows a user to choose a chart view in order to display data in a graphical format.
Figure 18:
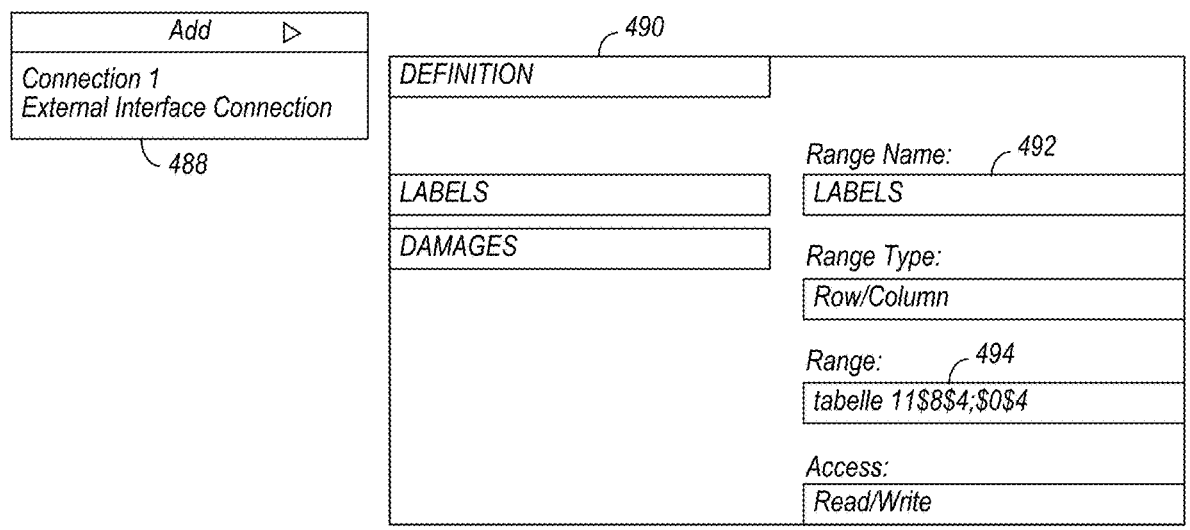
FIG. 18 is an example screen display showing the data mapping feature of the dashboard configuration screen.

FIG. 18 is an example software architecture that may be implemented using the system in FIG. 14. The software architecture diagram shown in FIG. 17 shows various software layers, such as, graphic player 466, component Dynamic HTML or Java® Script 468, and Server (Java® or Java® based or other high-level programming language based) 470 layers. In particular, the generic adapter 472 may be built with the Flash Island library, which may facilitate the client-side communication between HTML and JavaScript® The Dynamic HTML 468 may load the generated dashboard in a graphic file, or Flash/SWF representation. The generic adapter 472 may convert the Java® context into structures that match the dashboard's external interface format or the dashboard format. The generic adapter 472 allows the business user to generate a dashboard in a business analytic software using the most updated data from a data source without writing any customized software. The generic adapter 472 may load dashboard data ranges and convert the associated data into an XML® string that may be used for further conversion into an ABAP® string, which may be used by the business analytic software.

In another embodiment. FIG. 17, the generic adapter 472 may convert the Flash Island properties into dashboard structures. In an example embodiment, the generic adapter 472 may be used to load external dashboard ranges during the configuration stage, at step 462. In this embodiment, the generic adapter 472 may push application data to the data ranges defined in step 462. In another embodiment, the generic adapter 472 may provide an application programming interface between the graphic player 466 and the server 470. The generic adapter 472 may load dashboard ranges automatically and the dashboard data ranges may be converted into XML strings. The XML string may be converted into Java® or ABAP® code which may be executed by the business application 474, to display a dashboard. The server 470 may include NetWcaver®, ABAP® or Java® language programming and the server may include various systems that are supported in the business software suit, the runtime 382, application 474, database 476 and business intelligence application 478. In another embodiment, the functionality of the server 470 may be implemented by the display computing system 414. In yet another embodiment the functionality of server 470 may be divided between the display computing system 414 and data system 416. In another embodiment, the graphic player 466 may be implemented on the dashboard design system 412. Additionally, or alternatively, the functionality of the graphic player 466 may be implemented on the display computing system 414.

Figure 12:
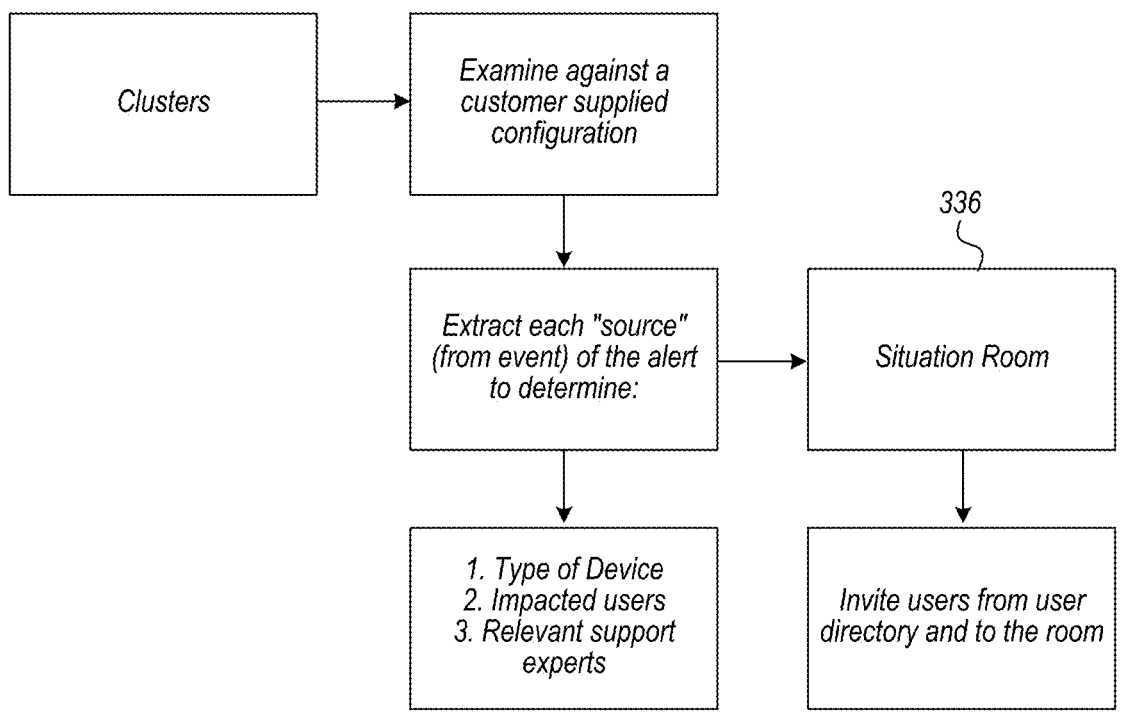
FIG. 12 is a schematic diagram of a processing system according to an embodiment.
Figure 19:
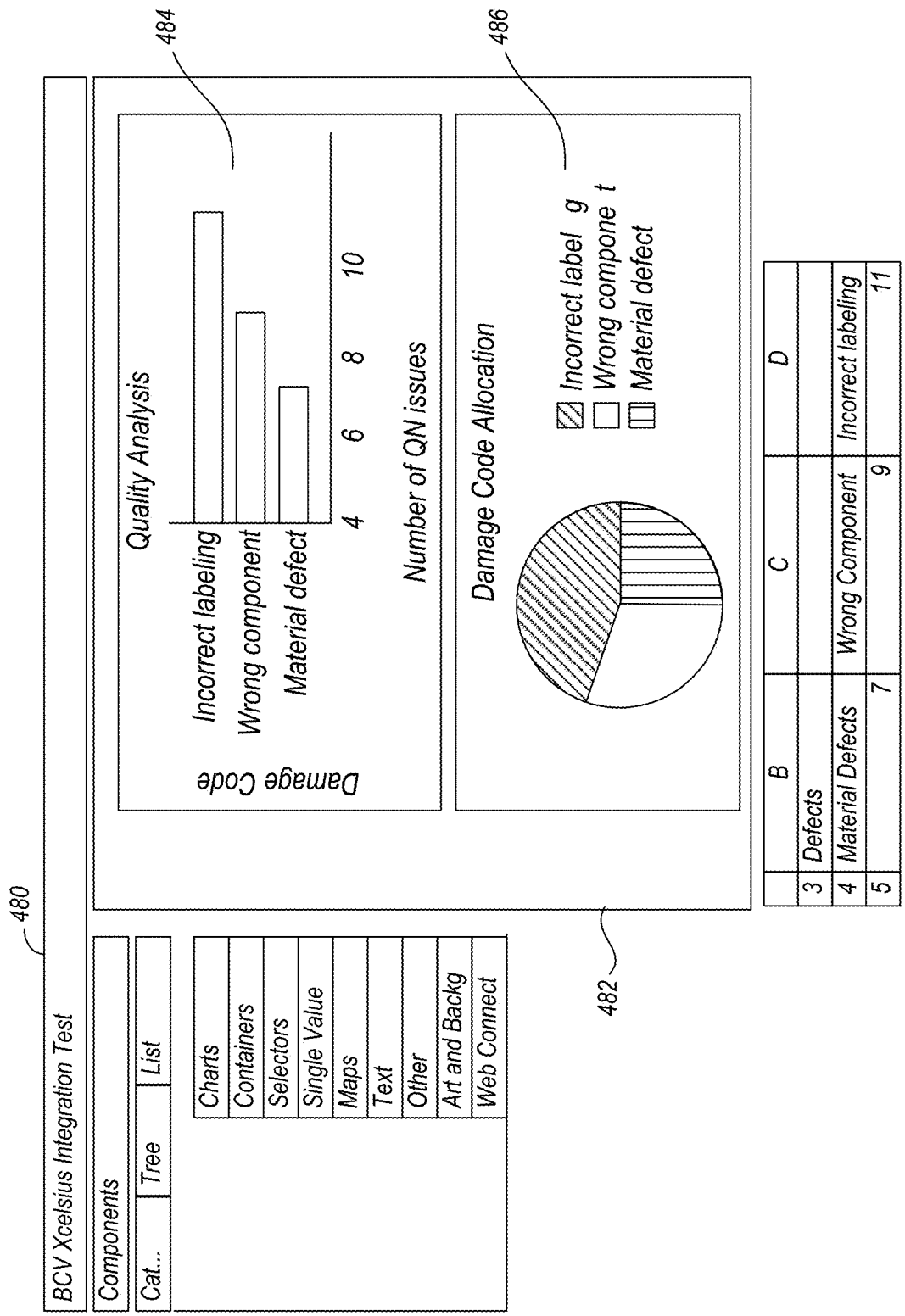
FIG. 19 is an example screen display showing the graphical display of the data using the dashboard configuration shown in FIGS. 16-18.

FIG. 19 shows a screen display 480 of the dashboard designer that may be used to design a dashboard display according to the system shown in FIG. 12. The dashboard designer may be executed by the dashboard design system 412. The dashboard may be created on the canvas 482. A dashboard design user may place the components from the component panel on the canvas 482. As shown in FIG. 19, the canvas 482 has a bar graph 484 and a pie chart 486 that are displayed in this example dashboard. The dashboard 480 shown in FIG. 19 is using example data from the spreadsheet shown at the bottom of FIG. 19. For example, the labels of the bar graph "Incorrect labeling", "Wrong component" and "Material defects" are from the spreadsheet shown below. In particular, the cell range from B4 to D5 440 was selected as input into the properties of the bar graph and the pie chart.

Next, the data in the bar graph and the pie chart is received from cell range B5 to D5. In order to generate this dashboard, the dashboard design user may associate various data fields with particular component properties.

FIG. 18 is a screen display of the dashboard external interface that can permit another software program to access the dashboard controls and display. The external interface connection 488 may allow data from the application system to be passed to a cell range of the dashboard or SWF file, using push technology. During the execution of the dashboard or runtime, data may be pushed or sent from the data source, based on the mapping, to the dashboard. In this embodiment, the data may be transferred in tabular form across an interface. In another embodiment the external interface connection 488 may allow the use of pull technology, where the data is pulled by the context viewer system 438. In another embodiment, during the configuration of the dashboard when the "Generate XC Fields" button is clicked, the defined data ranges will be pulled to the system 450, for example in FIG. 16. The external interface connection 488 may be configured using a definition tab 490, range name 492, range type, range 494 and access type properties. External interface connections allow a dashboard design user to expose selected data ranges relating to the dashboard display. The range name 492 is shown as Labels and the range 494 being assigned, "Table 1!$B$4:$D$4" which is the cell range from B4 to D4. In this example embodiment, the labels from B4 to D4 will be used for mapping the Labels field. After specifying the data range, the dashboard design user may export the dashboard as a file, the file may be executed by various software program including business software.

FIG. 16 is a screen display that allows a user to choose a chart view in order to display a dashboard. In particular, the query view 496 is part of the context viewer application and includes various data types from a business analytics database. If the user chooses to view a chart, the user may select the chart view 498. After a user selects the chart view 498 then the user may be presented with a screen shown in FIG. 20.

FIG. 20 is an example screen display showing the data mapping for the dashboard configuration screen. Screen 510 shows a user interface where the user may select (using a pull-down menu) the type of technology 512 the user plans to use for the chart view display. Here, the user may select the type of dashboard file that was created as the technology. Next, the file path 514 of the exported dashboard or SWF file may be specified. After choosing a SWF file, the user may select the "Upload file to repository" button in order to save a graphic file (SWF file) in the system 138. After selecting button "Generate XC Fields", may be the name of the dashboard external data ranges (e.g. "Damages" and "Labels" in FIG. 18). In the mapping shown in FIG. 18, the user may enter or browse for the name of data source (Query ID). For example, the Query ID shown in this example is "ZOK_QN". This entry is mapped against the data source that may be stored in the application data 146. The user may search for the Query Field ID, which is a specific field of data source Query ID (e.g. field "CODE TEXT" of Query ID "ZOK_QN" in the provided example). Creating this mapping allows the dashboard to utilize the data in the application data 446 or 430. As can be appreciated that programming in a textual or visual manner is not required and the user may create the dashboard, export the dashboard, map the fields and display the dashboard as shown in FIG. 21 using a graphical user interface that responds to a pointing device (e.g. mouse, pen or display device that is sensitive to touch or ocular movement).

Figure 21:
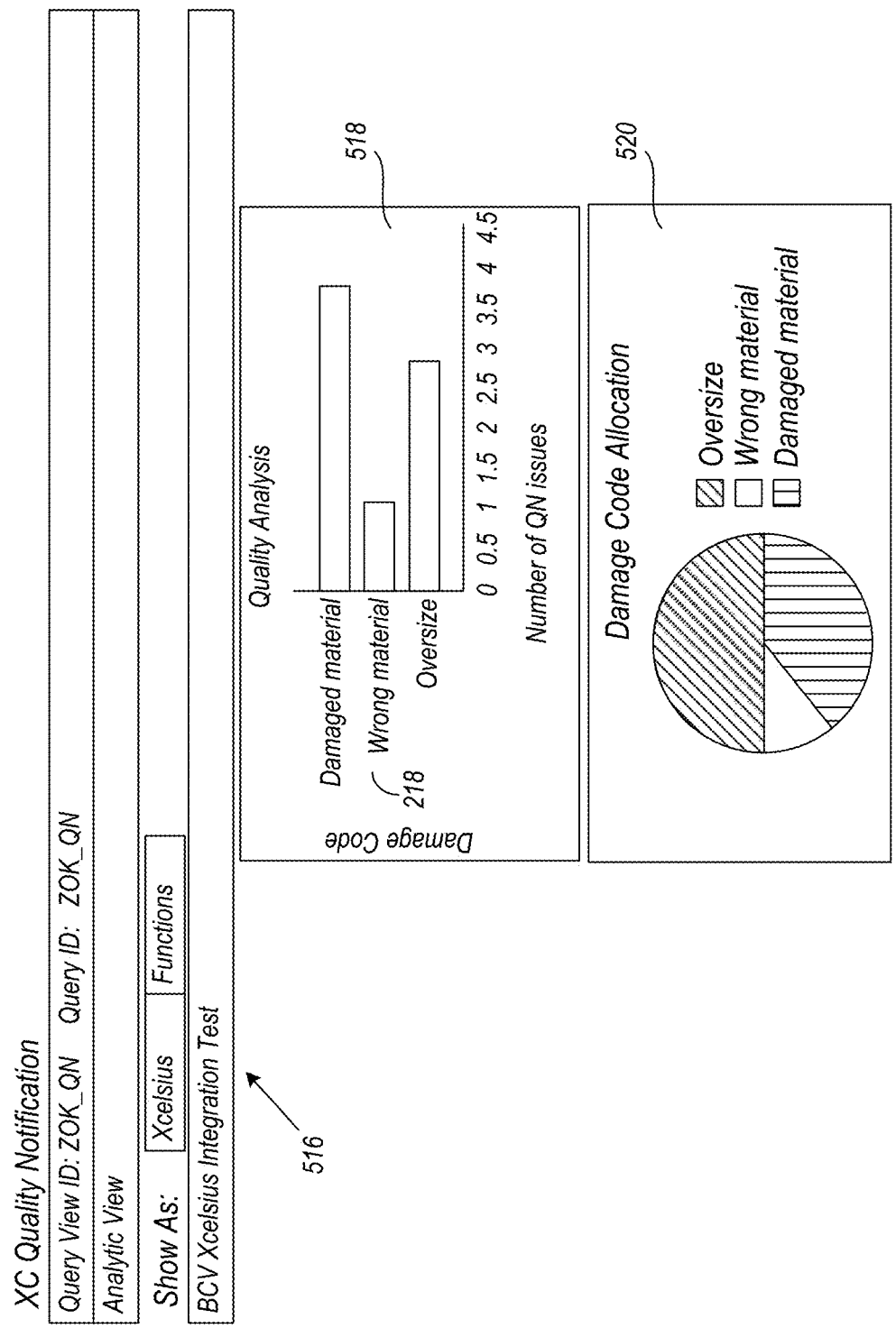
FIG. 21 illustrates one embodiment of a screen display showing the graphical display of the data using the dashboard configuration from FIGS. 19 and 20.

FIG. 21 is an example screen display showing the graphical display of the data using the dashboard configuration from FIGS. 19 and 20. FIG. 21 shows a dashboard 516 that includes the bar graph 518 and pie chart 520. The labels and the value data in the bar and the pie charts 518 and 520 are from the business software and are different than the data used in FIG. 19. Therefore, the user can create a display of a dashboard in another application by using an external connection that may expose data fields to permit the visualization of any type of data.

The embodiments refer to a dashboard that may be a web-based or other technology-based display on which real time data is collated, processed and displayed from multiple data sources that belong to one or more businesses. Other terms that may be used to describe a dashboard, include, digital dashboard, enterprise dashboard, business dashboard, executive dashboard, operational dashboard, BI dashboard, database dashboard, Web dashboard, performance dashboard, score card, KPI dashboard, metrics dashboard and so on. Dashboards may be designed to help any user monitor what's happening or has happened in the past visually or at a glance. Dashboards may provide the user a means to rapidly monitor the current status. Accordingly, dashboards must be designed to take advantage of the strengths of visual perception, cognition and work around or augment the user's weaknesses.

Embodiments can include a system for displaying data stored on computer readable non-transitory media. The system configured to access one or more data fields within a file. The file having been configured using an external connection adapter. The system may include a display computer system configured to map the accessed one or more data fields to data from one or more data sources, the mapping being performed based on a user input via a graphical user interface. In this embodiment, the system may be configured to display on the display computer system a dashboard according to the configuration setting stored in the file, the dashboard may show a graphical representation of the data from the one or more data sources and information from the one or more data fields.

In another embodiment, the dashboard includes dashboard display system that processes the data from the one or more data sources and displays a visual representation of the data in a graph or chart form. Alternatively, or additionally, the dashboard includes a component that is modified by using a graphical user interface such that the dashboard display or components are modified.

In another embodiment, the file is generated by a first software program located in the dashboard design system that is configured to generate the dashboard. The display computing system may further comprise executing a second software program on the display computer system to retrieve the data from the one or more data sources and displaying the dashboard. The display computing system may include converting, using a generic adapter, the data from the one or more data sources into data structures that are compatible with a format of the graphic file.

In another embodiment the data is converted from the one or more data sources into data structures that are compatible with a format of the file using the external connection adapter. The file can be a short web format file that exposes one or more data fields that may be mapped to fields in one or more data sources. In another embodiment, the mapping may occur via a graphical user interface free of receiving textual programming code from the user.

In another embodiment, a computer-implemented method is stored on a computer readable media. Visualization software is integrated with a data processing application that includes configuring a dashboard display using a dashboard design system. The dashboard display can use one or more first data ranges from a spreadsheet as example data. An external connection adapter can be used to provide access to one or more first data ranges that are to be displayed in the dashboard display.

In other embodiments, the dashboard display is exported in a graphic file format. In certain embodiments, one or more first data ranges are accessed from the dashboard display using a display computing system. In one embodiment, one or more first data ranges are connected to one or more second data ranges from one or more data sources. The dashboard can display using data from the one or more second data ranges.

In one embodiment, the dashboard displays with the problem walls from clustering messages received from managed infrastructure 14 data can use a graphical user interface that is free from receiving textual or textual programming code from the client. In this embodiment the method may include processing place problem walls from clustering messages received from managed infrastructure 14 from the one or more data sources and displaying a visual representation of the data in a graph or chart form. This can include a method that includes a component that may be modified by using a graphical user interface that results in a modification of the dashboard display.

In one embodiment, a method is provided that includes a dashboard display generated by a first software program that generates a visual display. This can include, executing a second software program on the display computer system to retrieve the data from the one or more data sources and displaying the dashboard and the method may include converting, using a generic adapter, the data from the one or more data sources into data structures that are compatible with a format of the file.

In one embodiment, the exporting can include converting the place problem walls from clustering messages received from managed infrastructure 14 data from the one or more second data sources into data structures that are compatible with the graphic file format. In one embodiment, this can include converting using an external interface adapter. A graphic file format can be a short web format that allows a software to access the one or more first data ranges.

In another embodiment, a user interface system has an external connection adapter configured to provide access to one or more data fields within a file. As a non-limiting example, this can include a display computer system that maps using a graphical user interface the one or more data fields to data from one or more data sources. The display computer system can generate a dashboard display from a configuration in the file. In one embodiment, the display includes place problem walls from clustering messages received from managed infrastructure 14 data from one or more data sources and information from one or more data fields. A graphical user interface can be provided that is free of receiving textual programming code from the user.

In one embodiment, a first software executed on a display computer system that generates the dashboard in a visual graphic display. A second software program can be included to execute on the display computer system and retrieve the data from the one or more data sources and display the dashboard display. A generic adapter can be utilized to convert the data from the one or more data sources into one or more data structures that are compatible with a format of the file.

In one embodiment, a graphical user interface can modify a component, and this can be used to modify the dashboard display.

In one embodiment, an external connection adapter converts the data from the one or more data sources into data structures that are compatible with a format of the file using the external connection adapter.

The logics can be machine-readable media for carrying or have machine-executable instructions or data structures stored thereon. The machine-readable media can be any available media that may be accessed by a general purpose or special purpose computer or other machine with a processor. As a non-limiting example, a variety of machine-readable media can be utilized, including but not limited to: RAM, ROM, EPROM, EEPROM, CD-ROM or other optical disk storage, magnetic disk storage or other magnetic storage devices, non-transitory computer readable media or non-transmissible computer-readable media or any other medium which may be used to carry or store desired program code in the form of machine-executable instructions or data structures and which may be accessed by a general purpose or special purpose computer or other machine with a processor. With the dashboard system, any such type of connection is termed a machine-readable medium. It will be appreciated that the machine-readable medium can include combinations of the preceding.

As non-limiting examples, with the dashboard system, machine-executable instructions can be: instructions and data which cause a general-purpose computer, special purpose computer, or special purpose processing machines to perform a certain function or group of functions, and the like.

The dashboard system can be implemented by a program product including machine-executable instructions, such as program code. As a non-limiting example, this can be program modules executed by machines in networked environments. As non-limiting examples, the program modules can include routines, programs, objects, components, data structures, and the like, that perform tasks or implement abstract data types. As non-limiting examples the dashboard system can utilize, machine-executable instructions, associated data structures, and program modules as program code for executing steps of the methods disclosed herein.

As non-limiting examples, the dashboard system can be executed in a networked environment using logical connections to one or more remote computers having processors. AS non-limiting examples, suitable network computing environments can be, computers, including personal computers, mobile devices, multi-processor systems, microprocessor-based or programmable consumer electronics, network PCs, minicomputers, mainframe computers, and the like.

In certain embodiments, the dashboard system can be executed in distributed computing environments where tasks are performed by local and remote processing devices that are linked. As non-limiting examples, the linking can be by, hardwired links, wireless links, combination of hardwired or wireless links, and the like, through a communications network. In one embodiment, computing environment, program modules may be in both local and remote memory storage devices.

As a non-limiting example, one embodiment of a system for implementing the overall system or portions of the embodiments can include a general-purpose computing computer in the form of computers, including a processing unit, a system memory or database, and a system bus that couples various system components including the system memory to the processing unit. The database or system memory cam include read only memory (ROM) and random-access memory (RAM).

As a non-limiting example, the database can be a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media, and the like.

As a non-limiting example, the drives and their associated machine-readable media can be used to provide non-volatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

Figure 22:
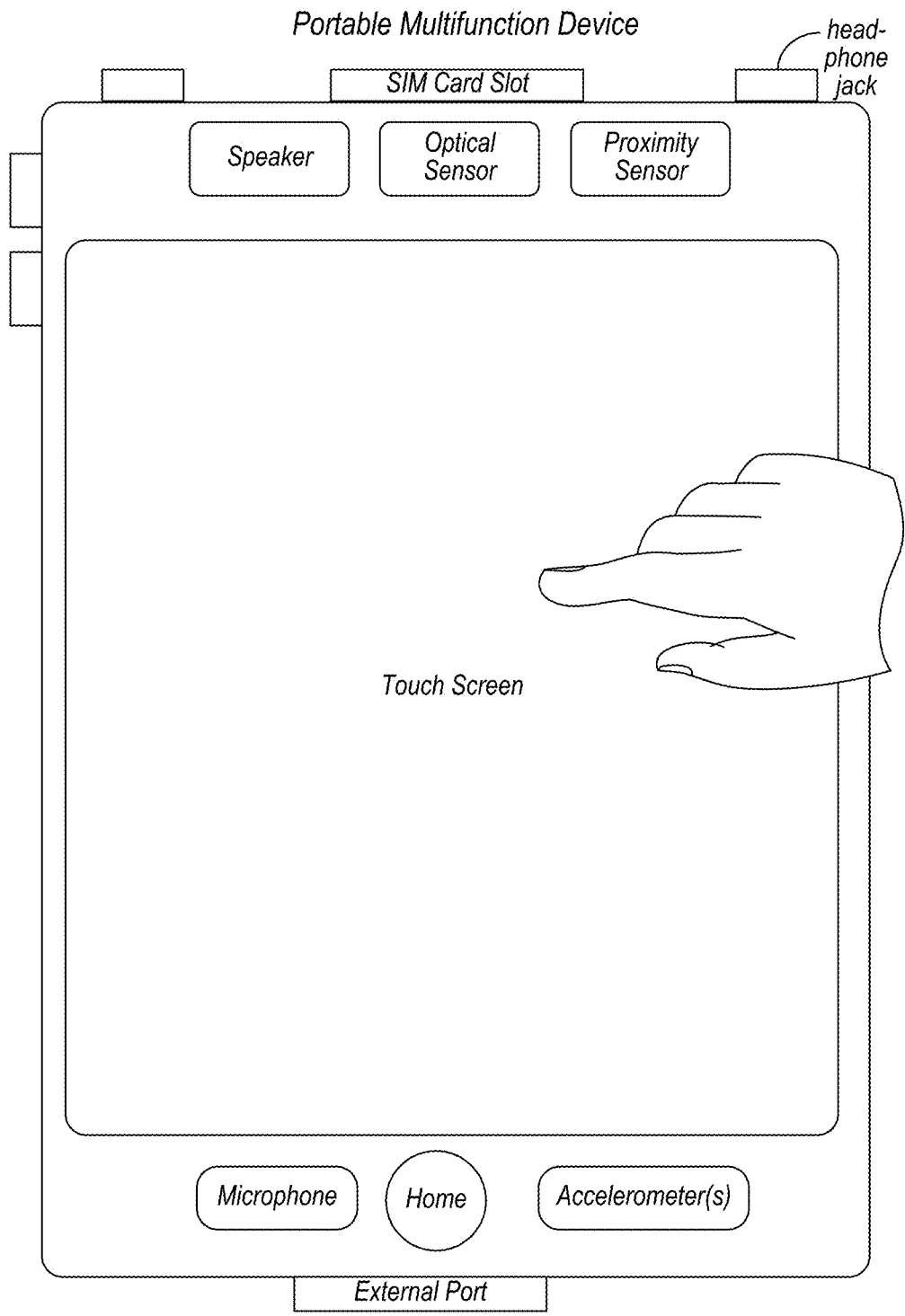
FIGS. 22 through 24 illustrate one embodiment of a mobile device managed infrastructure that can be used with the clustering system of the present invention.
Figure 23:
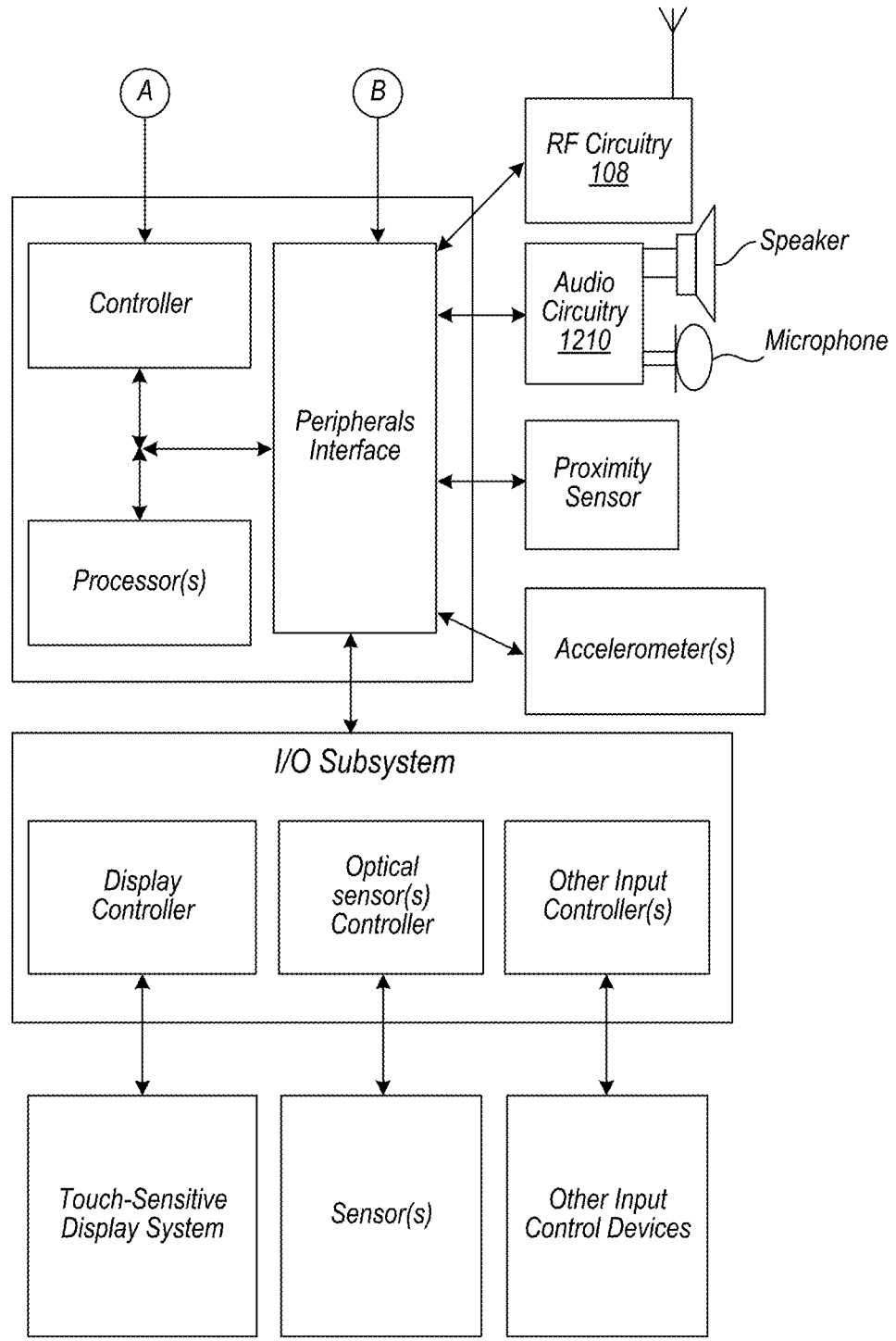
Figure 24:
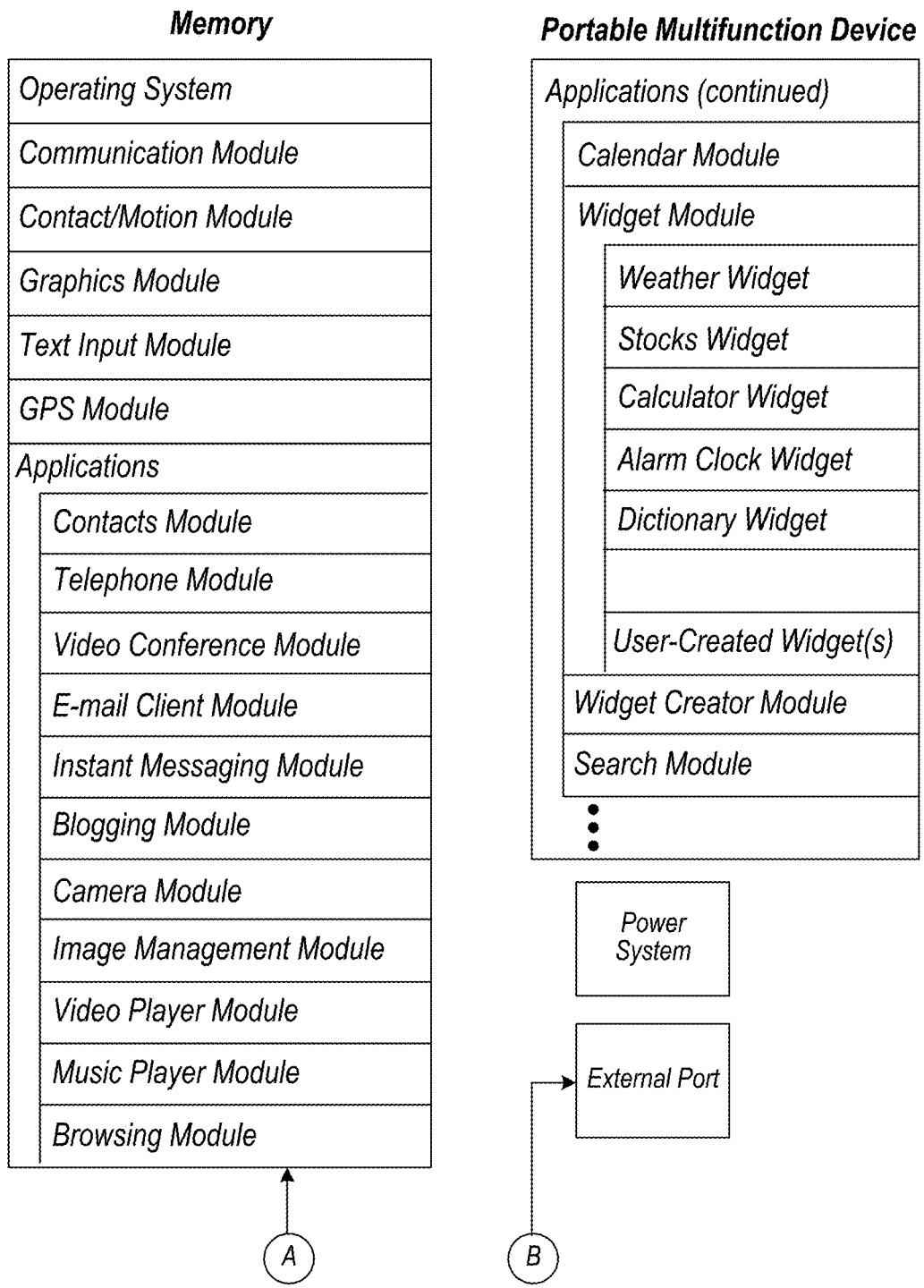

Referring to FIGS. 22 through 24, the mobile or computing device can include a display that can be a touch sensitive display. The touch-sensitive display is sometimes called a "touch screen" for convenience and may also be known as or called a touch-sensitive display system. The mobile or computing device may include a memory (which may include one or more computer readable storage mediums), a memory controller, one or more processing units (CPU's), a peripherals interface, Network Systems circuitry, including but not limited to RF circuitry, audio circuitry, a speaker, a microphone, an input/output (I/O) subsystem, other input or control devices, and an external port. The mobile or computing device may include one or more optical sensors. These components may communicate over one or more communication buses or signal lines.

It should be appreciated that the mobile or computing device is only one example of a portable multifunction mobile or computing device, and that the mobile or computing device may have more or fewer components than shown, may combine two or more components, or a may have a different configuration or arrangement of the components. The various components shown in FIG. 21 may be implemented in hardware, software or a combination of hardware and software, including one or more signal processing and/or application specific integrated circuits.

Memory may include high-speed random-access memory and may also include non-volatile memory, such as one or more magnetic disk storage devices, flash memory devices, or other non-volatile solid-state memory devices. Access to memory by other components of the mobile or computing device, such as the CPU and the peripherals interface, may be controlled by the memory controller.

The peripherals interface couples the input and output peripherals of the device to the CPU and memory. The one or more processors run or execute various software programs and/or sets of instructions stored in memory to perform various functions for the mobile or computing device and to process data.

In some embodiments, the peripherals interface, the CPU, and the memory controller may be implemented on a single chip, such as a chip. In some other embodiments, they may be implemented on separate chips.

The Network System circuitry receives and sends signals, including but not limited to RF, also called electromagnetic signals. The Network System circuitry converts electrical signals to/from electromagnetic signals and communicates with communications networks and other communications devices via the electromagnetic signals. The Network Systems circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The Network Systems circuitry may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication.

The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), BLUETOOTH®, Wireless Fidelity (Wi-Fi) (e.g., IEEE 802.11a. IEEE 802.11b. IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry, the speaker, and the microphone provide an audio interface between a user and the mobile or computing device. The audio circuitry receives audio data from the peripherals interface, converts the audio data to an electrical signal, and transmits the electrical signal to the speaker. The speaker converts the electrical signal to human-audible sound waves. The audio circuitry also receives electrical signals converted by the microphone from sound waves. The audio circuitry converts the electrical signal to audio data and transmits the audio data to the peripherals interface for processing. Audio data may be retrieved from and/or transmitted to memory and/or the Network Systems circuitry by the peripherals interface. In some embodiments, the audio circuitry also includes a headset jack (FIG. 20). The headset jack provides an interface between the audio circuitry and removable audio input/output peripherals, such as output-only headphones or a headset with both output (e.g., a headphone for one or both ears) and input (e.g., a microphone).

The I/O subsystem couples input/output peripherals on the mobile or computing device, such as the touch screen and other input/control devices, to the peripherals interface. The I/O subsystem may include a display controller and one or more input controllers for other input or control devices. The one or more input controllers 1 receive/send electrical signals from/to other input or control devices. The other input/control devices may include physical buttons (e.g., push buttons, rocker buttons, etc.), dials, slider switches, and joysticks, click wheels, and so forth. In some alternate embodiments, input controller(s) may be coupled to any (or none) of the following: a keyboard, infrared port. USB port, and a pointer device such as a mouse. The one or more buttons may include an up/down button for volume control of the speaker and/or the microphone. The one or more buttons may include a push button. A quick press of the push button may disengage a lock of the touch screen or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button may turn power to the mobile or computing device on or off. The user may be able to customize a functionality of one or more of the buttons. The touch screen is used to implement virtual or soft buttons and one or more soft keyboards.

The touch-sensitive touch screen provides an input interface and an output interface between the device and a user. The display controller receives and/or sends electrical signals from/to the touch screen. The touch screen displays visual output to the user. The visual output may include graphics, text, icons, video, and any combination thereof (collectively termed "graphics"). In some embodiments, some or all the visual output may correspond to user-interface objects, further details of which are described below.

A touch screen has a touch-sensitive surface, sensor or set of sensors that accepts input from the user based on haptic and/or tactile contact. The touch screen and the display controller (along with any associated modules and/or sets of instructions in memory) detect contact (and any movement or breaking of the contact) on the touch screen and converts the detected contact into interaction with user-interface objects (e.g., one or more soft keys, icons, web pages or images) that are displayed on the touch screen. In an exemplary embodiment, a point of contact between a touch screen and the user corresponds to a finger of the user.

The touch screen may use LCD (liquid crystal display) technology, or LPD (light emitting polymer display) technology, although other display technologies may be used in other embodiments. The touch screen and the display controller may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen.

A touch-sensitive display in some embodiments of the touch screen may be analogous to the multi-touch sensitive tablets described in the following U.S. Pat. No. 6,323,846 (Westerman et al.). U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in their entirety. However, a touch screen displays visual output from the portable mobile or computing device, whereas touch sensitive tablets do not provide visual output.

A touch-sensitive display in some embodiments of the touch screen may be as described in the following applications: (1) U.S. patent application Ser. No. 11/381,313, "Multipoint Touch Surface Controller." filed May 12, 2006: (2) U.S. patent application Ser. No. 10/840,862, "Multipoint Touchscreen," filed May 6, 2004; (3) U.S. patent application Ser. No. 10/903,964. "Gestures For Touch Sensitive Input Devices," filed Jul. 30, 2004; (4) U.S. patent application Ser. No. 11/048,264, "Gestures For Touch Sensitive Input Devices." filed Jan. 31, 2005; (5) U.S. patent application Ser. No. 11/038,590, "Mode-Based Graphical User Interfaces For Touch Sensitive Input Devices," filed Jan. 18, 2005; (6)

U.S. patent application Ser. No. 11/228,758, "Virtual Input Device Placement On A Touch Screen User Interface." filed Sep. 16, 2005; (7) U.S. patent application Ser. No. 11/228,700. "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All these applications are incorporated by reference herein in their entirety.

The touch screen may have a resolution more than 1000 dpi. In an exemplary embodiment, the touch screen has a resolution of approximately 1060 dpi. The user may make contact with the touch screen using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the mobile or computing device may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen or an extension of the touch-sensitive surface formed by the touch screen.

In some embodiments, the mobile or computing device may include a physical or virtual click wheel as an input control device. A user may navigate among and interact with one or more graphical objects (henceforth referred to as icons) displayed in the touch screen by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller as well as one or more of the modules and/or sets of instructions in memory. For a virtual click wheel, the click wheel and click wheel controller may be part of the touch screen and the display controller, respectively. For a virtual click wheel, the click wheel may be either an opaque or semi-transparent object that appears and disappears on the touch screen display in response to user interaction with the device. In some embodiments, a virtual click wheel is displayed on the touch screen of a portable multifunction device and operated by user contact with the touch screen.

The mobile or computing device also includes a power system for powering the various components. The power system may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Figure 30:
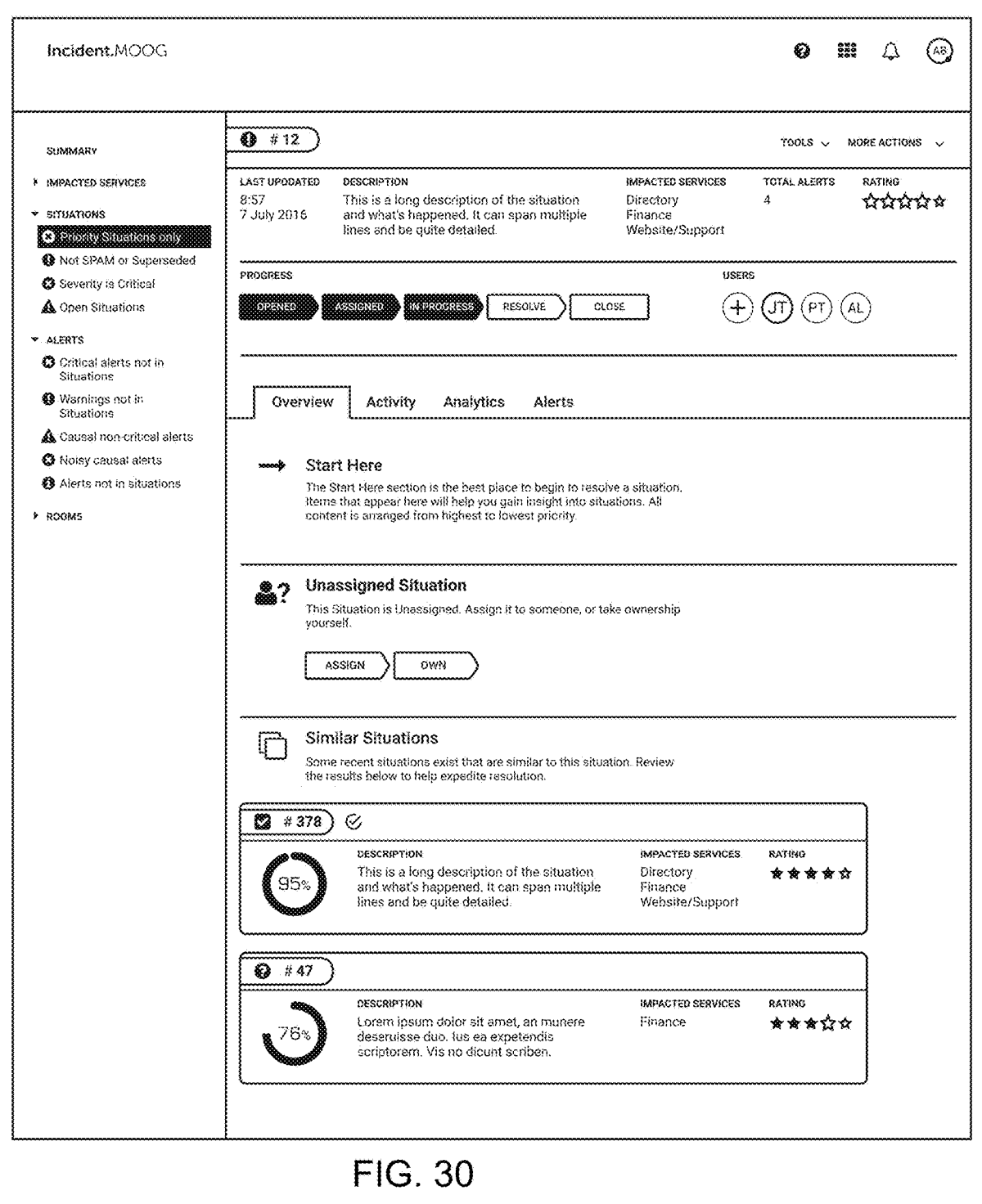

The mobile or computing device may also include one or more sensors, including not limited to optical sensors. FIG. 30 illustrates how an optical sensor coupled to an optical sensor controller in I/O subsystem. The optical sensor may include charge-coupled device (CCD) or complementary metal-oxide semiconductor (CMOS) phototransistors. The optical sensor receives light from the environment, projected through one or more lens, and converts the light to data representing an image. In conjunction with an imaging module 58 (also called a camera module); the optical sensor may capture still images or video. In some embodiments, an optical sensor is located on the back of the mobile or computing device, opposite the touch screen display on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor can be changed by the user (e.g., by rotating the lens and the sensor in the device housing) so that a single optical sensor may be used along with the touch screen display for both video conferencing and still and/or video image acquisition.

The mobile or computing device may also include one or more proximity sensors. In one embodiment, the proximity sensor is coupled to the peripherals interface. Alternately, the proximity sensor may be coupled to an input controller in the I/O subsystem. The proximity sensor may perform as described in U.S. patent application Ser. No. 11/241,839, "Proximity Detector In Handheld Device," filed Sep. 30, 2005; Ser. No. 11/240,788. "Proximity Detector In Handheld Device." filed Sep. 30, 2005; Ser. No. 13/096,386. "Using Ambient Light Sensor To Augment Proximity Sensor Output"; Ser. No. 13/096,386, "Automated Response To And Sensing Of User Activity In Portable Devices." filed Oct. 24, 2006; and Ser. No. 11/638,251, "Methods And Systems For Automatic Configuration Of Peripherals," which are hereby incorporated by reference in their entirety. In some embodiments, the proximity sensor turns off and disables the touch screen when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory may include an operating system, a communication module (or set of instructions), a contact/motion module (or set of instructions), a graphics module (or set of instructions), a text input module (or set of instructions), a Global Positioning System (GPS) module (or set of instructions), and applications (or set of instructions).

The operating system (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module facilitates communication with other devices over one or more external ports and includes various software components for handling data received by the Network Systems circuitry and/or the external port. The external port (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module may detect contact with the touch screen (in conjunction with the display controller) and other touch sensitive devices (e.g., a touchpad or physical click wheel). The contact/motion module includes various software components for performing various operations related to detection of contact, such as determining if contact has occurred, determining if there is movement of the contact and tracking the movement across the touch screen, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module and the display controller also detect contact on a touchpad. In some embodiments, the contact/motion module and the controller detects contact on a click wheel.

Examples of other applications that may be stored in memory include other word processing applications, JAVA-enabled applications, encryption, digital rights management, voice recognition, and voice replication.

In conjunction with touch screen, display controller, contact module, graphics module, and text input module, a contacts module may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone, video conference, e-mail, or IM; and so forth.

In one embodiment a feedback signalizer functor is provided that is a signalizing event analyzer which responds to user interactions with already formed situations. It then learns how to replicate the same situation when new alerts reoccur, or, creates similar situations. In one embodiment the feedback signalizer functor is a supervised machine learning approach to train a signalizer functor to reproduce a situation at varying degrees of precision. As a non-limiting example, this is accomplished using neural networks, in particular a feed forward neural net with the standard configuration of an input layer, configurable hidden layers. This can be considered as deep learning with a single output layer. In one embodiment the use case being addressed by the feedback signalizer functor is to respond to a configurable set of queues to learn and unlearn situations. In one embodiment the feedback signalizer functor is configured to run in farmd.

In one embodiment the feedback signalizer functor listens on the sig journal topic for audited actions on a situation. These actions are collected together into a set of collections of actions, configurable in two parameters: learn_queues and unlearn_queues. As a non-limiting example, the following example configuration defines the actions for learn_queues and unlearn_queues:

learn_queues
    :["manual_create", "merge_create", "split_create","annotated","diagnosed","closed", "r efin ed"],
   manual_create, the creation of a situation where alerts are brought together in a situation.

merge_create is the creation of a new situation by merging two situations. The learn_queue is on the created situation, not on the two situations that are merged together.

split_create is when you create a new situation by splitting an existing situation, and it is the created situations that are learnt.

annotated is any addition to either a discussion thread or comment, or, the setting of a situation description.

diagnosed indicates a tool has run.

closed relates to whether a situation is closed or resolved.

refined is when alerts are added to or removed alerts from a situation.

unlearn_queues:["split"],

If this action is taken on a given situation, the neural net, which is created by the learn_queues for the situation is discarded. Any action can be either a learn queue or an unlearn queue.

In one embodiment as part of the feedback signalizer functor a small Java library, neural, exists to encapsulate the neural network. The neural network takes an alert as its input. When a situation is learned, the collection of alerts in that situation is presented to the neural network, which then learns the contents of the situation. In one embodiment the neural network can be configured by selecting any attribute of an alert as shown in the following example configuration:

inputs:["source","description"."severity", "manager"],

In one embodiment if the element of an alert is not a string, it is converted to a string for consideration in the neural network. In one embodiment the neural network is set up to have an input node for each attribute of an alert. In one embodiment a brain configuration section is used to set up the precise characteristics of the neural network that is used to learn the situation. The following is a non-limiting example of how this can be achieved:

neurons:7,
   layers:2,
   learning_rate:0.1,
   activation_func:"Hyperbolic",
   epochs:500,
   precision:0.92.
   exact_match:false
   where:

neurons provide the number of neuron's in the hidden layer. The neural network created by neurons with a value of 7 is shown in figure one.

Epochs, precision and exact match relate to the number of times a network is trained which is the process of presenting the alerts and then back propagating and adjusting the network configuration to achieve 1.0 and −1.0 as the output layer, epochs are the maximum number of iterations that you will back propagate against a single alert to try and achieve the stated precision. In the embodiment above it is 0.92. As a non-limiting example this would be trained if, presenting an alert to the neural network gave a value of 0.92 on the True and −0.92 on the False. It will iterate until completed, and only terminate the iteration on meeting the error goal, or, exceeding the number of epochs or iteration steps. Exact match parameter is a technical override to the neural network meaning that an alert, which is not used for training, does not provide a positive value for inclusion. In this embodiment because it does not provide a positive value it is clustered. A perfect recall of all the alerts is not achieved. As a non-limiting example, exact_match can provide 100% precision and it can also have less than 100% recall.

Precision is the number of true positives divided by the total number of true positives and false positives. As a non-limiting example when there are nine alerts in the situation that were part of the training, and one alert is not part of the training, the precision is 0.9 (9 dived by (9+1). The number of alerts divided by the number of alerts that should have received in the situation. As a non-limiting example, when it is trained on five alerts and four alerts are received in the situation, the recall is 80% or 0.8.

Learning Rate is key configurations in the training. In this example the learning rate is set at 0.1, and controls how fast the neural network converges on training An activation_function can be "Sigmoid", "Hyperbolic" or "Sine" and is not case sensitive. It changes the function used to propagate the value of a neuron to the next layer, by choosing between functions 2, 3 and 4 in the equation below.

In one embodiment if an alert is a member of a situation the neural network takes the alert input for the alert and it is passed through the neural network. As a non-limiting example in classic back propagation training the value of the True output node is optimized to 1.0 and the false output node is −1.0.

Figure 25:
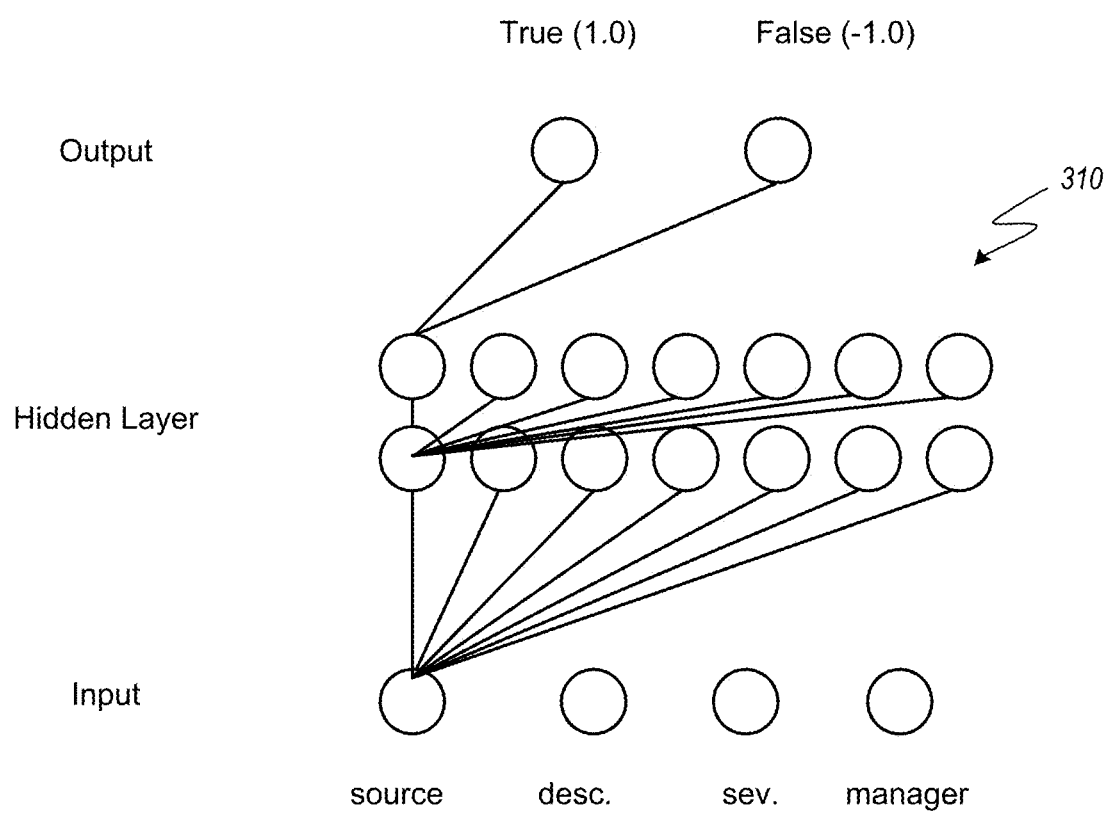
FIG. 25 illustrates one embodiment of a network, which as a non-limiting example is a neural network.

FIG. 25 illustrates one embodiment of a network, which as a non-limiting example is a neural network 310. As a non-limiting example every input layer is connected to every neuron on a first hidden layer. Every neuron on a hidden layer is connected to neurons on the next hidden layer, and every neuron on the last layer is connected to both True and False. The connections are a function that takes the numerical value submitted to the neuron and converts it into a value that it propagates onto the next neuron up the layer as follows:

$$\text{output (neuron)} = \sum_{inputs} w_i \times input_i \quad (1)$$

$$f(x) = 1.0 - \frac{1}{1 - \exp(-\text{output}(\text{neuron}))} \quad (2)$$

$$f(x) = \tanh(\text{output}(\text{neuron})) \quad (3)$$

$$f(x) = \sin(\text{output}(\text{neuron})) \quad (4)$$

In one embodiment the value of the neuron is equal to the sum of a weight factor times the input value from the (ith) input node, or, proceeding layer input node equals the value of the neuron. This value is passed to a function that propagates up to the next layer in the neural net.

As a non-limiting example for the activation function, activation_func, there can be three choices: Sigmoid, a standard function that is one minus the exponential of the value of the neuron; Hyperbolic, that uses the hyperbolic tangent, or, tan h of the value, which passes it on, and, Sine that uses a trigonometric sin of the value. A slight technicality is that all the neural nets are symmetric as opposed to asymmetric.

The Sigmoid function can sometimes tend to blur values and can be less precise than the other two activation functions. The Hyperbolic function is more likely to resolve similar alerts, and Sine works better with random data. In one embodiment if the alerts in a situation that is in the process of learning the alerts have little similarity, the Sine function produces better results when recalling that situation but is less precise. The Sigmoid function produces better precision but has a poorer recall. In one embodiment a back propagation is standard back propagation and the learning rate is the small positive constant used to perform the gradient descent method of solving for the weights in Equation 1. In the FIG. 20 embodiment, with four input nodes, two layers of seven, and two output nodes, there are 91 interconnections between the neurons, ((7*7) nodes+ (2*7) nodes+(4*7) nodes)=91. In this embodiment there are 91 weights that characterize the state of the neural network. This can be considered as a form of training by calculating 91 floating point numbers. In this embodiment a unique signature of 91 floating-point numbers are respected as an arbitrary collection of alerts that for training.

Figure 26:
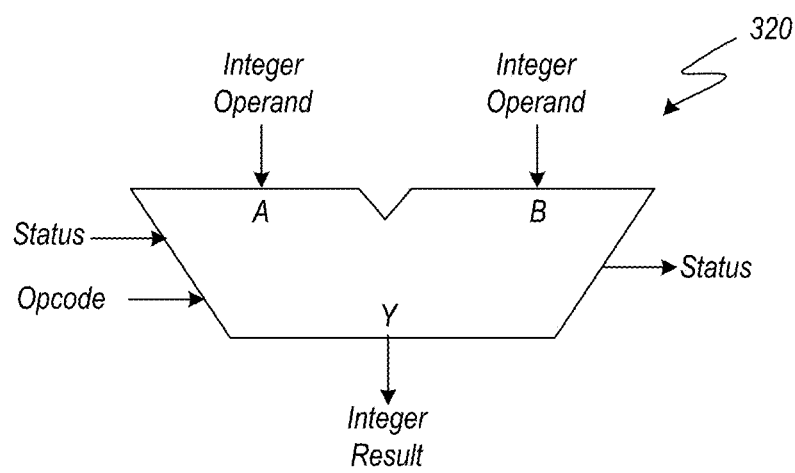
FIG. 26 illustrates one embodiment of a floating-point unit.

As illustrated in FIG. 26 in one embodiment a floating point unit (FPU) 320 performs floating point calculations. In one embodiment floating point arithmetic logic instructions are retrieved from memory of system 10 and or 310 that are then stored in a system 10 and or 310 memory. In one embodiment a BEEFY FPU 320 is used.

In one embodiment the FPU 320 is included in a processor of the system 10 and or 310. In one embodiment the FPU 320 is a stand-alone unit apart for a processor of the system 10 and or 310. In one embodiment the FPU 320 executes floating point arithmetic logic instructions by retrieving them from a memory of the system 10 and or 310. In one embodiment the FPU 320 executes floating point arithmetic logic instructions by retrieving them from a memory of the system 10 and or 310 that are then stored in one or more system 10 and or 310 memory.

In one embodiment the FPU 320 includes one or more of a: floating point adder, multiplier and comparator. As a non-limiting example the FPU 320 performs one or more of: exponent subtraction; subtraction of the exponents to form an absolute difference |E_a−E_b|=d; alignment; significand addition; addition or subtraction according to an effective operation that is a function of an opcode and the signs of operands; conversion that converts a significand result, when negative, to a signmagnitude representation; leading-one detection; normalization; and rounding.

In one embodiment a control unit of a processor carries out stored program instructions relative to the FPU 320. In one embodiment the control unit communicates with the ALU and memory. In one embodiment input signals are propagated through the FPU 320 and a resulting performed operation is a FPU 320 output. In one embodiment the FPU 320 output includes a data word and status information of the event. In one embodiment the status information is a rating of a significance of the event.

In one embodiment the input into the neural network is a conversion of a string into a floating-point number because a value between +1.0 and −1.0 is needed at the output layer. In one embodiment this is achieved by using a version of the standard simhash algorithm that is used to convert a string into a floating-point number and then normalize. Simhash is used where similar items are hashed to similar hash values that is the bitwise hamming distance between hash values.

Example 3

```
irb(main):003:0> p1.simhash
⇒  851459198
    0011001011000000001111000111110
irb(main):004:0> p2.simhash
⇒  847263864
    0011001010000000001110000111000
irb(main):002:0> p3.simhash
⇒  984968088
    00111010101110101011010111001100
In the preceding the hamming distance of the similar items (p1,p2)=4
whereas (p1,p3)=16 and (p2,p3)=12
```

The simhash of a phrase is calculated as follow.

```
pick a hashsize, let's say 32 bits
let V = [0] * 32 # (i.e. 32 zeros)
break the phrase up into features
irb(main):003:0> 'the cat sat on the mat'. shingles
=> #<Set: { "th", "he", "e ", " c", "ca", "at", "t ",
" s", "sa", " o", "on", "n ", " t", " m", "ma" }>
hash each feature using a normal 32-bit hash algorithm
"th".hash = -502157718
"he".hash = -369049682
...
for each hash if biti of hash is set then add 1 to V[i]
if biti of hash is not set then take 1 from V[i]
simhash biti is 1 if V[i] > 0 and 0 otherwise simhash
are useful because if the simhash bitwise hamming distance
of two phrases is low then their jaccard coefficient is high.
```

As a non-limiting example, the simhash function calculates a 64 bit integer for a string, which is then normalized, so, the value is between 1.0 and −1.0 and created by dividing the smiths value by the max value of a signed long integer. The simhash function is designed so that lexicographically similar strings have similar simhash values. The simhash algorithm, takes the string, breaks it into individual and pairs of characters, and, then calculates for each of those 2n−1 substrings, an md5 hash for each of the components before going through a process of progressive XOR'ing of the md5 hashes together. This culminates in an array that is used to collapse down into an integer by bit setting.

In one embodiment test and real world data produce good results so that similar strings such as "server6" and "server7" give similar simhash values. The neural network provides reliable results against both artificial and real world data.

As a non-limiting example a standard configuration can be as follows:
 name:"Feedback".
 classname:"CFeedback".
 run_on_startup:false.
 process_output_of:"AlertBuilder.
 membership_limit: 1,
 scale_by_severity:false,
 entropy_threshold:0.0.
 single_matching:true.
 activation_func:"Hyperbolic"

In one embodiment the standard configuration is back-ended to an alert builder. It can run in both standalone and in chained mode as it listens on the journal function and retrieves its own data from the database.

In one embodiment the standard configuration is back-ended to an alert builder. It can run in both standalone and in chained mode as it listens on the journal function and retrieves its own data from the database.

In one embodiment of the present invention, a user interface 22 is provided that reduces the number of actions the users and makes it more minimal.

As a non-limiting example, incident management is managing problem notifications or events that arise on large computing, application and networking infrastructures. A grouping of these is a "situation" which represents a point in time when one or more related events occurred. In one embodiment it can be composed of a plurality of events.

As a non-limiting example, a "situation" is a collection of one or more events and alerts representative of a problem in a managed infrastructure. A grouping of these is a "situation" which represents a point in time when one or more related events occurred. In one embodiment it can be composed of a plurality of events.

In one embodiment machine learning is utilized to educate the system. Over a course of time the system learns from prior situations and can discard things that are not relevant and assists in focusing on the actual things one is looking at in a situation.

Figure 27:
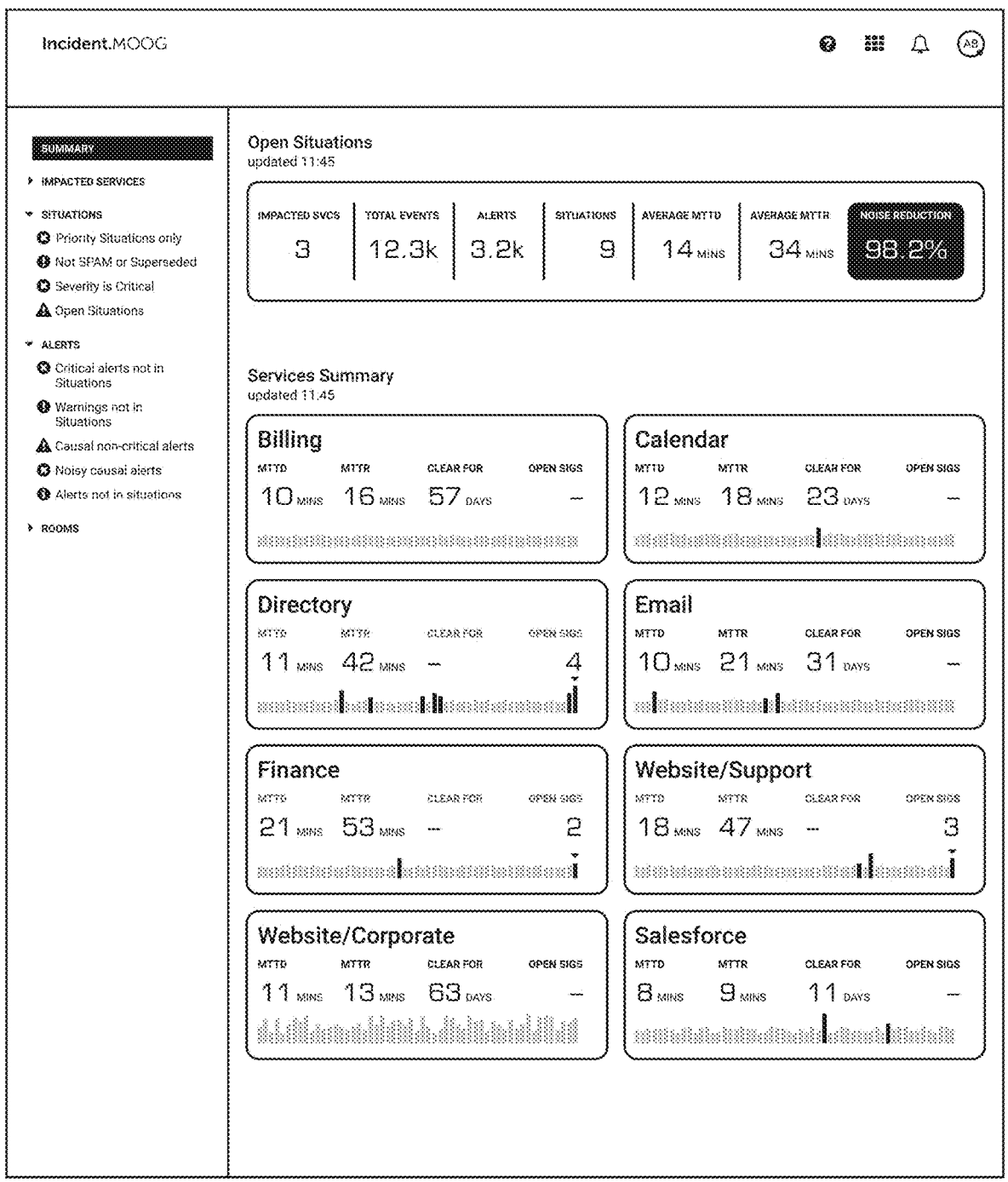
FIG. 27 illustrates one embodiment of a summary view of the present invention.

In one embodiment a Summary view is provided that provides a high-level view of service outages, as illustrated in FIG. 27. This allows one to dive down into situations that have been generated for those services.

Figure 29:
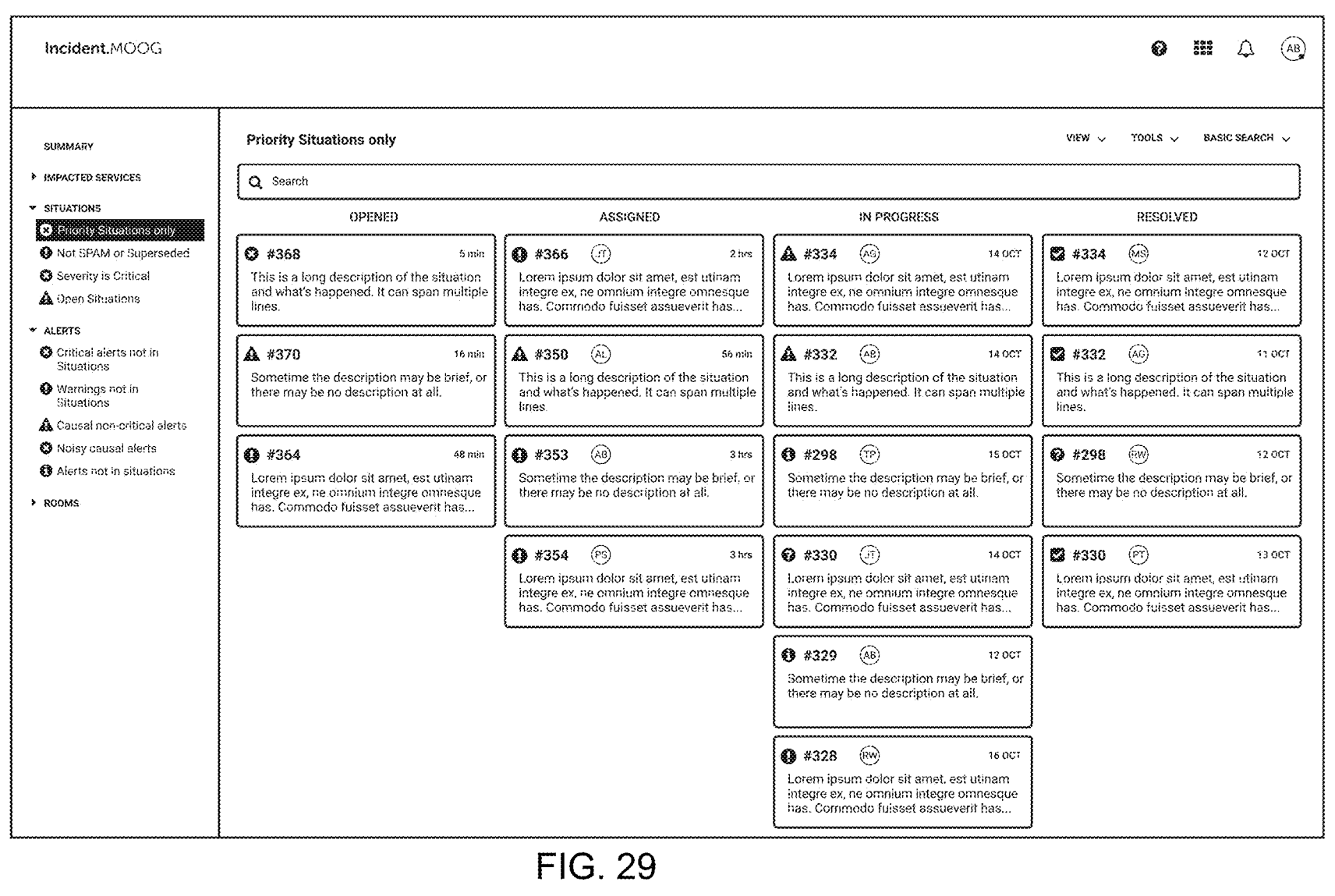

In one embodiment the interface allows a high-level view of multiple situations. Situations can be viewed in different configurations, including but not limited to: 1) a tabular list view where situations can be ordered by different parameters including but not limited to creation date, moderator, definition or other. FIG. 28. A "Kanban" or workflow view where situations can be arranged and ordered according to their state in a workflow process. FIG. 29.

In one embodiment a filtering mechanism is available to reduce and narrow the number of situations displayed based on desired attributes.

In one embodiment when a situation is generated by the system, a "situation room" is created to contain the situation. A situation is opened and presented in a situation room. The situation room is a collection of all relevant events and alerts that generated the situation, links and references to people and teams assigned to resolve the situation, their chat conversations and other information and tools needed for situation resolution, as well as post-situation analysis and forensics.

In one embodiment the situation room contains an overview section with a "start here" page to help guide the user through the process of situation resolution. This offers up "things to start with", suggestions, information and tools that can help inexperienced users better understand how to resolve situations. As users become more experienced they may choose to turn off the start here page, FIG. 30.

In one embodiment the situation room contains a "feed" view that displays all activity in the situation's life cycle including machine-generated and user activities.

In one embodiment users can create "posts" in the activity view by entering text or uploading files into an entry field. The content users enter is visible to all users of that particular situation room. Any user can comment on a post and chat conversations with other members involved with a situation can be conducted.

Figure 31:
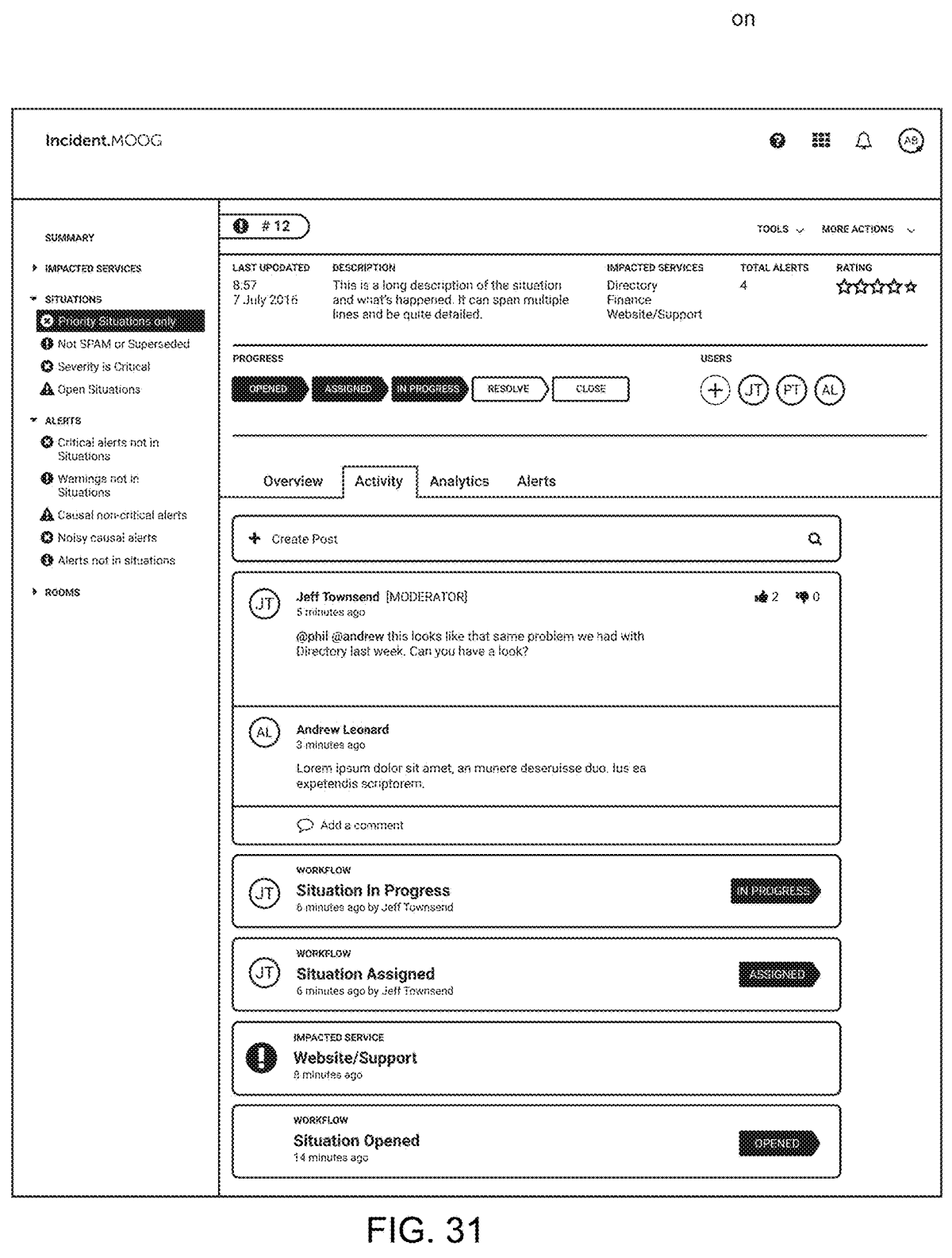

In one embodiment the entry field also accepts "Chat Ops" commands, and users can affect the state of a situation by entering machine-recognized commands including but not limited to entering commands that resolve the situation, or close and archive the situation. FIG. 31.

In one embodiment the team or group rooms exist that are organized around specific teams or functions. As non-limiting examples the team or group room can contain one or more team members and may be organized around existing functional teams within an organization, including but not limited to: network management team room, application performance team room, and the like.

Situations can be linked to team rooms and a situation can be linked to multiple team rooms at the same time.

As a non-limiting example, a team room differs from a situation room in that situation rooms exist for a short term and are archived when resolved, while team rooms exist and are used for a greater duration and may be semi-permanent.

As a non-limiting example, a team room contains a "feed" view of system and user activity. Members of the room can create posts that other members will see in the feed when they visit the room. When users create a post, they can mark it as 1) a question or 2) a tip to solve a problem or 3) a simple text statement. This provides a method for classifying different types of posts and enables organization, search and filtering for specific posts.

Figure 32:
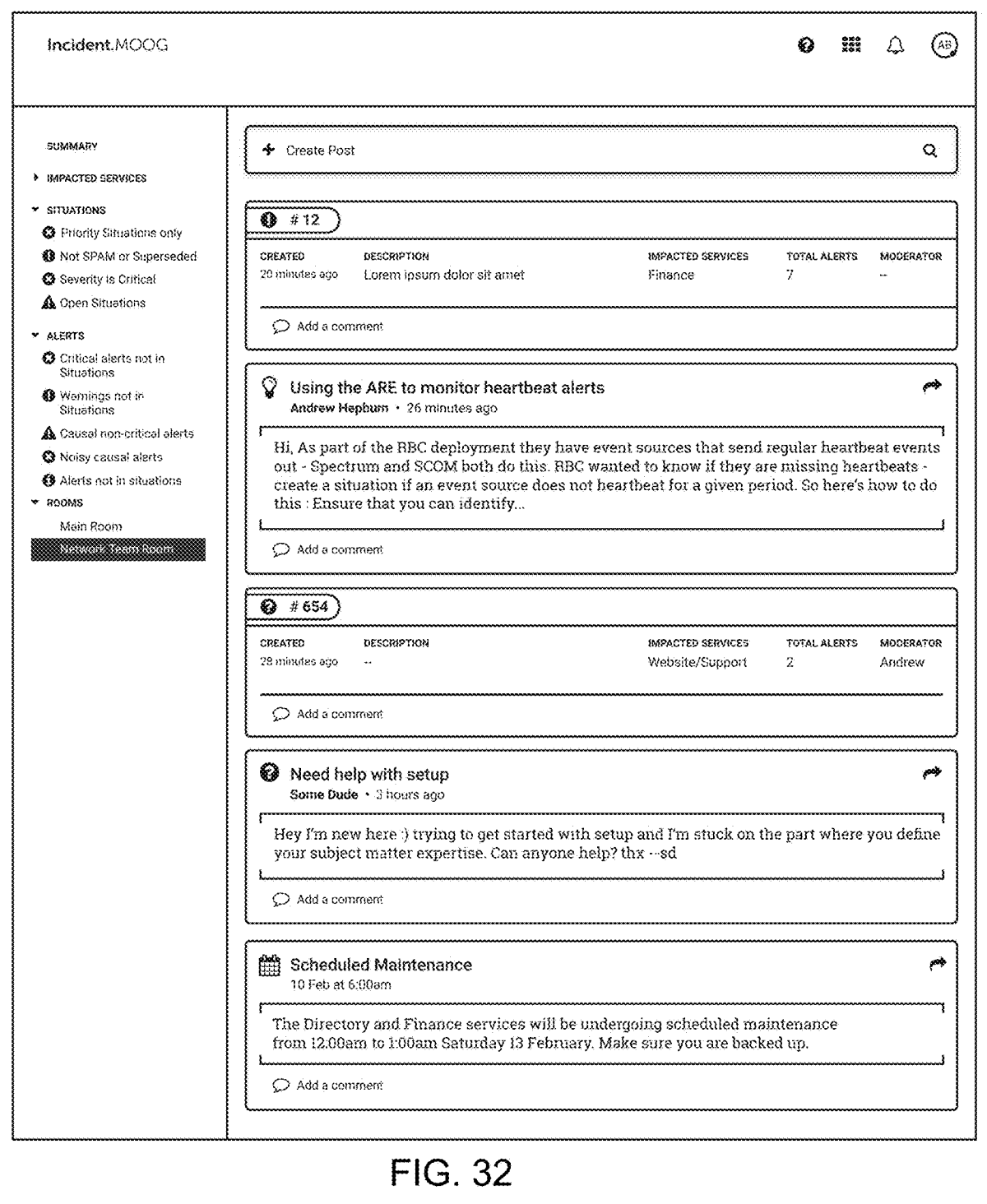

As a non-limiting example, the activity feed can also include system generated events such as recurring calendar events and system maintenance announcements (e.g. "The directory service will be offline tonight from 11:00 PM . . . "), FIG. 32.

Alerts have multiple parameters which at the simplest level can be broken into numeric.

In one embodiment system 10 is given events, which can be alerts that can include any number of different parameters. Events include one or more parameters, also known as subjects that can include attributes. In one embodiment an event includes an instance of one or more parameters that are examined, analysed and the like. As a non-limiting example features, situations and like are all parameters. A feature is a numerical value of a parameter, and a parameter vector, hereafter "feature vector" is a concatenation of all of the parameters, e.g., features for an individual event. For purposes of the present invention a manager is an attribute of an event. The values of a manager can change from one organization to another.

In order to represent an event for use in a machine learning context each parameter needs to be converted into a numerical representation. In one embodiment this is achieved by creating a "feature vector" for each event. Each parameter of the event is processed in some way. In one embodiment each parameter is represented by one or more columns, of a table, in the final feature vector.

Events can include both numeric and non-numerical and text parameters. In one embodiment system 10 receives the events as they are received. In one embodiment system 10 breaks the parameters that are non-numerical. An event can have some fields that are nested values. The nested values are lists and can be nested name-value pairs. They all decompose into text or numeric values and the text is converted as more fully described hereafter.

In order to represent an event for use in a machine learning context each parameter, feature vectors are created in order to do the conversion of non-numerical and text parameters. Each parameter of the event is processed in some way and is represented by one or more columns in the final feature vector.

Each parameter, whether text or numeric, can represent a "real" value e.g. a number where there is a natural ordering or scale or a textual description. Alternatively, the parameter may represent some sort of categorical value/enumeration. Time based parameters (features) are also possible as are derived/ensemble parameters such as arrival order. These are parameters not contained within the event itself but can be derived from the entire set of events.

Figure 33A:
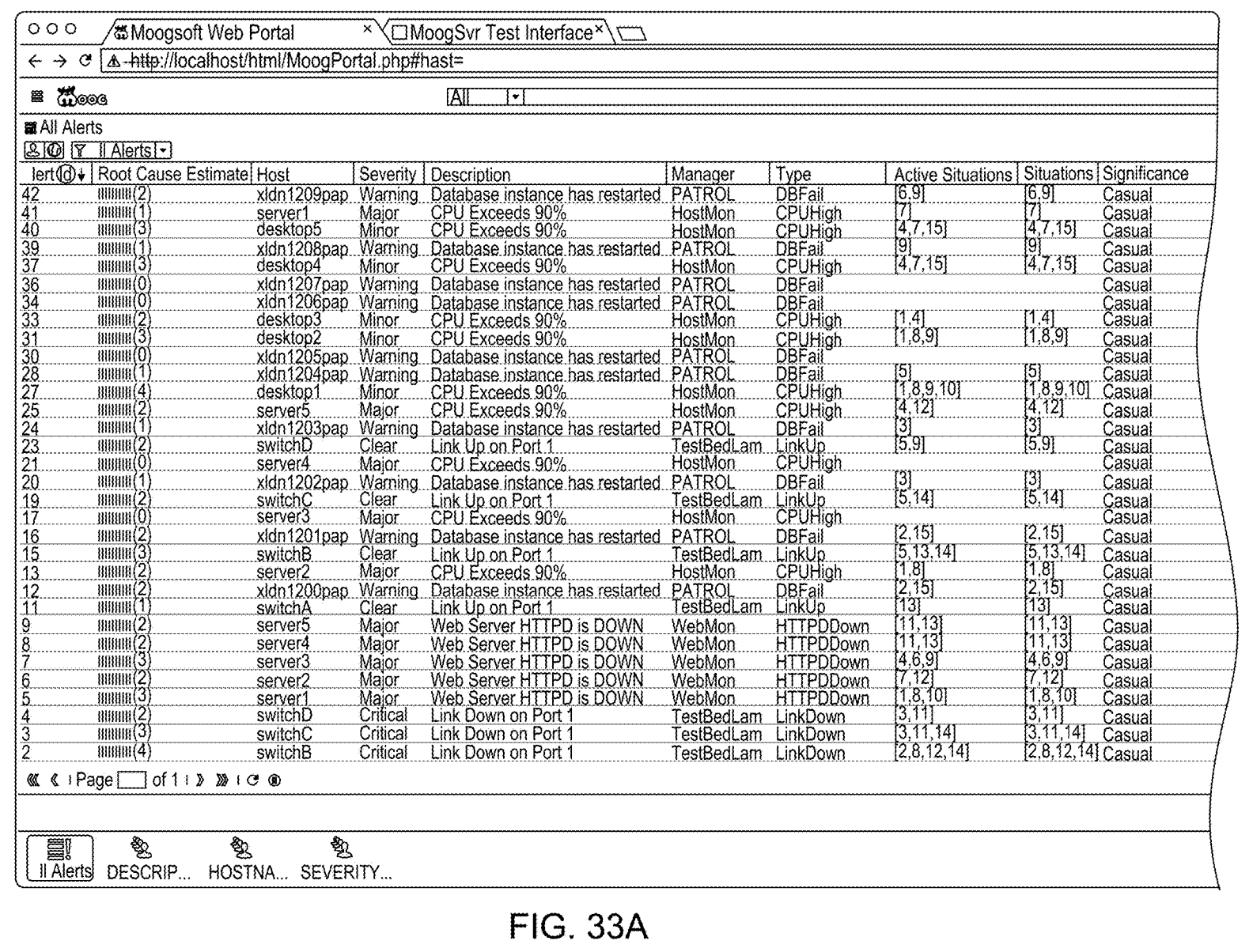
Figure 33B:
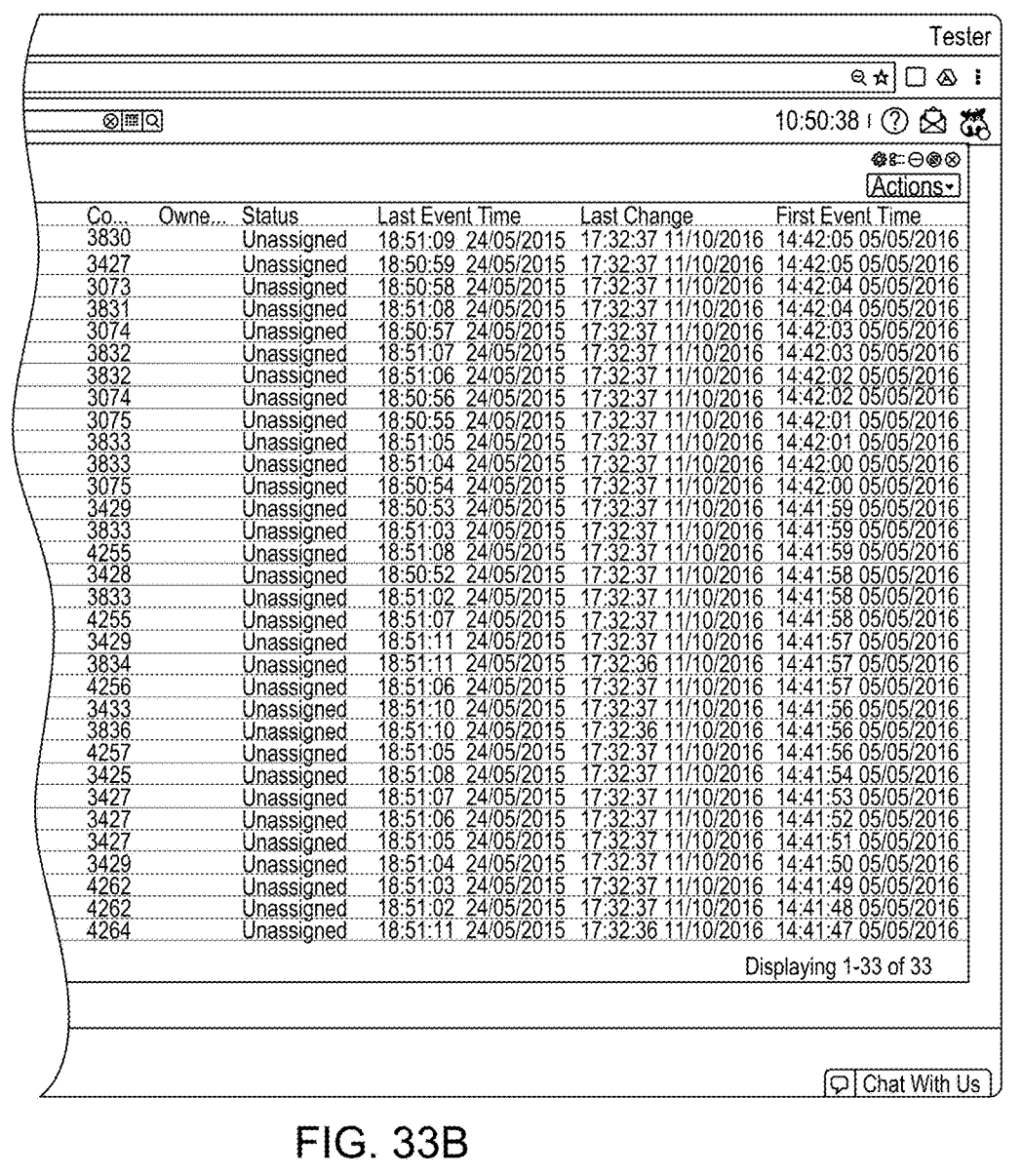

In one embodiment, illustrated in FIGS. 33(a) and (b), a column represents a time and can be sorted in any time desired. In one embodiment system 10 assigns an importance of a parameter based on time. As non-limiting examples, time can be handled a number of different ways including but not limited to as: an absolute value; an assembled parameter, in order of arrival. e.g., the first, second, third to arrive; ordered by time, severity and the like. In this manner an arrival order can be based on any parameter and not only by severity.

As a non-limiting example, and referring to FIG. 34, a slide demonstrates an example of parameters/features of a subject. Also illustrated is how system 10 deals with events relating to that subject. As a non-limiting example, a parameter/subject features table can have four attributes of the subject which some numeric and others are text. System 10 turns the non-numerical parameters into numbers.

In one embodiment if parameters are numeric then they are all entered without further conversion action by system 10. If they are not numerical, a yes/no answer is turned into a number, where the yes become 1's and the no's become 0.

In one embodiment a parameters can have multiple attributes. System 10 provides for different categories as well as the creation of as many columns as there are categories. Machine learning algorithms, including but not limited to Boolean, are utilized. In one embodiment a Boolean value is assigned to a column.

In one embodiment severity is a number of a feature vector and occupies one column of the feature vector.

As a non-limiting example system 10 can use shingles which are multiple letter segments of a word. In one embodiment system 10 does this for all host names. As a non-limiting example system 10 can receive a number of shingles. As a non-limiting example, the word "switch" has six shingles in it.

As a non-limiting example, a parameter can include a plurality of words. As a non-limiting example there can be three host names. In this embodiment the number of columns required is the number of unique shingles across all host names.

In one embodiment system 10 looks at individual phrases rather than shingles. Again, in this embodiment system 10 is dealing with words and phrases that have meaning and need to be converted to numerical values. The feature vector needs as many columns as there are unique words.

In one embodiment manager changes from organization to organization and it is the term provided by an organization. As a non-limiting example manger can be the name of the computer system/process that generated the event. Each organization can use different terms for any event/alert. System 10 can include a plurality of columns in the feature vector. As a non-limiting example these can include severity, host name, and the like. In one embodiment the columns represent the description, and columns can also represent the manager.

In one embodiment when system 10 examines text parameters system 10 goes through tokenization to convert sentences into words and can get rid of stop words. In one embodiment stemming is used to de-pluralize words.

System 10 can utilize a variety of different ways to deal with text-based parameters, including but not limited to: shingling, tokenization, and the like, and a variety of ways to handle non-numeric parameters. System 10 can mix and match these. System 10 can apply any text-based parameter extraction methods to any text-based parameter. System 10 deals with attributes, text or numeric, by a plurality of methods of handling different types of parameters and can use any of those handling techniques. In one embodiment system 10 mixes and matches any of the preceding. In one embodiment for parameters that represent categories, a number or text-based fields can be treated as a category. This is another way of doing the mixing and matching. System 10 can treat the same parameter in a plurality of ways in the same model.

As a non-limiting example, severity can be treated as a numerical value of from 0-7, with 0 being the lowest value. There is a natural order to this and represents the significance of a parameter. System 10 can treat it as a number as well as a categorical parameter. System 10 can constrain variable length shingle or word lists to a fixed size feature vector. As a non-limiting example this allows system 10 to apply a system parameter, or solution to an event from organization A to organization B. In this regard, system 10 can use what has been done for one organization to other organizations. As a non-limiting example, a category at a high level is what does this event representation. In one embodiment system 10 can proceed further into the parameters of the event. As a non-limiting example some parameters represent categories as well. For example, manager can be a category. In one embodiment of an event, a categorical parameter is different values represent un-connected attributes. The individual components are the parameters.

Figure 35:
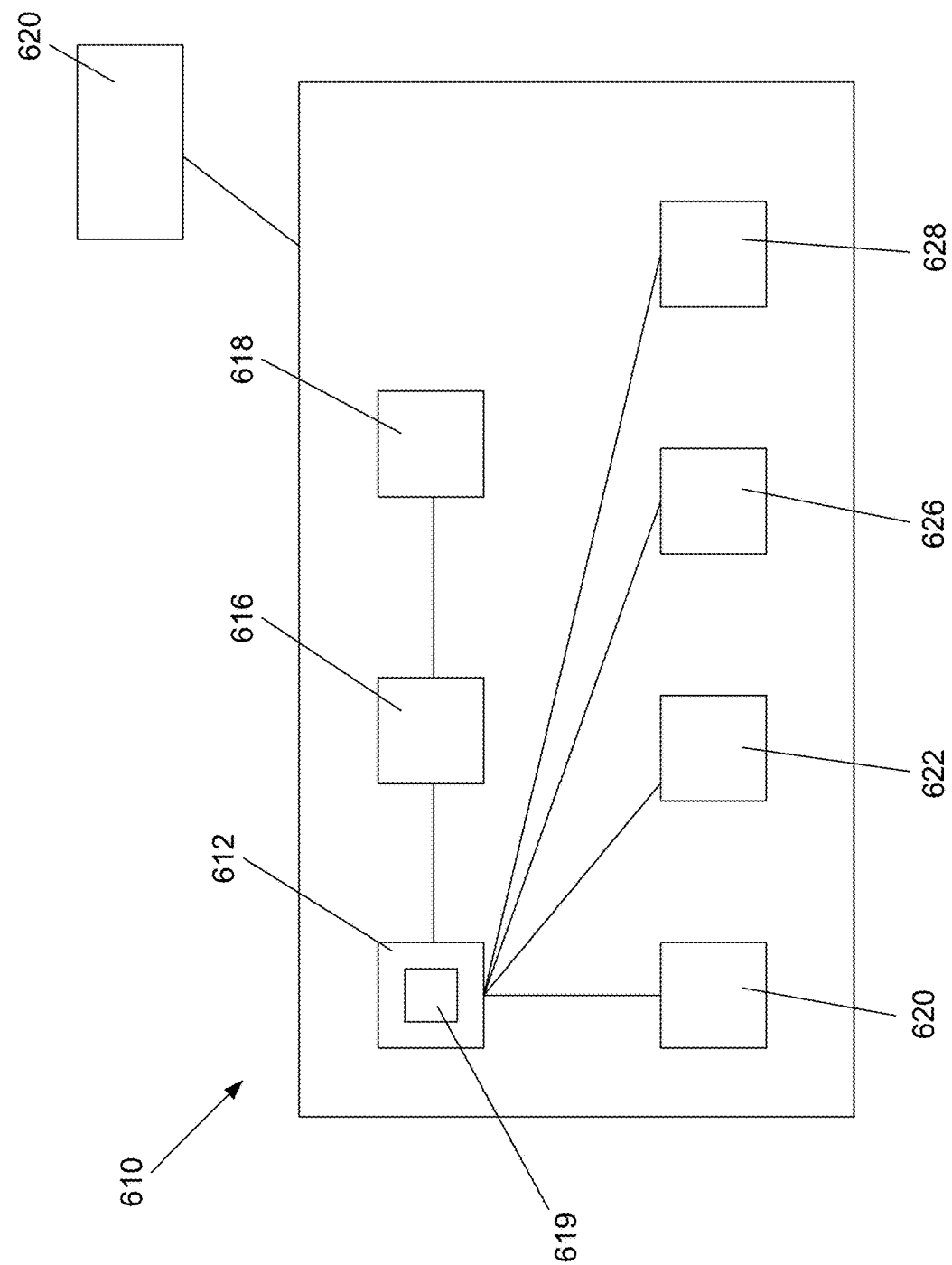
FIG. 35 illustrates one embodiment of an agent technology system.

As illustrated in FIG. 35 in one embodiment an agent technology system 610 includes a statistical analytical engine 612. In one embodiment agent technology system 610 detects anomalies before generating an event.

In one embodiment the statistical analytical engine 612 is coupled to a managed server 616 and to an ATOps server 618. A cloud system 620 can be in communication with engine and servers 612, 614 and 616 respectfully.

In one embodiment the statistical analytical analytic engine 612 executes a collection of software components, including but not limited to one or more statistical algorithms.

Figure 3:
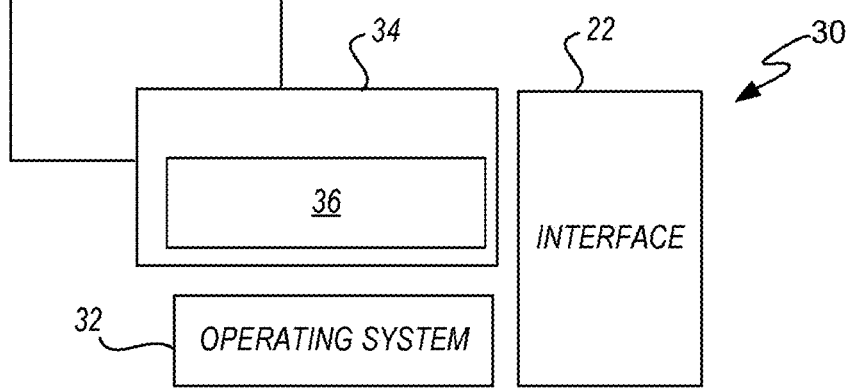
FIG. 3 illustrates an embodiment of dashboards that can be accessed by users of the event clustering system.

In one embodiment the statistical algorithm can be executed using software system 30 of FIGS. 3(a) and 3(b).

As a non-limiting example, the statistical analytical analytic engine 612 includes a platform 619. As a non-limiting example, the platform 619 conducts discovery and fingerprinting and runs tests on these on a box 620 that it runs on.1

As a non-limiting example, the statistical analytical engine 612 executes a configurable collection of agent technology system 610 tasks that can be run to probe hardware of a managed infrastructure 14 which are then used to compare against templates to identify a hardware element such as a device of managed infrastructure 14.

In one embodiment the statistical analytical analytic engine 612 acts, receives or includes a system monitoring policy 622. As a non-limiting example, the monitoring policy can include but is not limited to: a collection of rules, libraries, programs that instructs an agent 624

In one embodiment there can be an unbounded number of agents. In one embodiment the statistical analytical analytic engine 612 actively polls for data or configures itself to set up and receive data relative to managed infrastructure 14.

In one embodiment agent technology system 610 includes a plurality of data centers 626. In one embodiment technology system 610 uses statistical analysis to analyze data from data centers 626. As a non-limiting example, a library of statistical analysis tools is used to determine when a value of received data is anomalous from a standard value. In the event an anomaly is detected by agent technology system 610 generates an event that is sent to the ATOps server 618 for processing. In one embodiment agent technology system 610 also allow an envelope on either side of the anomaly to be recorded in a database for further analysis. In one embodiment the further analysis is done at a later time. In this manner agent technology system 610 greatly reduces the amount of data that is analyzed because anomalies are detected first.

In one embodiment the anomaly is in an object definition. In one embodiment a definition file is provided that defines a management policy that an agent executes, including but not limited to: how/when to retrieve data, process and detect anomalies, and the like.

Figure 36:
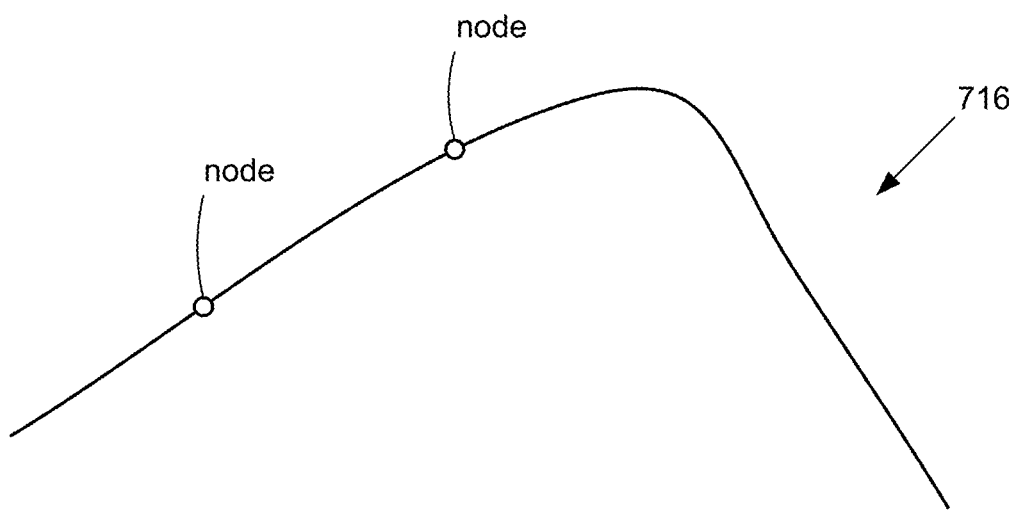
FIG. 36 illustrates one embodiment of the system utilizing graph theory to optimize events and alerts.

In one embodiment, illustrated in FIG. 36, system 10 uses graph theory to optimize events and alerts and provide greater accuracy. In one embodiment system 10 includes a plurality of techniques to provide optimization of the nodes of graph 710. In one embodiment graph 710 is graph 232. As a non-limiting example graph theory is used to provide attributes of graph 710 of events.

As a non-limiting example graph 710 can be used to represent any relationship between things relative to managed infrastructure 14. In one embodiment system 10 creates a graph 710 where each node represents an event, and an edge of graph 710 represents if there is a relationship between the events. As a non-limiting example, a determination the relationship between events can be a determination if all of the events arrive at about the same time, are the events connected to the same IP service, and the like.

In one embodiment each node can be related to each other node. In graph 710 the existence of the edge can be a 1 or a 0, e.g. which is a relationship or not. Additionally, there can be an edge with a value between 0 and 1. The closer the value is to 0 represents a weaker relationship and the closer the value is to 1 represents a greater relationship.

Graph 710 of events is used with graph theory to group together events that are similar to each other. As a non-limiting example maximal connectivity is utilized.

In one embodiment system 10 reviews graph 710 and determine if nodes are related in a group. When the nodes are highly related in a group a situation is created. However, there can be a large collection of nodes and some sections of graph 710 can have dense connections but two or more of the dense connections can be very separate. As a non-limiting example there may only be one connection two sets of the dense connections.

In one embodiment a detection algorithm is used with graph 710. As a non-limiting example, the detection algorithm can be a community detection algorithm. In one embodiment graph 710 can have a community structure of the nodes of graph 710 can be easily grouped into (potentially overlapping) sets of nodes such that each set of nodes is densely connected internally. In the particular case of non-overlapping community finding, this implies that the graph 710 divides naturally into groups of nodes with dense connections internally and sparser connections between groups.

In one embodiment the detection algorithm is an algorithm for finding communities. As non-limiting examples the community detection algorithm can include: Louvain; external optimization; modularity and the like.

As a non-limiting example, the detection algorithm identifies the groups of highly connected nodes to determine if they are related. Modularity and Louvain algorithm are examples of community detection algorithms, there are others.

Another attribute of the graph 710 is the clustering coefficient to perform the preceding. In one embodiment community detection algorithms are used to group alerts into operationally significant collections where the collection is a situation.

In one embodiment the detection algorithm is used and determinations are made as to the similarity of event arrival patterns.

Figure 37:
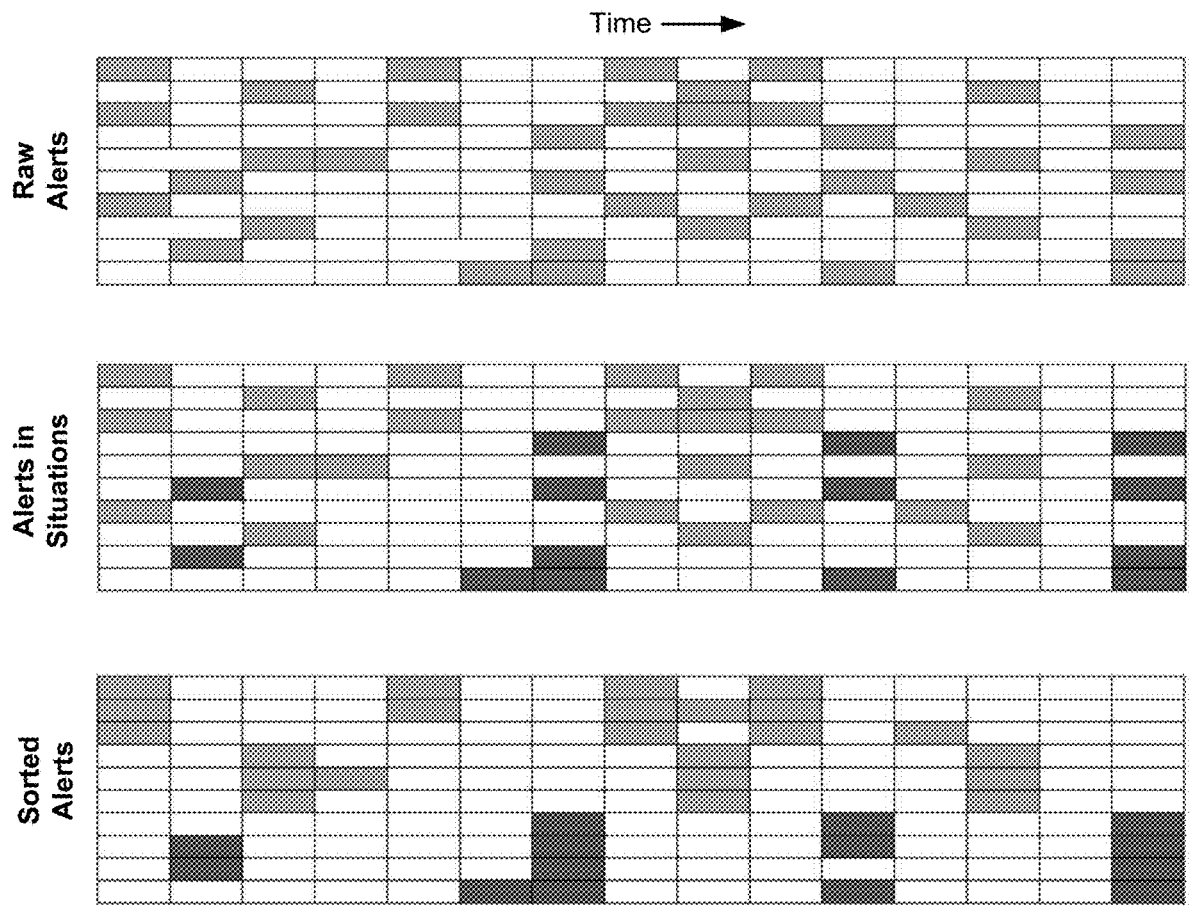
FIG. 37 illustrates rows of alerts in one embodiment of the present invention.

Referring now to FIG. 37 each row represents an alert where an alert is made of multiples events. As a non-limiting example in row 1 there are 4 events. FIG. 37 uses three block shades. The second block shade codes the alerts that have a similar set of arrival patterns. The third block is the second block re-ordered.

The first and second rows have similar arrival patterns and we system 10 assigns a similarity value to the first three rows. As illustrated with the third color there are very limited arrival patterns. Rows 4, 5 and 6 have some similarity of arrival patterns. However, with these rows graph 710 is a weighted graph with a low value.

The different blocks show that there are different types of situations.

The rows are compared with each other a similarity matrix is created. In one if there is an adjacent matrix can apply a plurality of graph theory techniques can be applied, including but not limited to community detection and equivalents.

In one embodiment system 10 uses semantic clustering. In one embodiment system 10 used semantic clustering of events of events, more particularly to use semantic clustering that looks at text description of events, analyses the words in the description, and groups them with other events when there is significant overlap.

As described herein the following definitions are used:

Event—A log message or notification from an underlying monitoring system. It does not necessarily represent a fault condition, but fault conditions will cause at least one event to be emitted.

Alert—A state-based grouping of identical events. The first occurrence of an event will generate a new alert and each subsequent occurrence of the same event will also be associated with that alert. This process of "de-duplication" continues until the alert is closed by an operator. The next time an instance of the event is observed a new alert will be created and so on.

Incident—A support ticket raised as a result of a failure or service interruption. An incident is a prompt for remediation action and can be triggered manually or by a monitoring system.

Situation—A group of alerts that can be used to raise an incident.

As a non-limiting example AIOps have many different modules to facilitate processing of events and the creation of alerts and situations. The modules used to group alerts into situations, hereafter: ("Sigalisers")

As a non-limiting example alerts are aggregated and grouped into situations.

In one embodiment system 10 decomposes events from managed infrastructures using data-driven fault localization. More particularly system 10 decomposes events from managed infrastructures with semantic clustering.

In one embodiment semantic clustering is used. Semantic similarity is a metric defined over a set of documents or terms, where the idea of distance between them is based on the likeness of their meaning or semantic content as opposed to similarity which can be estimated regarding their syntactical representation (e.g. their string format). These are mathematical tools used to estimate the strength of the semantic relationship between units of language, concepts or instances, through a numerical description obtained according to the comparison of information supporting their meaning or describing their nature.

As a non-limiting example a naive metric for the comparison of concepts ordered in a partially ordered set and represented as nodes of a directed acyclic graph (e.g., a taxonomy), can be the shortest-path linking the two concept nodes. Based on text analyses, semantic relatedness between units of language (e.g., words, sentences) can also be estimated using statistical means such as a vector space model to correlate words and textual contexts from a suitable text corpus.

As a non-limiting example several tools are used to measure the semantic similarity between concepts, including but not limited to: WNetSS API, which is a Java API manipulating a wide variety of semantic similarity measurements based on the WordNet semantic resource.

Semantic clustering is the implantation of data is a mathematical representation of text. Text is taken from an event source, manipulated to produce a feature vector, and the vector feeds into a clustering engine.

In one embodiment vector quantization is used for cluster analysis. As a non-limiting example, a K-means algorithm, or equivalent, is used.

In one embodiment system 10 operates in a streaming manner and is done all the time. As a non-limiting example every time an event arrives allocate it to a cluster or a new cluster is created.

In one embodiment the clustering engine executes on a sliding window of data on a period basis. As non-limiting examples a variety of different periods can be utilized including but not limited to: once every minute or two. In this embodiment system 10 periodically takes a snapshot of the prior X minutes of data to group data alerts. In one embodiment this is done in two parts. The first part is a generic form of feature extraction. In one embodiment the attributes of an alert are used. System 10 uses a core set of attributes. As non-limiting examples the core attributes include but are not limited to: arrival time, and the like. These attributes are those for grouping data around. The choice of attributes that are brought together, e.g., with similarity, are taken at a deployment level that is decided by the client.

These attributes are turned into a feature vector that is executed using the sliding data worth of data. Similarity of the attributes is then grouped together.

When there are number of true/false Boolean states it is necessary to test Boolean states. The result is a determination what is true and false. This has been done by checking each state individually.

In one embodiment an anomaly engine is configured to perform bitwise operations. This allows a great amount of information to be processed in one operation. As a non-limiting example this can be achieved in one byte.

Instead of checking the true/false Boolean states individually system 10 sends a bit sequence that is decomposed at a receiving end of the monitoring system. As a non-limiting example, the monitoring system look at the byte sequence and compares that against a known state. When there isn't a match then there is an anomaly.

Since a byte is 8 bits, a single byte can convey 8 times the information that a single bit/boolean [000332] can.

As a non-limiting example if system 10 monitors eight boolean states on a single system, traditionally that would be eight separate checks.

In one embodiment eight states can be conflated into one check.

As a non-limiting example that can be represented (in JSON for example) as:

```
{
  "thing_one": true,
  "thing_two": false,
  "thing_three": false,
  "thing_four": true,
  "thing_five": true,
  "thing_six": true,
  "thing_seven": true,
  "thing_eight": false,
}
```

Then, bitwise allows us to evaluate the state in one operation

"acceptable_states": ["01100001"]

With "acceptable_states" being a mask that is applied using an XOR logical test.

Now, if the JSON payload has any false that is true (or vice-versa) it will be considered an anomaly. Multiple masks are permissible, i.e:

"acceptable_states": ["01100001","01100000"]

Would allow "thing_eight" to be either true or false without being an anomaly.

Furthermore the system can dispense with JSON entirely. The JSON blob/payload example above requires 181 bytes, since there are 8 bits in a byte, we could convey the same information with a single byte, in a very simple form of serialization (or binary encoding).

The single byte ASCII character "a" is 01100001 in binary. The character "c" is 01100011. So if I see the character "a" no anomaly, but "c" tells me "thing_seven" is now "false".

As a non-limiting example one single character can send information back to the monitoring system. Monitoring system then has an ability to only send information when there is an anomaly. This enables monitoring system to send a great deal of true/falses. In this manner the anomaly engine is capable of performing bitwise operation and, then a considerable amount of information can be processed in one operation.

Figure 38:
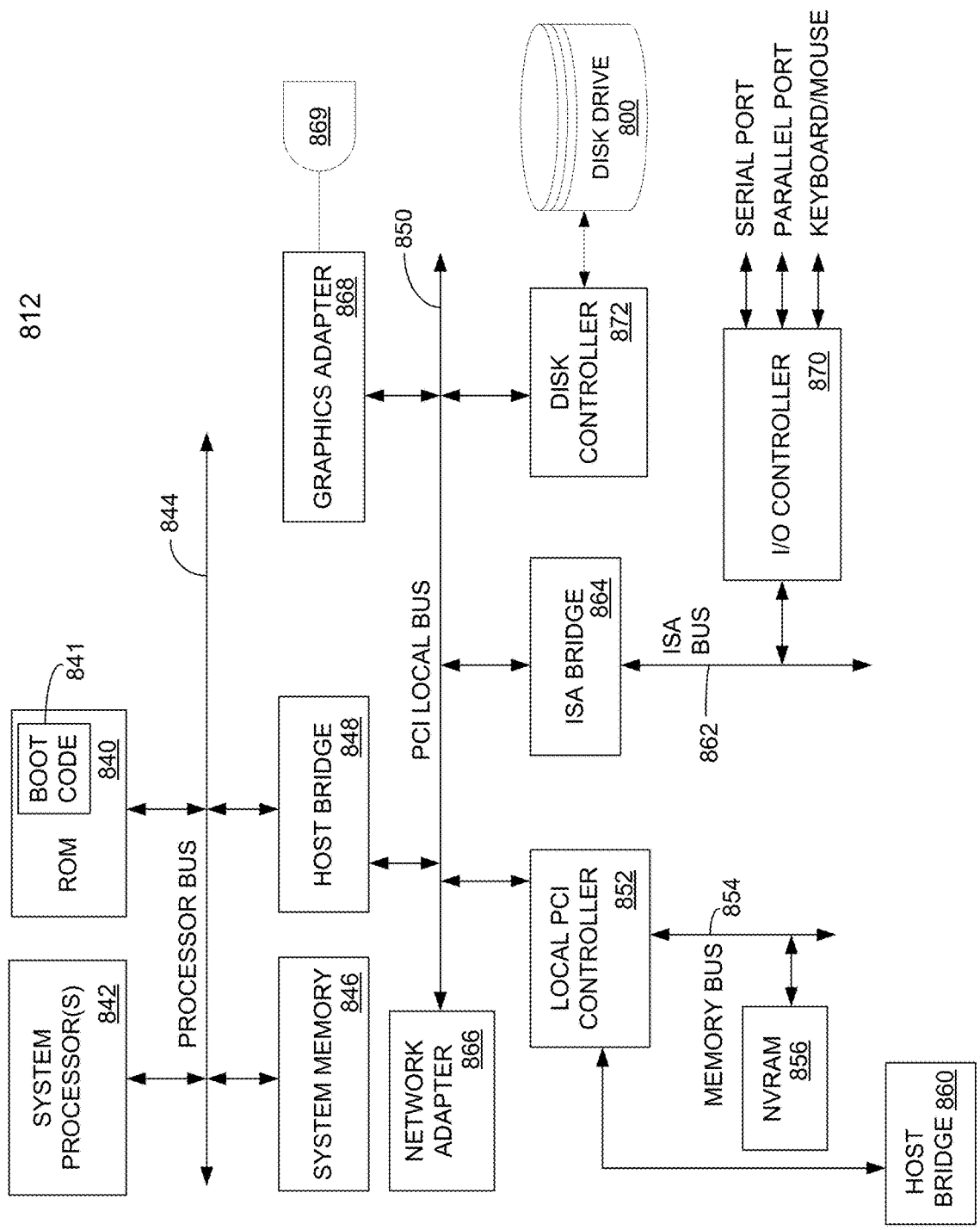
FIG. 38, one embodiment of a computer system 812 used to execute the algorithms described herein is described.
Figure 39A:
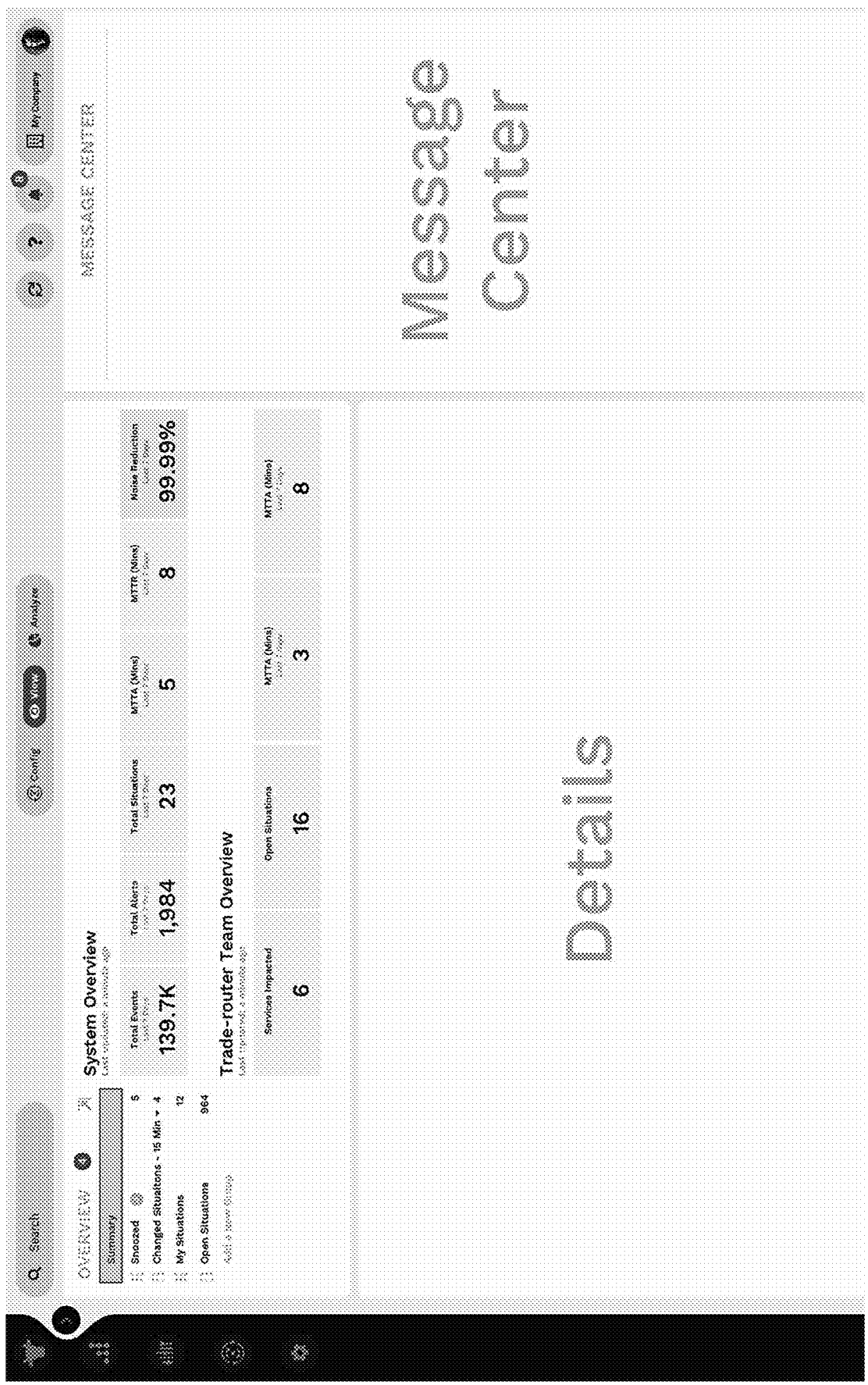
FIGS. 39($a$) through 39($i$) illustrate various screenshots that can be used with various embodiments od the present invention.
Figure 39B:
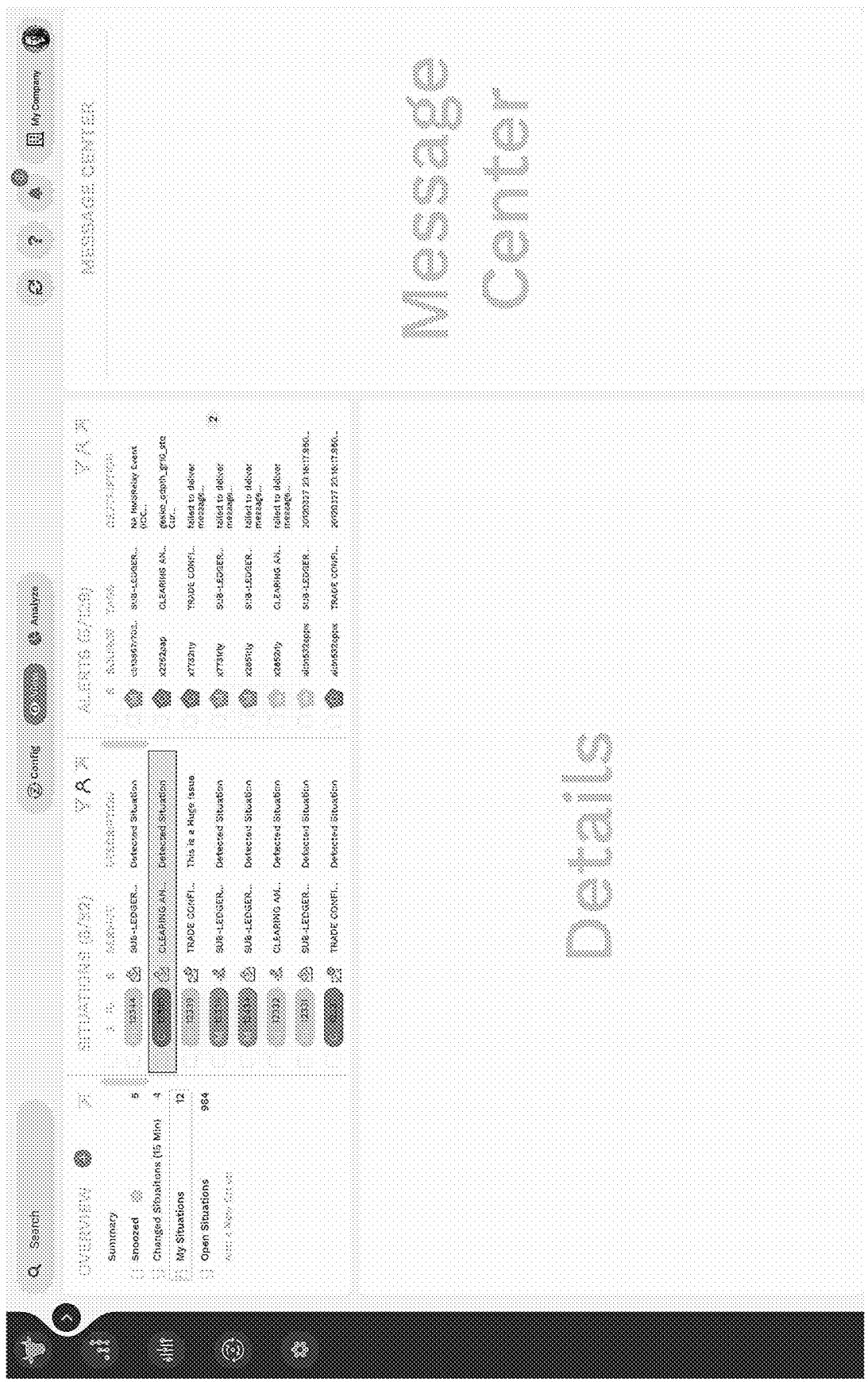
Figure 39E:
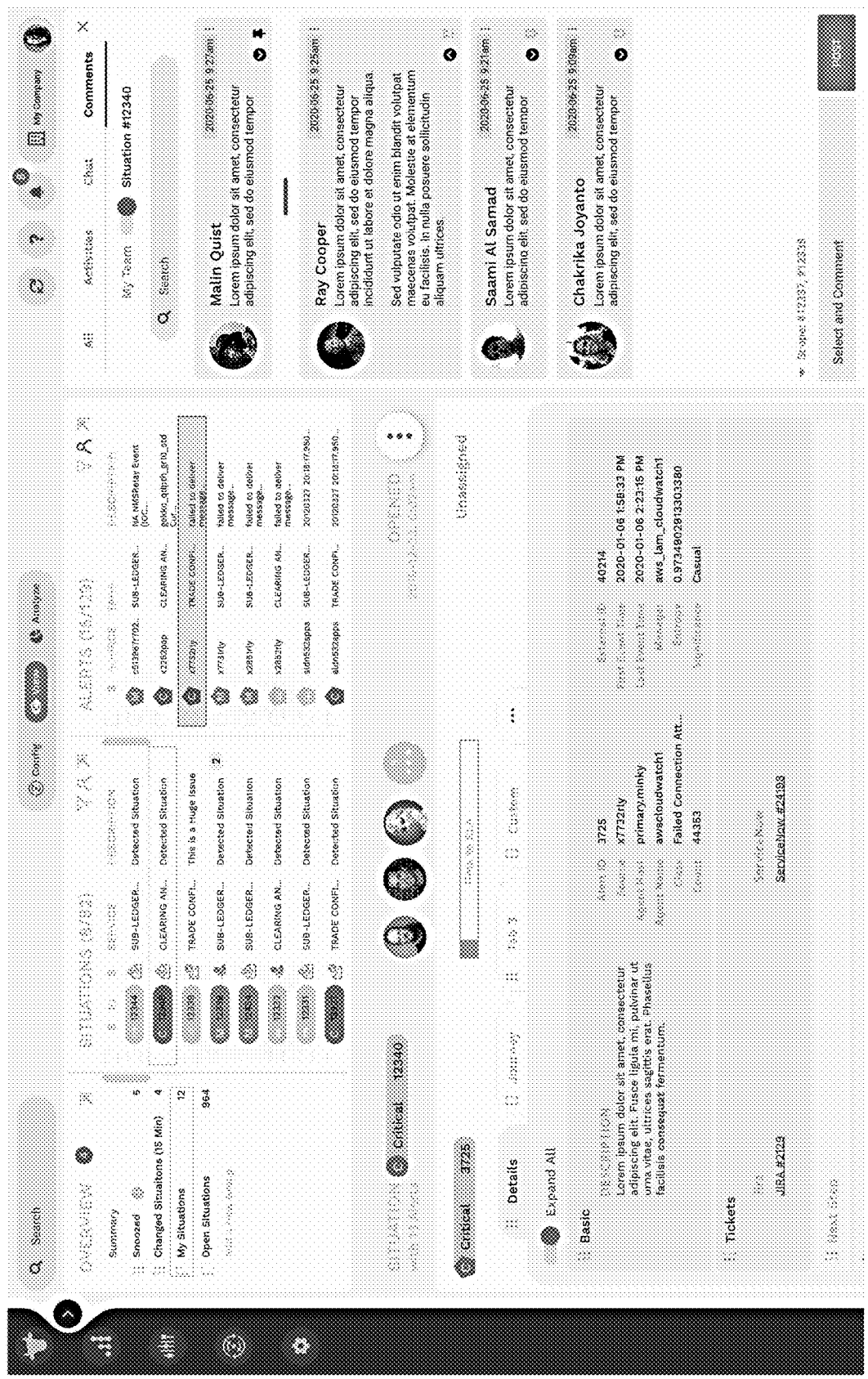
Figure 39I:
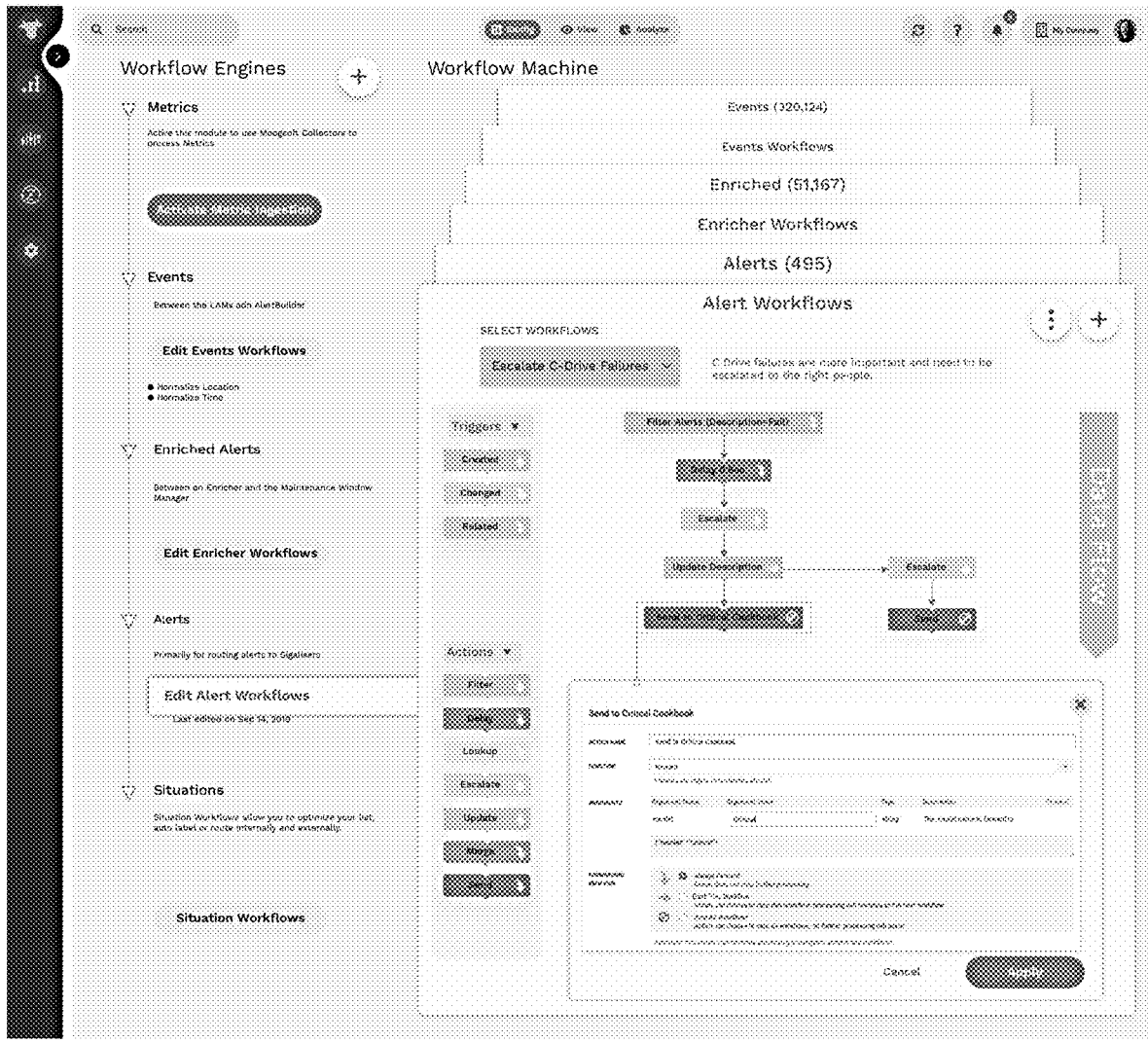

FIG. 38 illustrates one embodiment of a computer system 812 that can be used to execute the algorithms and described herein. It is to be understood that system 812 is provided by way of an illustrative and non-restrictive example and that of course other types of computer systems can be employed with the embodiments of the invention set forth herein. All of the system components disclosed previously may be included in computer system 812.

Computer system 812 can be any general use computer, mobile device, and the like.

As illustrated in FIG. 39, the computer system 812 includes at least one system processor 842, which can be coupled to a Read-Only Memory (ROM) 840 and a system memory 846 by a processor bus 844, which can be bus 28 disclosed above. System processor 842 may be a general-purpose processor that as a non-limiting example executes boot code 841 stored within ROM 840 at power-on and thereafter processes data under the control of operating system and application software stored in system memory 846. System processor 842 is coupled via processor bus 844 and host bridge 848 to peripheral component interconnects (PCI) local bus 850, which can be bus 28 disclosed above.

In one embodiment PCI local bus 850 supports the attachment of several devices, including adapters and bridges. As non-limiting examples these devices can include network adapter 866, which interfaces computer system 812 to Network Systems (not shown), and optionally to graphics adapter 868, which interfaces computer system 812 with an optional display 869, which can be display 24. As a non-limiting example communication on PCI local bus 850 is governed by local PCI controller 852, which is in turn coupled to non-volatile random-access memory (NVRAM) 856 via memory bus 854. Local PCI controller 852 can be coupled to additional buses and devices via a second host bridge 860. Either bridge can be the bridge discloses previously.

As a non-limiting example computer system 812 includes industry standard architecture (ISA) bus 862, which is coupled to PCI local bus 850 by ISA bridge 864, which can be the bridge, discloses above . . . . Coupled to ISA bus 862 is an input/output (I/O) controller 870, which controls communication between computer system 812 and attached peripheral devices such as a keyboard and mouse. In addition, I/O controller 870 supports external communication by computer system 812 via serial and parallel ports. In one embodiment a disk controller 872 is in communication with a disk drive 800.

In one embodiment, multiple patterns of syntax are used. There are fixed and variable parts of the text. From these syntax patterns alerts are determined. As a non-limiting example there are only about twenty different syntax patterns. In one embodiment examples of the text data are used. Thereafter a statistical determination is made relative to what patterns are in the text. A syntax pattern engine does a mapping to deduce a syntax breakdown. This provides an associated of syntax patterns as an alert. When this produces a number of syntax patterns it is determined that there is an alert.

As non-limiting examples there are four main kinds of syntax patterns: single-term patterns, abbreviated S-pattern; head patterns, abbreviated H-pattern; ellipsis-head patterns, abbreviated EH-pattern; action patterns, abbreviated A-pattern. In one embodiment a fifth kind of syntax pattern is A fifth kind, list patterns (abbreviated L-pattern), is a syntactically restricted subset of single-term patterns.

As a non-limiting example, unstructured data can be used with embodiments (1) to (3) as follows:

(1) In one embodiment, a graphical visual system or method takes unstructured data and creates labelled data suitable for training a supervised machine learning model. This also provides a visual configuration mechanism for a data ingestion process.

(2) In one embodiment, a method or system consumes training data created through (1) or by any other mechanism and trains a supervised machine learning model. The process consumes unstructured data and produces operationally useful events.

(3) In one embodiment, a method or system consumes training data created through (1) or by any other mechanism and trains a supervised machine learning model. This process consumes either events created through (2) or by other means, or other unstructured data and from that can infer operationally useful attributes of the events in order enrich them to improve event correlation and root cause analysis.

All or a portion of embodiments (2, 3) can produce an output. As a non-limiting example, the output can be used for clustering.

The following embodiments can be used with: (1), (1,2), (1,2, 3), (1,3), (3) above, and the like.

In one embodiment, system 10 provides a visual creation tool to create labelled training data suitable to train an artificial intelligence model (AI). The resulting AI model can be used to take unstructured data and create operationally useful events.

In one embodiment, the visual creation of training data to generate the AI model provides: (i) identifying alert 'templates' from unstructured data—whereby 100,000's events contract to 100's of 'templates'; (ii) a visual mechanism for configuration of a data ingestion process such as a 'LAM'. The visual tool uses alert 'templates' to map tokens from the unstructured data to specific event attributes and prompts users with suggested mappings for the remaining templates. The system learns from user interaction. The system removes the need for complex manual configuration steps during the data-ingestion process.

In one embodiment, the visual creation of training data that can be used to generate an AI model, represents each item of unstructured data as a 'Directed Graph', where each token (a word or a phrase) is a vertex in the graph, with directed edges between adjacent tokens, a so-called token-graph. In one embodiment, the application of graph theory allows a deduction of event 'templates. Each template can be marked-up to provide a single training example for the AI model. The application of graph theory allows the deduction of i) distinct paths; (ii) loops (parallel subgraphs); (iii) converging paths; and (iv) diverging paths within the token graph.

In one embodiment, (2) and (3) above, provides attribute inference where an event attribute can be assigned using one or more tokens from the input data that is a classification problem.

In one embodiment, (2) and (3) infers provides attribute inference where an event attribute can be assigned values that do not appear as a token in the input data.

In one embodiment, (1), (2) and (3) can be used as dependent processes in a data pipeline or as standalone processes. An individual token from the input data is selected for attributes such as source and time. As a non-limiting example only the best token is selected for each attribute. Other alert attributes, such as description and signature are constructed using multiple tokens from the input data. As a non-limiting example, only the best set of tokens are considered. A token may be assigned to or used within multiple attributes.

In one embodiment, (2) and (3) provide for so-called sequence modelling. In one embodiment deep-learning is used for sequence problems utilising uni-directional and bi-directional RNNs and LSTMs.

In one embodiment, (3) provides attribute inference using a so-called many-to-many sequence model, employing multi-class and multi-label classification techniques.

In one embodiment, (3) provides a severity prediction using a so-called many-to-one sequence model, employing multi-class classification techniques; and severity prediction is based on all tokens of the input data assigning one value from: critical, major, minor, warning, indeterminate or clear.

To allow the full advantage of the user's screen the design will adjust to fit the screen and provide as much data on the screen as possible, as illustrated in FIGS. 39(a) through 39(i)

To best use the given space for different types of lists, system 10 provides Multi List. This will allow an optimized usage of the real estate on the screen and reuse of that space for other lists, where we match and anticipate the user's actions.

Any list could have an overview or a summary that explains what this list entails. This could be count, average or any other calculations that explain a summary of information in this list.

The first column of the list view shows the high level grouping of items inside of a list. These could be any calculated groups by the system, e.g. "Open Situations", or user generated grouping, e.g. "My Important Situations".

Selecting a High Level Grouping will hide the Overview/Summary and shows the items inside that list.

Narrow Multi-List View

In this mode the Multi-List shows 1 or more sublists. This works like a folder hierarchy. As the user selects one item we display the sub-items inside it. In one embodiment, we can show a list of Situations and when one is selected we show the list of Alerts that belong to that particular situation.

Lists often have numerous columns that are needed to be in the view. A narrow list view can only show a small set. A small control on top of each list sub section can expand that narrow view to a wide view, displaying many extra columns belonging to the list data. In one embodiment this wide view can display the list of Situations. In another embodiment the wide view can display the list of Alerts. Both examples are displayed below.

In some cases the users might want to take advantage of the wide view. A similar functionality to a tab user interface is built into Multi-List that allows the user to stay in wide mode and easily switch between different lists. In one embodiment we can have 2 lists. In another embodiment the Multi-List could have 3, 4 or more lists, acting the same way.

Selecting a single item in the list displays the details of that item on the screen. In one embodiment, the details can be displayed at the bottom of the list. In another embodiment the details can be displayed to the right side, or left side or top of the list.

When working with lists, one often wants to select multiple items in a list. Then they can choose to compare, move, copy, create sub-groups or other actions with that subset.

The Carousel view has been designed to show multiple items side by side for comparison and other processing purposes. In one embodiment 3 items can be displayed side by side.

In another embodiment any number of items can be selected, but only 2 or 3 will be displayed side by side. In such a case a user interface control allows the user to rotate between all selected items and do side by side comparison for those in the view.

In the following example 19 Alerts were selected and the user interface shows 3 of them side by side. The interface can also show where the selected items have similarities and where they differ. One embodiment is to show this using color. Another embodiment is to show the details they have in common on top in one section and show those details not in common in another section below it.

In this example the details named "Agent Name" and "Class" are similar/common between all selected items and they are displayed with a different color on the screen.

It also shows a control on top of the Details section that shows 3 items in the view, with 4 items before them and 12 items after them. This is the control that allows the user to flip through and rotate the Carousel view to look at another set of 3. In other embodiments 2, or 4 or more items can be displayed at the same time in the Carousel view.

In one embodiment of Carousel view, 3 Situations are shown side by side for visual comparison. Often situations are viewed, compared and might get merged if they are related to the same issue at hand. In this view users can easily see what is in common among them.

Please note that the Multi-List shows 5 alerts that are in common in all the selected Situations. This is another feature of Multi-List, it can show the intersection of what is common among multiple item selected.

Other Embodiments of Multi-List View

Multi-List is a generic tool that can be used to manage many hierarchical list. Here are a few more embodiment of Multi-List:

A group of people can be formed into a team to be given different types of permissions or access. Each person could be working on different situations. This creates another hierarchy that can be managed using the Multi-List.

Devices in the network can be grouped by type, location or usage. This creates another type of hierarchy that can be presented and managed by the Multi-List Products as complex as monitoring systems have many settings and configurations. These settings can be organized in type, application or access level. This creates another hierarchy that can be managed using Multi-List.

In electronic monitoring systems raw data comes from many sources, events, logs, metrics, and as such. Such data get processed through many steps, like deduplications, correlation and enrichments. The processed data is presented in enriched and modified form that are much more informative and useful to the user. Sometimes these steps need to be studied and fine tuned. The user likes to know what steps the data went through and what happened to it until it arrived at the current view. To visualize that a time style machine has been invented to display the steps and intermittent data in the flow of data processing.

In one embodiment of Time Machine, the user can see the flow of the data and all of the steps along the way. In this case the user can select tabs that represent each step, see what processing was done and the list of modified data.

One embodiment of Time Machine shows how one can change the configuration of the processing step and modify the results list or the detail of each item in the list.

Looking at the list of items one might wonder how and what processes were done for this item to arrive at this point. These processes could be deduplication, enrichment, correlation or any other cleanup, enhancement or modification. The easily see the source and path the data walked through the system an Alert Journey view can be invoked by invoking the Workflow Time Machine.

The user can step through processing steps using the user interface provided to see the detail of each step. In one embodiment these controls can be present as arrows with numbers on them showing how many steps before and how many steps after the current step.

The Workflow Time Machine can also show the origin of the data. The data could be brought into the system via Native Integration, Event API, an installed Collector, a Metric API or other systems.

In one embodiment the source of data can be represented as Channels inside the user interface.

In network monitoring systems and other similar services, users pass on responsibilities to another user when they finish their work, or change shifts. When one is done and another person needs to take over, there is a lot of information to be passed on. Pinboard has been invented to facilitate such collaboration.

Any essential object in the system can be dragged and attached to the Pinboard. The object will know how to display itself on the Pinboard. The object is a live entity in the system and can update itself.

These objects follow the access control rules built in the system and can be displayed to those who have the right access.

Each user can have multiple Pinboards. These Pinboard can be used for personal collection of important objects. They can also be shared via a shared link. Once shared the link can be opened by those who have access to the system and only objects that have the right view access will display themselves to the new user.

Pinboards are collaboration tools, just like an envelope that can contain many items and can be used as a delivery vehicle to share live information.

In one embodiment of the Pinboard the user interface shows a minimized version of the Pinboard at the bottom of the screen where objects can be dragged and dropped on the Pinboard.

When hovering or clicking on the minimized version of the Pinboard the user interface changes and the Pinboard opens into a Drawer View. In this embodiment of the Pinboard, the user can see the items on the Pinboard in a narrow strip, scroll through them but still have other items and interfaces on the screen behind the Pinboard.

In another embodiment of the Pinboard, the controls on the Pinboard can be used to maximize the Pinboard to take most part of the screen and show all types of objects that have been posted on the Pinboard.

A Pinboard can be shared with other users. By sharing the Pinboard one gives access to the current Pinboard to another user. The other user can see live objects on the board shared with them. These objects follow access control and update live for all users who have access to them.

The Shared Pinboards can be shown as Tabs next to other personal Pinboards on the same user interface. In other embodiments the Shared Pinboards can be presented separate from one's own Pinboard.

As the data go through the system and events, anomalies, alerts, situations are captured and formed, one could benefit from seeing them in the order as they occurred. In addition, users could be taking actions that are important to see in order along with activities and important changes.

In one embodiment of such Timeline view we present details of metrics, logs, events, alerts, incidents, and situations and their changes. Those changes can be severity change, firmware upgrade, ownership changes or any other system update or user actions.

Followed by a list of activities on the same Timeline view can include:
1. Changes
2. Firmware update
3. Maintenance Window for managing devices and systems
4. Actions like taking ownership of something or making progress or closing an item
5. Adding comments
6. Chatting about the issues at hand
7. Any other important action taken by a person
8. Any other important change happening in the system This could be followed by another control to give an overview of similar items on the screen. By selecting a section of the overview items the list of items on the screen will be filtered, to help the user to find and focus on what matters. In this can the list of Alerts will be filtered when the overview section is selected.

The grouping of items on the Timeline can be done by many factors such as:

In one embodiment this grouping can be done based on Severity.

In another embodiment this overview grouping can be done based on Manager, which is the representation of the source of the data.

A cursor is provided to help the user visually follow items on the Timeline for more precise measurement. In one embodiment this cursor is represented as a triangle with a line crossing vertically across the entire Timeline view.

Metrics are data coming through the system, which have a defined threshold. If Metric measurement goes above or below these thresholds an Anomaly is recorded. Such Anomalies can create alerts to warn the user. How much the go above the threshold is important to the operator and to the calculation of Alerts and its severity.

The number of Anomalies and Alerts can be overwhelming. To present this is one view, a combined view is invented to show all anomalies and alerts on the timeline. In one embodiment Anomalies are represented as triangles on the timeline. They are above or below a flat line representing how much they were outside of the thresholds. If 2 or more anomalies are at the same point or very close to each other they are represented with a circle and the count.

The distance between the middle line and the triangle representing the anomaly is representing how much they were outside of their thresholds. This way all anomalies can be represented in the same view.

The user can click on a single anomaly to get the detail. By selecting one the view jumps from a relative overall view to an absolute single view.

In this relative overall combined view all anomalies are shown relative to the baseline. The distance between the baseline and anomaly is how far the anomaly has deviated from the defined threshold.

Events are represented on the same timeline with bars. This should help the user how events related to anomalies and the generated alerts from anomalies.

By selecting a single anomaly, the user interface changes to a single view showing the exact threshold for that anomaly and all other details related to that anomaly. These could include all the generated alerts and details about those alerts.

The user can switch view back to Relative Combined View by deselecting the one anomaly selected. In one embodiment this could happen by clicking outside of the chart or on a cancel button.

In one embodiment of the present invention, a system provides for management of a managed infrastructure. A processor is coupled to various engines. An extraction engine is in communication with the managed infrastructure. The extraction engine in operation receives messages from the managed infrastructure, produces events that relate to the managed infrastructure and converts the events into words and subsets used to group the events into clusters that relate to failures or errors in the managed infrastructure, including managed infrastructure physical hardware. The managed infrastructure supports the flow and processing of information. A sigalizer engine includes one or more of an NMF engine, a k-means clustering engine and a topology proximity engine. The sigalizer engine determines one or more common steps from events and produces clusters relating to events; the sigalizer engine determining one or more common characteristics of events and producing clusters of events relating to the failure or errors in the managed infrastructure, where membership in a cluster indicates a common factor of the events that is a failure or an actionable problem in the physical hardware managed infrastructure directed to supporting the flow and processing of information.

A user interface is coupled to a display. The display includes a screen with a screenshot having a space to display managed infrastructure information selected from at least one of: incidents or alerts. The screenshot provides multi-use of the managed infrastructure information provide a same amount of use and reuse of the space for other lists of incidents or alerts to match and anticipate an end-user's actions.

In various embodiments multi-list enables: management of a plurality of hierarchical lists; management of plurality of incidents with different number of alerts correlated and grouped together.

A plurality of users can be formed into a team with different types of permissions or access. Each user can work on different situations. In one embodiment, another hierarchy is managed using the multi-list. In one embodiment devices in the network can be grouped by one or more of: type, location and usage. In one embodiment, devices in the network are grouped to create another type of hierarchy that can be presented and managed by the multi-list.

Product settings can be organized in at least one of: type, application and access level to create a hierarchy managed using multi-list. In one embodiment, the screenshot allows for display of a list of information relative to the managed infrastructure including at least one of: an overview or a summary that explains what a list includes. In one embodiment, the summary or overview includes one or more of a: count, average or any other calculation that of summary information in the list.

In one embodiment, the screenshot includes a first column of the list with a high-level grouping of items inside of the list. In one embodiment, the high-level group hides an overview of summary to enable viewing of items in the list. The multi-list can show one or more sub-lists of managed infrastructure information, where a sub-list works like a folder hierarchy to provide that as the user selects one item the system displays sub-items inside it. In one embodiment, a list of situations is provided, and when one is selected a list of alerts associated to that situation is displayed.

In one embodiment, the screenshot includes a plurality of viewable lists. The screenshot can include a narrow list view that displays a small set. A small control, on top of each list sub-section, expands a narrow view to a wide view and displays additional columns of list data. Additional columns can include one or more of a: list of situations and alerts.

A tab user interface can be built into the multi-list, allowing a user to stay in the wide mode and switch between different lists.

In one embodiment, a single item in a list displays details of that item on the screenshot.

In one embodiment, the display includes a screen with a carousel screenshot having a space to display managed infrastructure information selected from at least one of: incidents or alerts. The carousal space can provide a display of two or more incidents or alerts for side by side comparison. A user can select multiple items in a list and select with a sub-set one or more of: compare, move, copy, and a creation sub-group. The carousel view of information can show multiple items side by side for comparison and other processing purposes.

In one embodiment, managed infrastructure data is received and processed as processed data presented in a modified form through a plurality of steps, the processed data goes through a plurality of steps reviewable by a user. In one embodiment, the system produces a screenshot that includes steps and intermittent data in a flow of data processing. A plurality of selectable tabs can be provided useable by the user. The selectable tabs can represent each step of the data processing and a list of modified data. The display can include a screenshot of an alert journey.

The display can include controls used to show a user a number of steps before and after a current step in the process flow. The display can show an origin of managed infrastructure data. A source of managed infrastructure data can be represented as channels inside the user interface.

In one embodiment, one or more pinboards enable a user to drag and drop managed infrastructure information to provide one or more of a: sharing of managed infrastructure information one or more images of managed infrastructure information; and a list and a description of managed infrastructure information that can be dragged and dropped and shared as a collaborative tool used by two or more users. Each pinboard contain many items and used to share live information. In one embodiment, the pinboards enable users to pass responsibilities from one user to another user. As a non-limiting example, one or more objects cab be dragged and attached to one or more pinboards. The object can be a live entity in the system that can update itself. As a non-limiting example, an object knows how to display itself on the one or more pinboards. An object can follow one or more access control rules built in the system, and can be displayed to users with access rights. Each system user can have multiple pinboards. Shared pinboards are used that enable a sharing with one or more users providing access of a first user pinboard to a second user. Shared pinboards can be shown as tabs next to other personal inboards on the same user interface. In one embodiment, shared pinboards are presented separate from one's own pinboard.

In one embodiment, the display includes a screen with a screenshot having a space to display managed infrastructure information selected from at least one of: incidents or alerts. A timeline occurrence cab be displayed of the least one of: anomalies, alerts and situations. In one embodiment, the timeline view includes details selected from at least one of: metrics, logs, events, alerts, incidents, situations and their changes. The activities can be selected from at least one of: changes; firmware update maintenance window for managing devices and systems; actions including taking ownership of something or making progress or closing an item; adding comments; chatting about the issues at hand actions taken by users; and changes to the system.

In one embodiment, the display includes a metric view of management infrastructure data. The metric view provides metrics of management infrastructure data coming through the system that have a defined threshold. A metric measurement can go above or below a threshold an anomaly is recorded. Anomalies can create alerts to warn a user. As a non-limiting example, a combined view is provided to show all anomalies and alerts on a timeline.

In one embodiment, a relative combined view is provided for all anomalies from all metrics that are shown relative to the baseline. This gives the user an overview view of all metrics in a single view. As a non-limiting example, the distance between the baseline and anomaly is how far the anomaly has deviated from the defined threshold. In one embodiment, events are represented on the same timeline with bars. This should help the user how events related to anomalies and the generated alerts from anomalies. In one embodiment, an absolute view presents a single metric with precise measurements of anomalies deviating from the normal threshold.

In one embodiment, the user can switch between a relative view to an absolute view, by clicking or selecting a single anomaly. In an absolute view the focus goes to a single metric showing the anomalies for that metric. In a relative view all metrics are presented in one view. The user can switch back to relative view by clicking anywhere outside or deselecting that one metric.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described to best describe the principles of the invention and its practical application, thereby enabling others skilled in the relevant art to understand the claimed subject matter, the various embodiments and with various modifications that are suited to the use contemplated.

What is claimed is:

1. A system for managing a managed infrastructure, comprising:
    an extraction engine in communication with an a managed infrastructure, the extraction engine in operation receiving messages from the managed infrastructure and produces events that relate to the managed infrastructure and converts the events into words and subsets used to group the events into clusters that relate to failures or errors in the managed infrastructure, including managed infrastructure physical hardware, the managed infrastructure supporting the flow and processing of information;
    a sigalizer engine that includes one or more of an NMF engine, a k-means clustering engine and a topology proximity engine, the sigalizer engine determining one or more common steps from events and produces clusters relating to events, the sigalizer engine determining one or more common characteristics of events and producing clusters of events relating to the failure or errors in the managed infrastructure, where membership in a cluster indicates a common factor of the events that is a failure or an actionable problem in the physical hardware managed infrastructure directed to supporting the flow and processing of information
    a user interface; and
    a display coupled to the user interface, the display including a screen display image configured to display managed infrastructure information, the screen display image providing a display of two or more incidents or alerts for side by side comparison, wherein the display enables a user to choose one or more of the incidents or alerts and select an option from a sub-set that is one or more of: compare, move, copy, and sub group creation.

2. The system of claim 1, wherein the view of information shows multiple items side by side for comparison and other processing purposes.

3. A system for managing a managed infrastructure, comprising:
    an extraction engine in communication with an a managed infrastructure, the extraction engine in operation receiving messages from the managed infrastructure and produces events that relate to the managed infrastructure and converts the events into words and subsets used to group the events into clusters that relate to failures or errors in the managed infrastructure, including managed infrastructure physical hardware, the managed infrastructure supporting the flow and processing of information;
    a sigalizer engine that includes one or more of an NMF engine, a k-means clustering engine and a topology proximity engine, the sigalizer engine determining one or more common steps from events and produces clusters relating to events, the sigalizer engine determining one or more common characteristics of events and producing clusters of events relating to the failure or errors in the managed infrastructure, where membership in a cluster indicates a common factor of the events that is a failure or an actionable problem in the physical hardware managed infrastructure directed to supporting the flow and processing of information
    a user interface; and
    a display coupled to the user interface, the display including a screen with a screen display image having a space to display managed infrastructure information selected from at least one of: incidents or alerts, the screen display image providing a display of two or more incidents or alerts for side by side comparison, the screen display image providing multi-use for different types of lists of managed infrastructure information, wherein managed infrastructure data is received and processed as processed data presented in a modified form, the processed data going through a plurality of steps reviewable by a user.

4. The system of claim 3, wherein the system produces the screen display image that includes steps and intermittent data in a flow of data processing.

5. The system of claim 4, further comprising:
a plurality of selectable tabs useable by the user that represent each of a step of the data processing and a list of modified data.

6. The system of claim 3, wherein the display includes a screenshot of an alert journey.

7. The system of claim 3, wherein the display includes controls used to show a user a number of steps before and after a current step in the process flow.

8. The system of claim 3, wherein the display shows an origin of managed infrastructure data.

9. The system of claim 8, wherein a source of managed infrastructure data is represented as channels inside the user interface.

10. A system for managing a managed infrastructure, comprising:
an extraction engine in communication with an a managed infrastructure, the extraction engine in operation receiving messages from the managed infrastructure and produces events that relate to the managed infrastructure and converts the events into words and subsets used to group the events into clusters that relate to failures or errors in the managed infrastructure, including managed infrastructure physical hardware, the managed infrastructure supporting the flow and processing of information;
a sigalizer engine that includes one or more of an NMF engine, a k-means clustering engine and a topology proximity engine, the sigalizer engine determining one or more common steps from events and produces clusters relating to events, the sigalizer engine determining one or more common characteristics of events and producing clusters of events relating to the failure or errors in the managed infrastructure, where membership in a cluster indicates a common factor of the events that is a failure or an actionable problem in the physical hardware managed infrastructure directed to supporting the flow and processing of information
a user interface;
a display coupled to the user interface, the display including a screen with a screen display image having a space to display managed infrastructure information selected from at least one of: incidents or alerts; and
one or more pinboards that enable a user to drag and drop managed infrastructure information for the purpose of one or more of a: sharing of managed infrastructure information one or more images of managed infrastructure information; and a list and a description of managed infrastructure information that can be dragged and dropped and shared as a collaborative tool used by two or more users.

11. The system of claim 10, wherein each of the one or more pinboards that can contain many items and used to share live information.

12. The system of claim 11, wherein the one or more pinboards enable users to pass responsibilities from one user to another user.

13. The system of claim 10, wherein the one or more pinboards provide for one or more objects being dragged and attached to the one or more pinboards, the object being a live entity in the system that can update itself.

14. The system of claim 13, wherein an object knows how to display itself on the one or more pinboards.

15. The system of claim 14, wherein an object follows one or more access control rules built in the system and can be displayed to users with access rights.

16. The system of claim 11, wherein each of a user has multiple pinboards.

17. The system of claim 11, wherein shared pinboards used that enable a sharing with one or more users providing access of a first user pinboard to a second user.

18. The system of claim 17, wherein shared pinboards are shown as tabs next to other personal inboards on the same user interface.

19. The system of claim 17, wherein shared pinboards are presented separate from one's own pinboard.

* * * * *